United States Patent
Zhao et al.

(10) Patent No.: US 6,677,175 B2
(45) Date of Patent: Jan. 13, 2004

(54) OPTICAL WAVEGUIDES AND METHODS FOR MAKING THE SAME

(75) Inventors: Xiao-Mei Zhao, Pepper Pike, OH (US); Ramakrishna Ravikiran, Cleveland Heights, OH (US); Phillip S. Neal, Wakeman, OH (US); Robert A. Shick, Strongsville, OH (US); James E. Watson, Maplewood, MN (US); Thomas M. Kafka, Edina, MN (US); Davy Chum, St. Paul, MN (US); Raymond P. Johnston, Lake Elmo, MN (US)

(73) Assignees: Promerus, LLC, Brecksville, OH (US); 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/916,463

(22) Filed: Jul. 27, 2001

(65) Prior Publication Data

US 2002/0064896 A1 May 30, 2002

Related U.S. Application Data

(60) Provisional application No. 60/221,420, filed on Jul. 28, 2000, and provisional application No. 60/252,251, filed on Nov. 21, 2000.

(51) Int. Cl.$^7$ .............................................. H01L 21/00
(52) U.S. Cl. ............................. 438/31; 438/22; 438/29; 438/39; 438/42
(58) Field of Search .......................... 438/22, 29, 31, 438/39, 42

(56) References Cited

U.S. PATENT DOCUMENTS 5,046,800 A 9/1991 Blyler, Jr. et al. .......... 385/131

(List continued on next page.)

FOREIGN PATENT DOCUMENTS

DE 41 04 392 A1 8/1992

(List continued on next page.)

OTHER PUBLICATIONS

Aumiller et al., "Submicrometer resolution replication of relief patterns for integrated optics," *J. Appl. Phys.*, vol. 45, No. 10, pps. 4557–62 (1974).

(List continued on next page.)

Primary Examiner—Long Pham
(74) Attorney, Agent, or Firm—Marshall, Gerstein & Borun LLP

(57) ABSTRACT

The invention provides a method for producing an optical waveguide that includes the steps of: (a) forming a core structure, the core structure including an at least partially cured core composition, on a master defining a waveguide pattern; (b) applying over the top of the core structure and the master a cladding layer including a liquid cladding composition; (c) curing the cladding layer to form a core/cladding combination; and removing the core/cladding combination from the master so as to expose at least a portion of the core structure, wherein the refractive index of the core material is at least about 0.05 percent higher than the refractive index of the cladding material. In another embodiment, the invention relates to a method for producing an optical waveguide core structure that includes the steps of: (a) applying a core composition to a substrate defining a waveguide core pattern; (b) removing a portion of the core composition from an exposed surface of the filled waveguide core pattern; and (c) at least partially curing the core composition to form a core structure. In another embodiment, the invention relates to a composition for forming either the core or cladding portion of an optical waveguide comprising at least one norbornene-type monomer and/or at least one crosslinking monomer and at least one co-catalyst or pro-catalyst, wherein polymerization is achieved by the addition of at least one pro-catalyst (when a co-catalyst is present in the composition) or at least one co-catalyst (when a pro-catalyst is present in the composition). Optical waveguides made by the methods of the invention are also disclosed.

12 Claims, 15 Drawing Sheets

U.S. PATENT DOCUMENTS

| | | | | |
|---|---|---|---|---|
| 5,113,471 | A | 5/1992 | Inaishi et al. | 385/126 |
| 5,230,990 | A | 7/1993 | Iwasaki et al. | 430/321 |
| 5,238,877 | A | 8/1993 | Russell | 437/231 |
| 6,054,007 | A | 4/2000 | Boyd et al. | 156/245 |

FOREIGN PATENT DOCUMENTS

| | | |
|---|---|---|
| WO | WO 98/23615 | 6/1998 |
| WO | WO 98/26315 | 6/1998 |
| WO | WO 98/57206 | 12/1998 |
| WO | WO 00/20472 | 4/2000 |
| WO | WO 00/34344 | 6/2000 |

OTHER PUBLICATIONS

Rooks et al., "Polymide optical waveguides fabricated with electron beam lithography," *Appl. Opt.*, vol. 29, pps. 3880–82 (1990).

Mukherjee et al., "Very low loss channel waveguides in polymethylmethacrylate," *Appl. Phys. Lett.*, vol. 65, pps. 3179–81 (1994).

Neyer et al., "Fabrication of low loss polymer waveguides using injection moulding technology," *Electron. Lett.*, vol. 29, pp. 399 (1996).

Zhao et al., "Demonstration of waveguide couplers fabricated using microtransfer molding," *Appl. Phys. Lett.*, vol. 71, No. 8, pps. 1017–19 (1997).

Johnck et al., "Characterisation of passive polymer optical waveguides," *Proceedings of SPIE—Conference on Organic Photonic Materials and Devices*, vol. 3623, pps. 252–63 (1999).

Krabe et al., "Optical interconnects by hot embossing for module and PCB technology—the EOCB approach," *Proceedings of the 49$^{th}$ Electronics Components & Technology Conference*, vol. 32, pps. 1164–66 (1999).

Ferm et al., "High Volume Manufacturing of Polymer Planar Waveguides via UV–Embossing," Proceedings of SPIE vol. 4106 (2000), (presented on Aug. 1, 2000).

Glukh et al., "High–performance polymeric materials for waveguide applications," Proceedings of SPIE, vol. 4106A (2000), (presented on Aug. 1, 2000).

International Search Report in international application No. PCT/US01/23692 mailed Jun. 26, 2002.

Written Opinion in international application No. PCT/US01/23692, mailed Jul. 5, 2002.

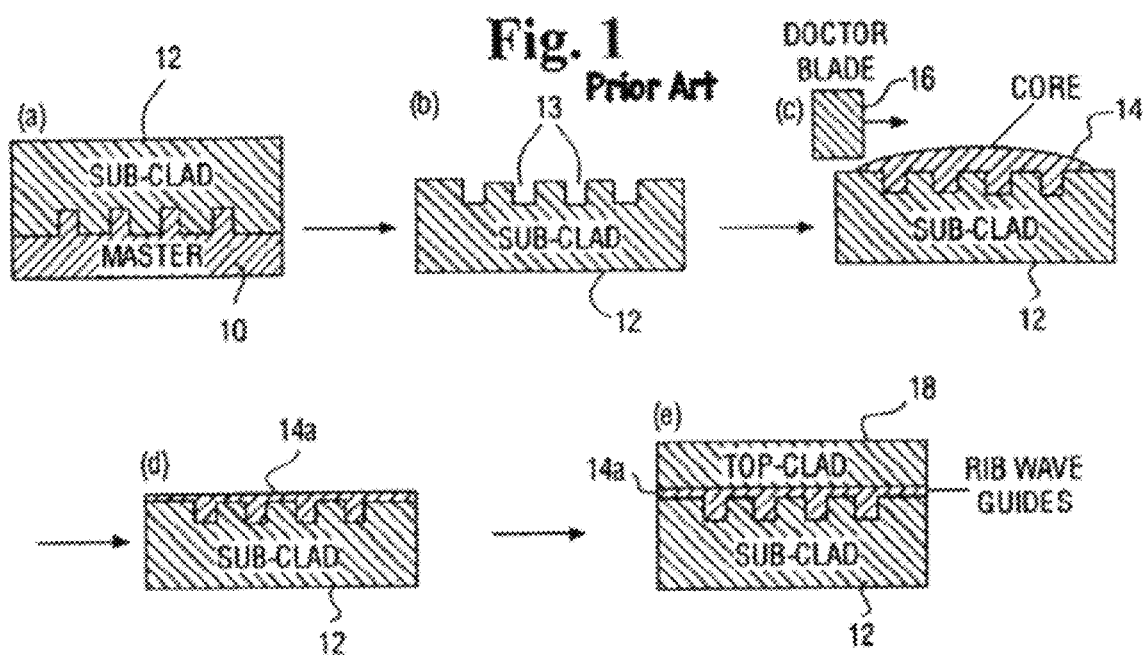
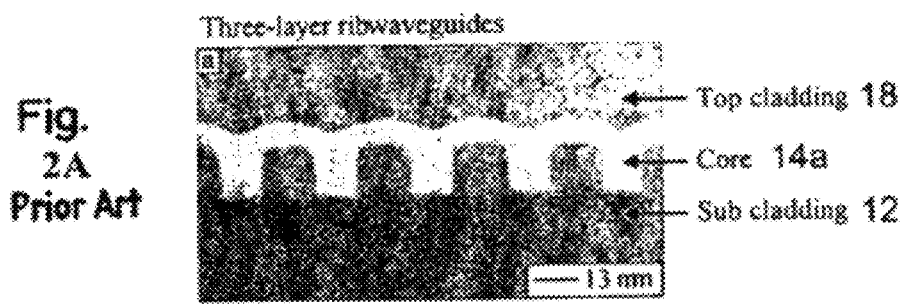
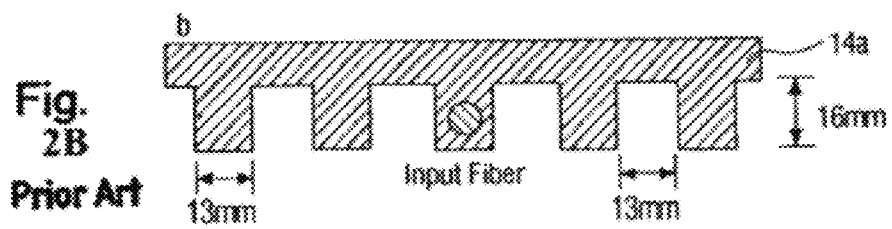
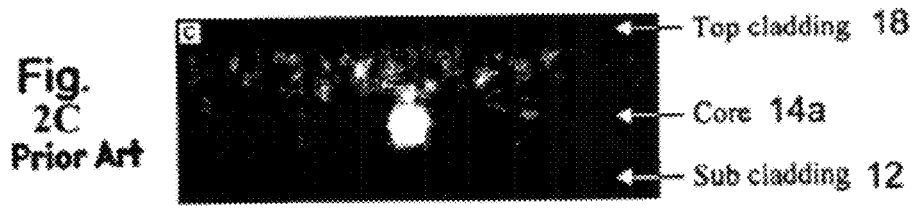
Figs. 2A - 2C

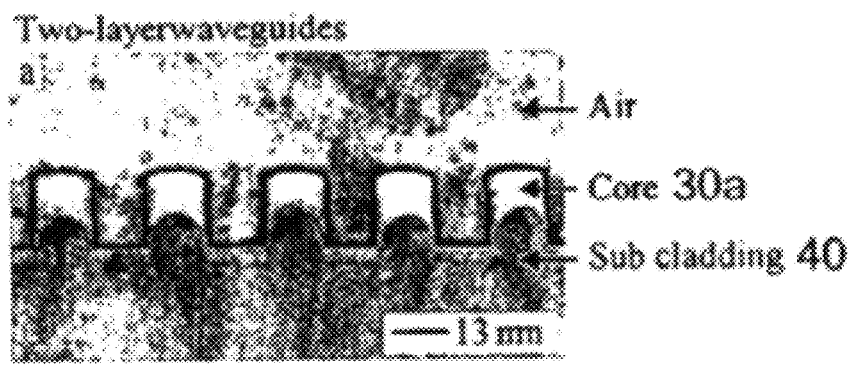
Fig. 4A
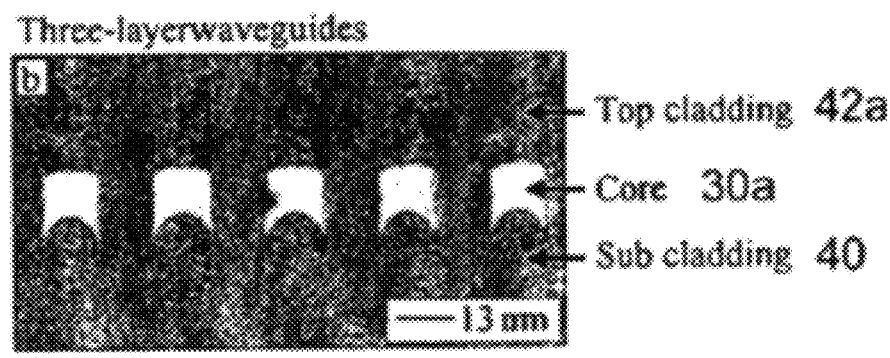
Fig. 4B
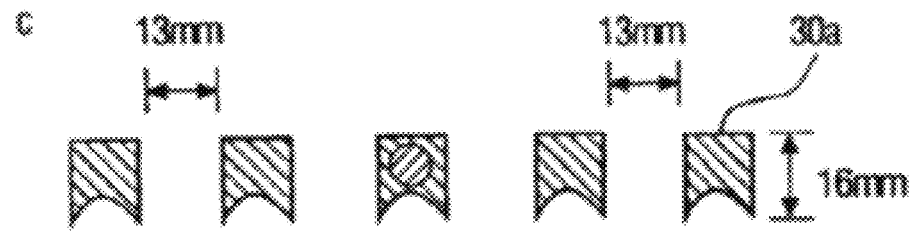
Fig. 4C
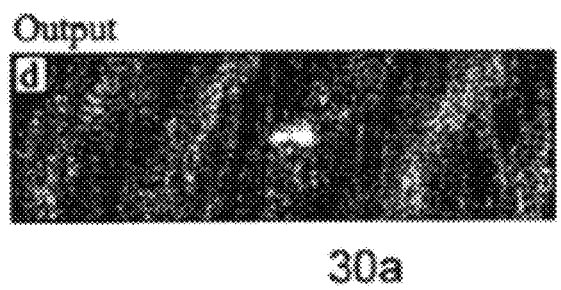
Fig. 4D
Figs. 4A - 4D

OPTICAL WAVEGUIDES AND METHODS FOR MAKING THE SAME

CROSS REFERENCE TO RELATED APPLICATIONS

The benefit under 35 U.S.C. §119 (e) is claimed based on provisional application Ser. Nos. 60/221,420, filed Jul. 28, 2000, and 60/252,251, filed Nov. 21, 2000, the entire respective disclosures of which are hereby incorporated by reference.

BACKGROUND OF THE INVENTION

1. Field of the Invention

The invention relates generally to optical waveguides and methods for forming such optical waveguides.

2. Brief Description of Related Technology

The demand for continuous increase in transmission speed, data capacity and data density in integrated optical and optoelectronic circuits has been the motivating force behind numerous innovations in areas of broadband communications, high-capacity information storage, and large screen and portable information display. Although glass optical fibers are routinely used for high-speed data transfer over long distances, they are inconvenient for complex high-density circuitry because of their high density, poor durability and high cost of fabrication for complex photonic circuits. As such, polymeric materials hold great promise for constructing cost effective, reliable, passive and active integrated components capable of performing the required functions for integrated optics.

SUMMARY OF THE INVENTION

Generally, the invention provides a method for producing an optical waveguide that includes the steps of: (a) forming a core structure, the core structure including an at least partially cured core composition, on a master defining a waveguide pattern; (b) applying over the top of the core structure and the master a cladding layer including a liquid cladding composition; (c) curing the cladding layer to form a core/cladding combination; and (d) removing the core/cladding combination from the master so as to expose at least a portion of the core structure, wherein the refractive index of the cured core composition is at least 0.05 percent higher than the refractive index of the cured cladding composition.

In another embodiment, the invention relates to a method of producing an optical waveguide that further includes the step of: (e) forming a second cladding layer over the exposed portion of the at least one core structure, thereby burying the at least one core structure.

In another embodiment, the invention relates to a method of producing an optical waveguide that includes the steps of: (a) forming a core structure, the core structure including an at least partially cured core composition, on a master defining a waveguide pattern; (b) applying over the top of the core structure and the master a cladding layer including a liquid cladding composition; (c) curing the cladding layer to form a core/cladding combination; and (d) removing the core/cladding combination from the master so as to expose at least a portion of the core structure, wherein the refractive index of the cured core composition is at least 0.05 percent higher than the refractive index of the cured cladding composition.

In another embodiment, the invention relates to a method for producing an optical waveguide core structure that includes the steps of: (a) applying a core composition to a substrate defining a waveguide core pattern; (b) removing a portion of the core composition from an exposed surface of the filled waveguide core pattern; and (c) at least partially curing the core composition to form a core structure.

In another embodiment, the invention relates to a method for producing an optical waveguide which includes the steps of: (A) forming at least a two layer film having at least one layer of core material formed over at least one layer of cladding material; and (B) forming at least one waveguide feature in at least the at least one core layer of the at least two layer film, wherein the refractive index of the core material is at least 0.05 percent higher than the refractive index of the cladding material.

In another embodiment, the invention relates to a method of producing an optical waveguide wherein the at least one waveguide feature formed in step (B) is produced using a cutting technique.

In another embodiment, the invention relates to a method of producing an optical waveguide which further includes the step of: (C) forming a second layer of cladding material over an exposed surface of the core layer.

In another embodiment, the invention relates to an optical waveguide comprising: core structures formed from a core polymer produced by the polymerization of a core material comprising at least one cyclic olefin monomer and/or at least one crosslinking monomer; and at least one cladding structure produced by the polymerization of a cladding material comprising at least one cyclic olefin monomer and/or at least one crosslinking monomer, wherein the refractive index of the core material is at least 0.05 percent higher than the refractive index of the cladding material.

In another embodiment, the invention relates to an optical waveguide wherein the core and cladding materials are polymerized by a mass polymerization process using a combination of at least one pro-catalyst and at least one co-catalyst.

In another embodiment, the invention relates to a composition for forming either the core or cladding portion of an optical waveguide comprising at least one norbornene-type monomer and/or at least one crosslinking monomer and at least one co-catalyst, wherein polymerization is achieved by the addition of at least one pro-catalyst.

In another embodiment, the invention relates to a composition for forming either the core or cladding portion of an optical waveguide comprising at least one norbornene-type monomer and/or at least one crosslinking monomer and at least one pro-catalyst, wherein polymerization is achieved by the addition of at least one co-catalyst.

The invention is advantageous in that it provides compositions which permit the formation of optical waveguides having better performance qualities such as, for example, a difference ($\Delta n$) in the refractive index of the core material versus that of the clad material of at least about 0.00075 (i.e., 0.05% where the clad or cladding material has a refractive index of about 1.5) for over a broad wavelength range (e.g., about 400 to about 1600 nm); lower intrinsic optical loss (lower than about 1 dB/cm and in some cases lower than about 0.5 dB/cm); a high glass transition temperature (Tg) (e.g., in one embodiment at least about 150° C., in another embodiment at least about 250° C., and in some cases at least about 280° C).

The disclosed methods for forming optical waveguides are advantageous in that they permit the formation of improved optical waveguides. For example, the core-first methods permit the formation of optical waveguides with a reduction and/or elimination in the occurrence of "swelling" between layers (see FIGS. 5A and 5B for a photographic depiction of "swelling"). In another example, the fill-and-remove methods described below permit the formation of isolated, buried-channel waveguides that have surfaces smoothed by surface tension of the core material, rather than machined, which improves signal loss. Thus, another aspect of the invention is optical waveguides produced by the methods of the invention.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

BRIEF DESCRIPTION OF THE DRAWINGS

FIG. 1 is a step diagram of the steps of a clad-first waveguide formation method;

FIGS. 2A to 2C depict waveguide structures formed using the clad-first method of FIG. 1;

FIGS. 4A to 4D are depict waveguide structures formed using the core-first method of FIG. 3;

DETAILED DESCRIPTION OF THE INVENTION

Figure 3:
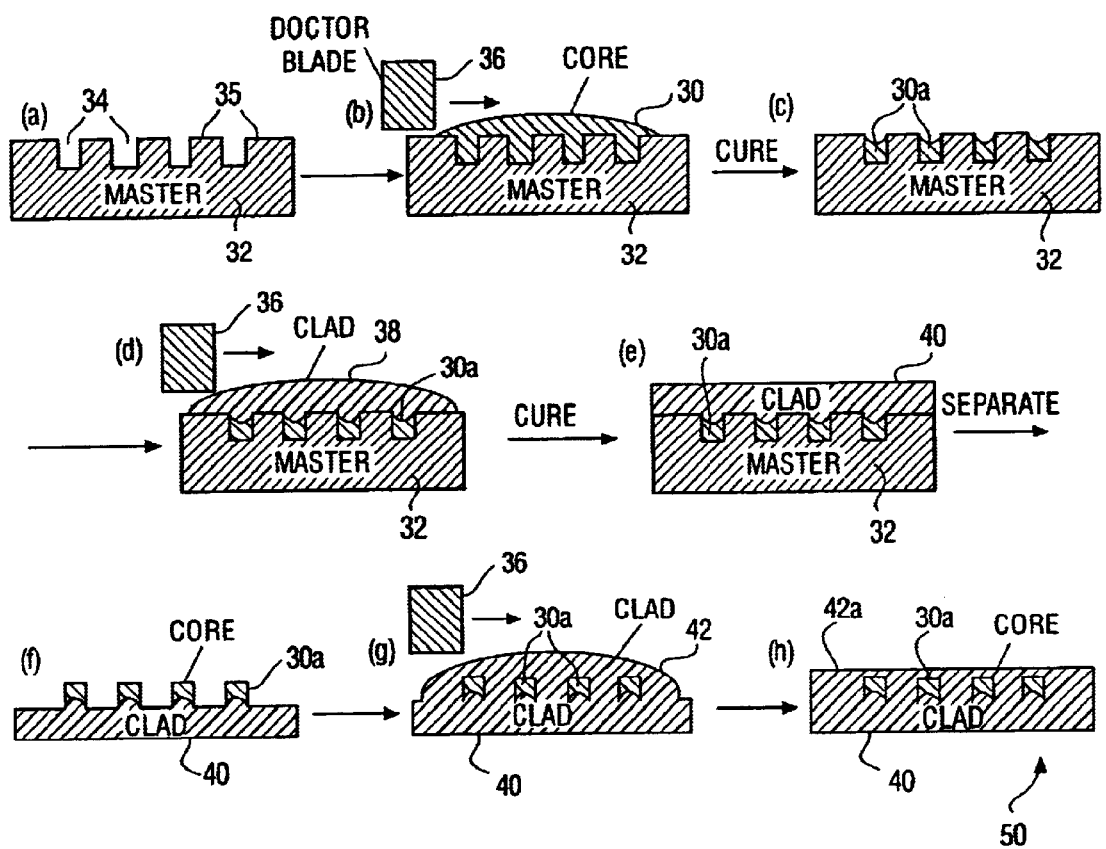
FIG. 3 is a step diagram of the steps of a core-first waveguide formation method.

As described above, the invention relates to optical waveguides and a variety of methods which can be used to form optical waveguides, preferably buried-channel waveguides.

In the following text and claims, range and ratio limits and/or range and time limits may be combined. Additionally, as used throughout the specification and claims the terms core composition and cladding (or clad) composition are defined to mean one of the following:

(1) a composition which includes at least one monomer;

(2) a composition which includes at least one monomer and at least one oligomer, where the total amount of reactive monomer and/or reactive oligomer is at least about 30 weight percent based on the total weight of either the core or cladding composition;

(3) a composition which includes at least one monomer and at least one polymer, where the total amount of reactive monomer is at least about 30 weight percent based on the total weight of either the core or cladding composition; and (4) a composition which includes at least one monomer, at least one oligomer and at least one polymer, where the total amount of reactive monomer and/or reactive oligomer is at least about 30 weight percent based on the total weight of either the core or cladding composition. Oligomer as used throughout the specification and claims is defined to mean a composition containing less than about 1000 repeating units of a given monomer.

Furthermore, the refractive indices referred to herein were measured using an Abbe refractometer at 589 nm and/or a Metricon Model 2010 prism coupler at 633 nm, 830 nm, and 1550 nm, following the guideline of ASTM Designation #D 542–95.

Generally, optical waveguides and even buried channel optical waveguides are composed of a core layer having a first index of refraction and a cladding layer having a second index of refraction, wherein the core layer is at least partially encompassed by the cladding layer. In another embodiment, the core layer is completely encompassed by the cladding layer (i.e., a buried-channel structure or three-layer optical waveguide). It is the core which transmits light and the cladding layer which confines light. In the situation where the optical waveguide is a two layer structure, the core layer is partially bound by a layer of air.

In view of the above, formulations for each of the core and cladding (or clad) layers will be described below. However, in the general sense the methods disclosed below will work with any suitable polymer or polymers so long as the resulting core and cladding (or clad) layers formed therefrom meet the necessary performance criteria for the application in which the waveguide will be utilized. Numerous waveguide performance criteria exist, Table 1 summarizes the general minimum performance criteria which are applicable to all waveguides irrespective of the waveguide application, although the invention is not limited thereto. Rather, based on the polymer or polymers utilized, other performance criteria are obtainable.

TABLE I

| Performance Criteria | Minimum Requirement | Comparative Performance of a Waveguide Using the Core Composition of Example CL5 and the Cladding Composition of Example CO1 |
|---|---|---|
| Refractive Index at 830 nm Δn (core-clad): | at least about 0.00075 (which corresponds to about 0.05% where the clad refractive | about 0.03 (about 2.0% where the clad refractive index is approximately 1.5) |

TABLE I-continued

| Performance Criteria | Minimum Requirement | Comparative Performance of a Waveguide Using the Core Composition of Example CL5 and the Cladding Composition of Example CO1 |
|---|---|---|
| An Consistent Over a Broad Temp. Range: | index is approximately 1.5) about 0 to about 40° C. | 0 to 175° C. |
| Intrinsic Optical Loss: | less than about 1 dB/cm | less than about 0.1 dB/cm (at 515 to 870 nm) |
| Transmission Loss of Waveguide: | less than about 1 dB/cm | about 0.14 dB/cm |
| Birefringence, both In-Plane/Out-Of-Plane (An): | less than about $10^{-2}$/less than about $10^{-2}$ | less than about $10^{-5}$/less than about $10^{-3}$ |
| Oxidative Stability is 2000 hours at 125° C. in air | at least 500 hours at 125° C. | at least about 2200 hours at 125° C. |
| Solder Reflow Compatible Due to a Minimum Glass Transition Temp. (Tg): | Tg is at least 150° C. | Tg is at least 250° C. |
| Low Moisture Absorption: | less than about 3% | less than about 0.3% |
| Mechanically Robust Due to a Minimum Elongation: | at least about 5% | at least about 10% |

In one embodiment, waveguides can be formed via the methods described below by using a variety of polymer compounds, such compounds include, but are not limited to, polyacrylates (such as deuterated polyfluoro-methacrylate), polyimides (such as cross-linked polyimides or fluorinated polyimides), benzocyclobutene or fluorinated benzocyclobutene.

In another embodiment, the waveguides of the invention are formed from polymers formed from cyclic olefin monomers. In yet another embodiment, the cyclic olefin monomers used to form the waveguide polymers are norbornene-type monomers.

In one embodiment where the polymers used for the waveguide structures are formed from cyclic olefin monomers, polymerization of such compounds (monomers) is carried out in accordance with the description below. Alternatively, polymerization of the cyclic olefin monomers can be conducted by any other suitable method.

Formation of Cyclic Olefin Polymers

In general, the polymerization of the cycloolefins used in one embodiment of the invention are, in one embodiment, conducted using a Group 10 metal complex via addition polymerization to yield saturated, high glass transition temperature polymers. In another embodiment, the polymerization of the cycloolefins used in one embodiment of the invention are conducted using a Group 10 metal complex and a weakly coordinating counteranion.

In yet another embodiment, the cycloolefins are polymerized by contacting a polymerizable polycycloolefin monomer charge with a high activity catalyst system comprising a Group 10 metal cation complex and a weakly coordinating counteranion complex of the formula:

$$[(R')_zM(L')_x(L'')_y]_b[WCA]_d \qquad \text{I}$$

wherein M represents a Group 10 transition metal; R' represents an anionic hydrocarbyl containing ligand; L' represents a Group 15 neutral electron donor ligand; L" represents a labile neutral electron donor ligand; z is 0 or 1; x is 1 or 2; y is 0, 1, 2, or 3, and the sum of x, y, and z equals 4; and b and d are numbers representing the number of times the cation complex and weakly coordinating counteranion complex (WCA), respectively, are taken to balance the electronic charge on the overall catalyst complex. The monomer charge can be neat or in solution, and is contacted with a preformed catalyst of the foregoing formula. Alternatively, the catalyst can be formed in situ by admixing the catalyst forming components in the monomer charge.

Catalyst System

The catalyst of the invention comprises a Group 10 metal cation complex and a weakly coordinating counteranion complex represented by Formula I below:

$$[(R')_zM(L')_x(L'')_y]_b[WCA]_d \qquad \text{I}$$

wherein M represents a Group 10 transition metal; R' represents an anionic hydrocarbyl ligand; L' represents a Group 15 neutral electron donor ligand; L" represents a labile neutral electron donor ligand; x is 1 or 2; y is 0, 1, 2, or 3, wherein the sum of x, y, and z is 4; and b and d are numbers representing the number of times the cation complex and weakly coordinating counteranion complex (WCA), respectively, are taken to balance the electronic charge of the overall catalyst complex.

The weakly coordinating counteranion complex is an anion which is only weakly coordinated to the cation complex. It is sufficiently labile to be displaced by a neutral Lewis base, solvent or monomer. More specifically, the WCA anion functions as a stabilizing anion to the cation complex and does not transfer to the cation complex to form a neutral product. The WCA anion is relatively inert in that it is non-oxidative, non-reducing, and non-nucleophilic.

An anionic hydrocarbyl ligand is any hydrocarbyl ligand which when removed from the metal center M in its closed shell electron configuration, has a negative charge.

A neutral electron donor is any ligand which when removed from the metal center M in its closed shell electron configuration, has a neutral charge.

A labile neutral electron donor ligand is any ligand which is not as strongly bound to metal center M, is easily displaced therefrom, and when removed from the metal center in its closed shell electron configuration has a neutral charge.

In the cation complex above, M represents a Group 10 metal selected from nickel, palladium. In another embodiment, M represents platinum.

Representative anionic hydrocarbyl containing ligands defined under R' include hydrogen, linear and branched $C_1$–$C_{20}$ alkyl, $C_5$–$C_{10}$ cycloalkyl, linear and branched $C_2$–$C_{20}$ alkenyl, $C_6$–$C_{15}$ cycloalkenyl, allylic ligands or canonical forms thereof, $C_6$–$C_{30}$ aryl, $C_6$–$C_{30}$ heteroatom containing aryl, and $C_7$–$C_{30}$ aralkyl, each of the foregoing groups can be optionally substituted with hydrocarbyl and/or heteroatom substituents which, in one embodiment, are selected from linear or branched $C_1$–$C_5$ alkyl, linear or branched $C_1$–$C_5$ haloalkyl, linear or branched $C_2$–$C_5$ alkenyl and haloalkenyl, halogen, sulfur, oxygen, nitrogen, phosphorus, and phenyl optionally substituted with linear or branched $C_1$–$C_5$ alkyl, linear or branched $C_1$–$C_5$ haloalkyl, and halogen, R' also represents anionic hydrocarbyl containing ligands of the formula R"C(O)O, R"OC(O)CHC(O)R", R"C(O)S, R"C(S)O, R"C(S)S, R"O, R"$_2$N, wherein R" is the same as R' defined immediately above.

The foregoing cycloalkyl, and cycloalkenyl ligands can be monocyclic or multicyclic. The aryl ligands can be a single ring (e.g., phenyl) or a fused ring system (e.g., naphthyl). In addition, any of the cycloalkyl, cycloalkenyl and aryl groups can be taken together to form a fused ring system. Each of the monocyclic, multicyclic and aryl ring systems described above optionally can be monosubstituted or multisubstituted with a substituent independently selected from hydrogen, linear and branched $C_1$–$C_5$ alkyl, linear and branched $C_1$–$C_5$ haloalkyl, linear and branched $C_1$–$C_5$ alkoxy, halogen selected from chlorine, fluorine, iodine and bromine, $C_5$–$C_{10}$ cycloalkyl, $C_6$–$C_{15}$ cycloalkenyl, and $C_6$–$C_{30}$ aryl. An example of a multicycloalkyl moiety is a norbornyl ligand. An example of a multicycloalkenyl moiety is a norbornenyl ligand. Examples of aryl ligand groups include phenyl and naphthyl. For purposes of illustration Structure I below represents a cationic complex wherein R' is a cycloalkenyl ligand derived from 1,5-cyclooctadiene. Structures II and III illustrate cationic complexes wherein R' represents multicycloalkyl and multicycloalkenyl ligands, respectively. In Structure III the norbornenyl ligand is substituted with an alkenyl group.

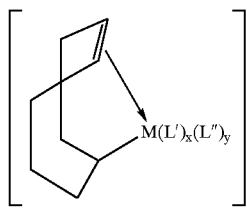

Structure I

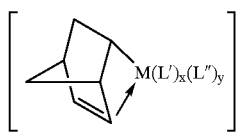

Structure II

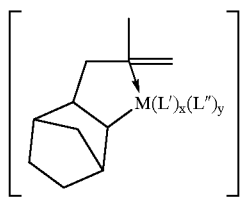

Structure III wherein M, L', L", x and y are as previously defined.

Additional examples of cationic complexes where R' represents a ring system is illustrated in Structures IV to IVc below.

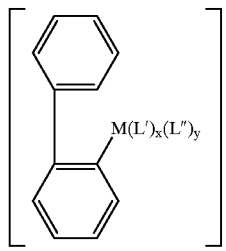

Structure IV

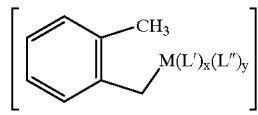

Structure IVa

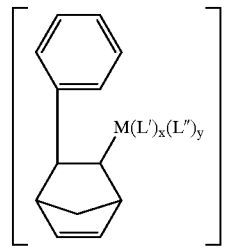

Structure IVb

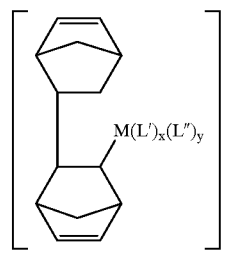

Structure IVc wherein M, L', L", x and y are as previously defined.

In another embodiment of the invention R' represents a hydrocarbyl ligand containing a terminal group that coordinates to the Group 10 metal. The terminal coordination group containing hydrocarbyl ligand are represented by the formula —$C_{d'}H_{2d'}X\rightarrow$, wherein d' represents the number of carbon atoms in the hydrocarbyl backbone and is an integer from 3 to 10, and X→represents an alkenyl or heteroatom containing moiety that coordinates to the Group 10 metal center. The ligand together with the Group 10 metal forms a metallacycle or heteroatom containing metallacycle. Any of the hydrogen atoms on the hydrocarbyl backbone in the formulae above can be independently replaced by a substituent selected from $R^{1'}$, $R^{2'}$, and $R^{3'}$ which are defined below.

A cation complex of the terminal coordination group containing hydrocarbyl metallacycle embodiment is represented by Structure V shown below:

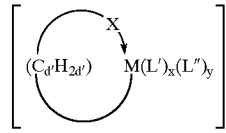

Structure V wherein M, L', L", d', x and y are as previously defined, and X represents a radical selected from the group —$CHR^{4'}$=$CHR^{4'}$, —$OR^{4'}$, —$SR^{4'}$, —$N(R^{4'})_2$, —N=$NR^{4'}$, —$P(R^{4'})_2$, —$C(O)R^{4'}$, —$C(R^{4'})$=$NR^{4'}$, —$C(O)OR^{4'}$, —OC(O)$R^{4'}$, —OC(O)$R^{4'}$, and $R^{4'}$ represents hydrogen, halogen, linear and branched $C_1$–$C_5$ alkyl, linear and branched $C_1$–$C_5$ haloalkyl, $C_5$–$C_{10}$ cycloalkyl, linear or branched $C_2$–$C_5$ alkenyl, linear or branched $C_2$–$C_5$ haloalkenyl, substituted and unsubstituted $C_6$–$C_{18}$ aryl, and substituted and unsubstituted $C_7$–$C_{24}$ aralkyl.

The substituted terminal group containing hydrocarbyl metallacycles can be represented by structure Va, below.

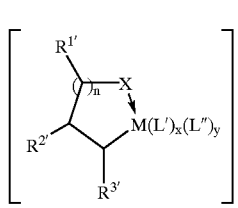

Structure Va

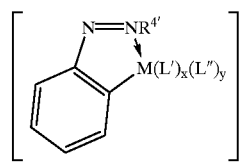

Structure Vd

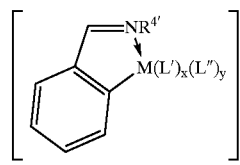

Structure Ve

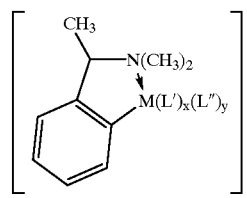

Structure Vf

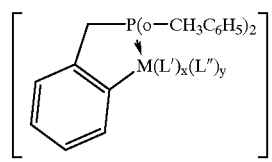

Structure Vg wherein M, L', L", X, x and y are as previously defined, n represents an integer from 1 to 8 and $R^{1'}$, $R^{2'}$, and $R^{3'}$ independently represent hydrogen, linear and branched $C_1$–$C_5$ alkyl, linear and branched $C_1$–$C_5$ haloalkyl, linear or branched $C_2$–$C_5$ alkenyl, linear and branched $C_2$–$C_5$ haloalkenyl, substituted and unsubstituted $C_6$–$C_{30}$ aryl, substituted and unsubstituted $C_7$–$C_{30}$ aralkyl, and halogen. Any of $R^{1'}$, $R^{2'}$, and $R^{3'}$ can be taken together along with the carbon atoms to which they are attached can form a substituted or unsubstituted aliphatic $C_5$–$C_{20}$ monocyclic or polycyclic ring system, a substituted or unsubstituted $C_6$–$C_{10}$ aromatic ring system, a substituted and unsubstituted $C_{10}$–$C_{20}$ fused aromatic ring system, and combinations thereof. When substituted, the rings described above can contain monosubstitution or multisubstitution where the substituents are independently selected from hydrogen, linear and branched $C_1$–$C_5$ alkyl, linear and branched $C_1$–$C_5$ haloalkyl, linear and branched $C_1$–$C_5$ alkoxy, and halogen selected from chlorine, fluorine, iodine and bromine. In Structure Va above, when n is 0, X is bonded to the carbon atom that contains the $R^{2'}$ substituent.

Representative terminal group containing hydrocarbyl metallacycle cation complexes wherein the substituents are taken together to represent aromatic and aliphatic ring systems are illustrated below under Structures Vb and Vc.

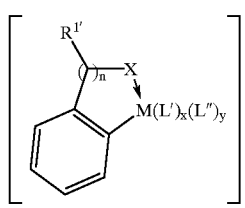

Structure Vb

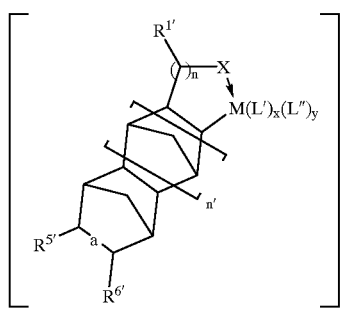

Structure Vc

Additional examples of terminal group containing hydrocarbyl metallacycle cation complexes wherein any of $R^{1'}$ to $R^{3'}$ can be taken together to form aromatic ring systems are set forth in Structures Vd to Vg below.

Illustrative examples of cation complexes containing polycyclic aliphatic ring systems are set forth under structures Vh, Vi, and Vj below:

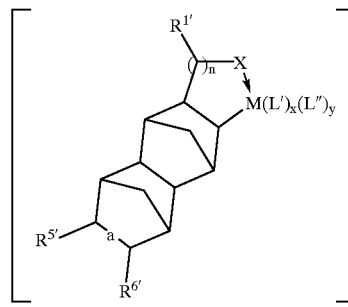

Structure Vh

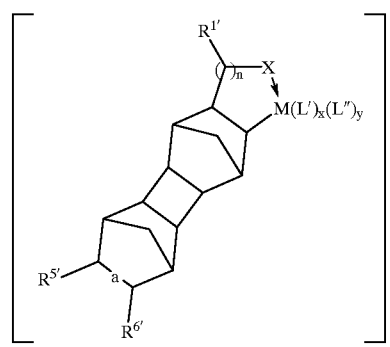

Structure Vi

Structure Vj

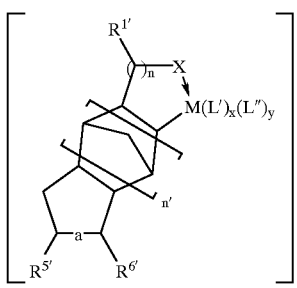

In Structures V through Vj above, n' is an integer from 0 to 5; and X, M, L', L", n, x, y, $R^{1'}$ and $R^{4'}$, are as previously defined, and "a" represents a single or double bond, $R^{5'}$ and $R^{6'}$ independently represent hydrogen, and linear and branched $C_1-C_{10}$ alkyl, $R^{5'}$ and $R^{6'}$ together with the carbon atoms to which they are attached can form a saturated and unsaturated cyclic group containing 5 to 15 carbon atoms.

Examples of heteroatom containing aryl ligands under R' are pyridinyl and quinolinyl ligands.

The allyl ligand in the cationic complex can be represented by the following structure:

Structure VI

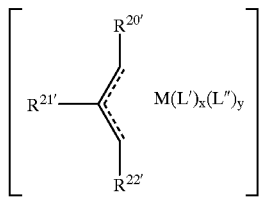

wherein $R^{20'}$, $R^{21'}$, and $R^{22'}$ each independently represent hydrogen, halogen, linear and branched $C_1-C_5$ alkyl, $C_5-C_{10}$ cycloalkyl, linear and branched $C_1-C_5$ alkenyl, $C_6-C_{30}$ aryl, $C_7-C_{30}$ aralkyl, each optionally substituted with a substituent selected from linear and branched $C_1-C_5$ alkyl, linear and branched $C_1-C_5$ haloalkyl, halogen, and phenyl which can optionally be substituted with linear and branched $C_1-C_5$ alkyl, linear and branched $C_1-C_5$ haloalkyl, and halogen. Any two of $R^{20'}$, $R^{21'}$, and $R^{22'}$ can be linked together with the carbon atoms to which they are attached to form a cyclic or multicyclic ring, each optionally substituted with linear or branched $C_1-C_5$ alkyl, linear or branched $C_1-C_5$ haloalkyl, and halogen. Examples of allylic ligands suitable in the cationic complexes of the invention include but are not limited to allyl, 2-chloroallyl, crotyl, 1,1-dimethyl allyl, 2-methylallyl, 1-phenylallyl, 2-phenylallyl, and β-pinenyl.

Representative cationic complexes containing an allylic ligand are shown below.

Structure VIa

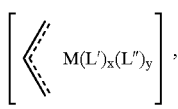

Structure VIb

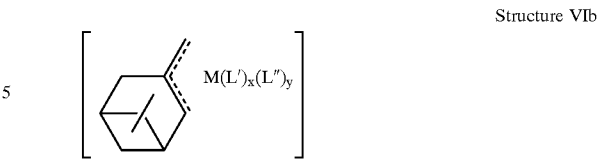

In Structures VI, VIa, and VIb M, L', L", x and y are as previously defined.

Additional examples of allyl ligands are found in R. G. Guy and B. L. Shaw, *Advances in Inorganic Chemistry and Radiochemistry*, Vol. 4, Academic Press Inc., New York, 1962; J. Birmingham, E. de Boer, M. L. H. Green, R. B. King, R. Köster, P. L. I. Nagy, G. N. Schrauzer, *Advances in Organometallic Chemistry*, Vol. 2, Academic Press Inc., New York, 1964; W. T. Dent, R. Long and A. J. Wilkinson, J. Chem. Soc., (1964) 1585; and H. C. Volger, Rec. Trav. Chim. Pay Bas, 88 (1969) 225; which are all hereby incorporated by reference.

Representative neutral electron donor ligands under L' include amines, pyridines organophosphorus containing compounds and arsines and stibines, of the formula:

$$E(R^{7'})_3$$

wherein E is arsenic or antimony, and $R^{7'}$ is independently selected from hydrogen, linear and branched $C_1-C_{10}$ alkyl, $C_5-C_{10}$ cycloalkyl, linear and branched $C_1-C_{10}$ alkoxy, allyl, linear and branched $C_2-C_{10}$ alkenyl, $C_6-C_{12}$ aryl, $C_6-C_{12}$ aryloxy, $C_6-C_{12}$ arylsufides (e.g., PhS), $C_7-C_{18}$ aralkyl, cyclic ethers and thioethers, tri(linear and branched $C_1-C_{10}$ alkyl)silyl, tri($C_6-C_{12}$ aryl)silyl, tri(linear and branched $C_1-C_{10}$ alkoxy)silyl, triaryloxysilyl, tri(linear and branched $C_1-C_{10}$ alkyl)siloxy, and tri($C_6-C_{12}$ aryl)siloxy, each of the foregoing substituents can be optionally substituted with linear or branched $C_1-C_5$ alkyl, linear or branched $C_1-C_5$ haloalkyl, $C_1-C_5$ alkoxy, halogen, and combinations thereof. Representative alkyl groups include but are not limited to methyl, ethyl, propyl, isopropyl, n-butyl, isobutyl, sec-butyl, tert-butyl, pentyl, neopentyl, hexyl, heptyl, octyl, nonyl, decyl, and dodecyl. Representative cycloalkyl groups include but are not limited to cyclopentyl and cyclohexyl. Representative alkoxy groups include but are not limited to methoxy, ethoxy, and isopropoxy. Representative cyclic ether and cyclic thioether groups include but are not limited furyl and thienyl, respectively. Representative aryl groups include but are not limited to phenyl, o-tolyl, and naphthyl. Representative aralkyl groups include but are not limited to benzyl, and phenylethyl (i.e., —CH$_2$CH$_2$PH). Representative silyl groups include but are not limited to triphenylsilyl, trimethylsilyl, and triethylsilyl. As in the general definition above each of the foregoing groups can be optionally substituted with linear or branched $C_1-C_5$ alkyl, linear or branched $C_1-C_5$ haloalkyl, and halogen.

Representative pyridines include lutidine (including 2,3-; 2,4-; 2,5-; 2,6-; 3,4-; and 3,5-substituted), picoline (including 2-, 3-, or 4-substituted), 2,6-di-t-butylpyridine, and 2,4-di-t-butylpyridine.

Representative arsines include triphenylarsine, triethylarsine, and triethoxysilylarsine.

Representative stibines include triphenylstibine and trithiophenylstibine.

Suitable amine ligands can be selected from amines of the formula N($R^{8'}$)$_3$, wherein $R^{8'}$ independently represents hydrogen, linear and branched $C_1-C_{20}$ alkyl, linear and branched $C_1-C_{20}$ haloalkyl, substituted and unsubstituted C₃–C₂₀ cycloalkyl, substituted and unsubstituted C₆–C₁₈ aryl, and substituted and unsubstituted C₇–C₁₈ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative amines include but are not limited to ethylamine, triethylamine, diisopropylamine, tributylamine, N,N-dimethylaniline, N,N-dimethyl-4-t-butylaniline, N,N-dimethyl-4-t-octylaniline, and N,N-dimethyl-4-hexadecylaniline.

The organophosphorus containing ligands include phosphines, phosphites, phosphonites, phosphinites and phosphorus containing compounds of the formula:

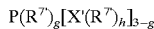

wherein X' is oxygen, nitrogen, or silicon, $R^{7'}$ is as defined above and each $R^{7'}$ substituent is independent of the other, g is 0, 1, 2, or 3, and h is 1, 2, or 3, with the proviso that when X' is a silicon atom, h is 3, when X' is an oxygen atom h is 1, and when X' is a nitrogen atom, h is 2. When g is 0 and X' is oxygen, any two or 3 of $R^{7'}$ can be taken together with the oxygen atoms to which they are attached to form a cyclic moiety. When g is 3 any two of $R^{7'}$ can be taken together with the phosphorus atom to which they are attached to represent a phosphacycle of the formula:

wherein $R^{7'}$ is as previously defined and h' is an integer from 4 to 11.

The organophosphorus compounds can also include bidentate phosphine ligands of the formulae:

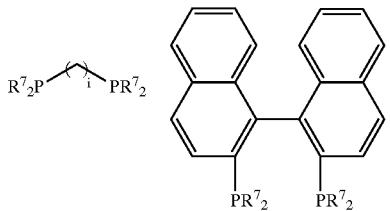

wherein $R^7$ is as previously defined and i is 0, 1, 2, or 3 are also contemplated herein.

Representative phosphine ligands include, but are not limited to trimethylphosphine, triethylphosphine, tri-n-propylphosphine, triisopropylphosphine, tri-n-butylphosphine, tri-sec-butylphosphine, tri-i-butylphosphine, tri-t-butylphosphine, tricyclopentylphosphine, triallylphosphine, tricyclohexylphosphine, triphenylphosphine, trinaphthylphosphine, tri-p-tolylphosphine, tri-o-tolylphosphine, tri-m-tolylphosphine, tribenzylphosphine, tri(p-trifluoromethylphenyl)phosphine, tris(trifluoromethyl) phosphine, tri(p-fluorophenyl)phosphine, tri(p-trifluoromethylphenyl)phosphine, allyldiphenylphosphine, benzyldiphenylphosphine, bis(2-furyl)phosphine, bis(4-methoxyphenyl)phenylphosphine, bis(4-methylphenyl)phosphine, bis(3,5-bis(trifluoromethyl)phenyl)phosphine, t-butylbis(trimethylsilyl)phosphine, t-butyldiphenylphosphine, cyclohexyldiphenylphosphine, diallylphenylphosphine, dibenzylphosphine, dibutylphenylphosphine, dibutylphosphine, di-t-butylphosphine, dicyclohexylphosphine, diethylphenylphosphine, di-i-butylphosphine, dimethylphenylphosphine, dimethyl(trimethylsilyl) phosphine, diphenylphosphine, diphenylpropylphosphine, diphenyl(p-tolyl)phosphine, diphenyl(trimethylsilyl) phosphine, diphenylvinylphosphine, divinylphenylphosphine, ethyldiphenylphosphine, (2-methoxyphenyl)methyl phenylphosphine, tri-n-octylphosphine, tris(3,5-bis(trifluoromethyl)phenyl) phosphine, tris(3-chlorophenyl)phosphine, tris(4-chlorophenyl)phosphine, tris(2,6-dimethoxyphenyl) phosphine, tris(3-fluorophenyl)phosphine, tris(2-furyl) phosphine, tris(2-methoxyphenyl)phosphine, tris(3-methoxyphenyl)phosphine, tris(4-methoxyphenyl) phosphine, tris(3-methoxypropyl)phosphine, tris(2-thienyl) phosphine, tris(2,4,6-trimethylphenyl)phosphine, tris (trimethylsilyl)phosphine, isopropyldiphenylphosphine, dicyclohexylphenylphosphine, (+)-neomenthyldiphenylphosphine, tribenzylphosphine, diphenyl(2-methoxyphenyl)phosphine, diphenyl (pentafluorophenyl)phosphine, bis(pentafluorophenyl) phenylphosphine, and tris(pentafluorophenyl)phosphine.

Exemplary bidentate phosphine ligands include but are not limited to(R)-(+)-2,2'-Bis(diphenylphosphino)-1,1'-binaphthyl; bis(dicyclohexylphosphino)methane; bis (dicyclohexylphosphino)ethane; bis(diphenylphosphino) methane; bis(diphenylphosphino)ethane.

The phosphine ligands can also be selected from phosphine compounds that are water soluble thereby imparting the resulting catalysts with solubility in aqueous media. Selected phosphines of this type include but are not limited to carboxylic substituted phosphines such as 4-(diphenylphosphine)benzoic acid, and 2-(diphenylphosphine)benzoic acid, sodium 2-(dicyclohexylphosphino)ethanesulfonate, 4,4'-(phenylphosphinidene)bis(benzene sulfonic acid) dipotassium salt, 3,3',3''-phosphinidynetris(benzene sulfonic acid) trisodium salt, 4-(dicyclohexylphosphino)-1,1-dimethylpiperidinium chloride, 4-(dicyclohexylphosphino)-1,1-dimethylpiperidinium iodide, quaternary amine-functionalized salts of phosphines such as 2-(dicyclohexylphosphino)-N,N,N-trimethylethanaminium chloride, 2,2'-(cyclohexylphosphinidene)bis[N,N,N-trimethylethanaminium dichloride, 2,2'-(cyclohexylphosphinidene)bis(N,N,N-trimethylethanaminium) diiodide, and 2-(dicyclohexylphosphino)-N,N,N-trimethylethanaminium iodide.

Examples of phosphite ligands include but are not limited to trimethylphosphite, diethylphenylphosphite, triethylphosphite, tris(2,4-di-t-butylphenyl)phosphite, tri-n-propylphosphite, triisopropylphosphite, tri-n-butylphosphite, tri-sec-butylphosphite, triisobutylphosphite, tri-t-butylphosphite, dicyclohexylphosphite, tricyclohexylphosphite, triphenylphosphite, tri-p-tolylphosphite, tris(p-trifluoromethylphenyl)phosphite, benzyldiethylphosphite, and tribenzylphosphite.

Examples of phosphinite ligands include but are not limited to methyl diphenylphosphinite, ethyl diphenylphosphinite, isopropyl diphenylphosphinite, and phenyl diphenylphosphinite.

Examples of phosphonite ligands include but are not limited to diphenyl phenylphosphonite, dimethyl phenylphosphonite, diethyl methylphosphonite, diisopropyl phenylphosphonite, and diethyl phenylphosphonite.

Representative labile neutral electron donor ligands (L") are reaction diluent, reaction monomers, DMF, DMSO, dienes including $C_4$ to $C_{10}$ aliphatic and $C_4$ to $C_{10}$ cycloaliphatic dienes representative dienes include butadiene, 1,6-hexadiene, and cyclooctadiene (COD), water, chlorinated alkanes, alcohols, ethers, ketones, nitriles, arenes, phosphine oxides, organic carbonates and esters.

Representative chlorinated alkanes include but are not limited to dichloromethane, 1,2-dichloroethane, and carbon tetrachloride.

Suitable alcohol ligands can be selected from alcohols of the formula $R^{9'}OH$, wherein $R^{9'}$ represents linear and branched $C_1$–$C_{20}$ alkyl, linear and branched $C_1$–$C_{20}$ haloalkyl, substituted and unsubstituted $C_3$–$C_{20}$ cycloalkyl, substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative alcohols include but are not limited to methanol, ethanol, n-propanol, isopropanol, butanol, hexanol, t-butanol, neopentanol, phenol, 2,6-di-i-propylphenol, 4-t-octylphenol, 5-norbornene-2-methanol, and dodecanol.

Suitable ether ligands and thioether ligands can be selected from ethers and thioethers of the formulae ($R^{10'}$—O—$R^{10'}$) and ($R^{10'}$—S—$R^{10'}$), respectively, wherein $R^{10'}$ independently represents linear and branched $C_1$–$C_{10}$ alkyl radicals, linear and branched $C_1$–$C_{20}$ haloalkyl, substituted and unsubstituted $C_3$–$C_{20}$ cycloalkyl, linear and branched $C_1$–$C_{20}$ alkoxy substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine, taken together along with the oxygen or sulfur atom to which they are attached to form a cyclic ether or cyclic thioether. Representative ethers include but are not limited to dimethyl ether, dibutyl ether, methyl-t-butyl ether, di-i-propyl ether, diethyl ether, dioctyl ether, 1,4-dimethoxyethane, THF, 1,4-dioxane and tetrahydrothiophene.

Suitable ketone ligands are represented by ketones of the formula $R^{11'}C(O)R^{11'}$ wherein $R^{11'}$ independently represents hydrogen, linear and branched $C_1$–$C_{20}$ alkyl, linear and branched $C_1$–$C_{20}$ haloalkyl, substituted and unsubstituted $C_3$–$C_{20}$ cycloalkyl, substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative ketones include but are not limited to acetone, methyl ethyl ketone, cyclohexanone, and benzophenone.

The nitrile ligands can be represented by the formula $R^{12'}CN$, wherein $R^{12'}$ represents hydrogen, linear and branched $C_1$–$C_{20}$ alkyl, linear and branched $C_1$–$C_{20}$ haloalkyl, substituted and unsubstituted $C_3$–$C_{20}$ cycloalkyl, substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative nitriles include but are not limited to acetonitrile, propionitrile, benzonitrile, benzyl cyanide, and 5-norbornene-2-carbonitrile.

The arene ligands can be selected from substituted and unsubstituted $C_6$–$C_{12}$ arenes containing monosubstitution or multisubstitution, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative arenes include but are not limited to toluene, benzene, o-, m-, and p-xylenes, mesitylene, fluorobenzene, o-difluorobenzene, p-difluorobenzene, chlorobenzene, pentafluorobenzene, o-dichlorobenzene, and hexafluorobenzene.

Suitable trialkyl and triaryl phosphine oxide ligands can be represented by phosphine oxides of the formula P(O)$(R^{13'})_3$, wherein $R^{13'}$ independently represents linear and branched $C_1$–$C_{20}$ alkyl, linear and branched $C_1$–$C_{20}$ haloalkyl, substituted and unsubstituted $C_3$–$C_{20}$ cycloalkyl, linear and branched $C_1$–$C_{20}$ alkoxy, linear and branched $C_1$–$C_{20}$ haloalkoxy, substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative phosphine oxides include but are not limited to triphenylphosphine oxide, tributylphosphine oxide, trioctylphosphine oxide, tributylphosphate, and tris(2-ethylhexyl)phosphate.

Representative carbonates include but are not limited to ethylene carbonate and propylene carbonate.

Representative esters include but are not limited to ethyl acetate and i-amyl acetate.

WCA Description

The weakly coordinating counteranion complex, [WCA], of Formula I can be selected from borates and aluminates, boratobenzene anions, carborane and halocarborane anions.

The borate and aluminate weakly coordinating counteranions are represented by Formulae II and III below:

$$[M'(R^{24'})(R^{25'})(R^{26'})(R^{27'})]^- \qquad \text{II}$$

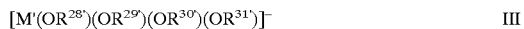

$$[M'(OR^{28'})(OR^{29'})(OR^{30'})(OR^{31'})]^- \qquad \text{III}$$

wherein in Formula II M' is boron or aluminum and $R^{24'}$, $R^{25'}$, $R^{26'}$, and $R^{27'}$ independently represent fluorine, linear and branched $C_1$–$C_{10}$ alkyl, linear and branched $C_1$–$C_{10}$ alkoxy, linear and branched $C_3$–$C_5$ haloalkenyl, linear and branched $C_3$–$C_{12}$ trialkylsiloxy, $C_{18}$–$C_{36}$ triarylsiloxy, substituted and unsubstituted $C_6$–$C_{30}$ aryl, and substituted and unsubstituted $C_6$–$C_{30}$ aryloxy groups wherein $R^{24'}$ to $R^{27'}$ can not all simultaneously represent alkoxy or aryloxy groups. When substituted the aryl groups can be monosubstituted or multisubstituted, wherein the substituents are independently selected from linear and branched $C_1$–$C_5$ alkyl, linear and branched $C_1$–$C_5$ haloalkyl, linear and branched $C_1$–$C_5$ alkoxy, linear and branched $C_1$–$C_5$ haloalkoxy, linear and branched $C_1$–$C_{12}$ trialkylsilyl, $C_6$–$C_{18}$ triarylsilyl, and halogen selected from chlorine, bromine, and fluorine. In another embodiment, the halogen is fluorine.

Representative borate anions under Formula II include but are not limited to tetrakis(pentafluorophenyl)borate, tetrakis (3,5-bis(trifluoromethyl)phenyl)borate, tetrakis(2-fluorophenyl)borate, tetrakis(3-fluorophenyl)borate, tetrakis (4-fluorophenyl)borate, tetrakis(3,5-difluorophenyl)borate, tetrakis(2,3,4,5-tetrafluorophenyl)borate, tetrakis(3,4,5,6-tetrafluorophenyl)borate, tetrakis(3,4,5-trifluorophenyl) borate, methyltris(perfluorophenyl)borate, ethyltris (perfluorophenyl)borate, phenyltris(perfluorophenyl)borate, tetrakis(1,2,2-trifluoroethylenyl)borate, tetrakis(4-tri-i-propylsilyltetrafluorophenyl)borate, tetrakis(4-dimethyl-tert-butylsilyltetrafluorophenyl)borate, (triphenylsiloxy)tris (pentafluorophenyl)borate, (octyloxy)tris (pentafluorophenyl)borate, tetrakis[3,5-bis[1-methoxy-2,2,2-trifluoro-1-(trifluoromethyl)ethyl]phenyl]borate, tetrakis [3-[1-methoxy-2,2,2-trifluoro-1-(trifluoromethyl)ethyl]-5-(trifluoromethyl)phenyl]borate, and tetrakis[3-[2,2,2-trifluoro-1-(2,2,2-trifluoroethoxy)-1-(trifluoromethyl) ethyl]-5-(trifluoromethyl)phenyl]borate.

Representative aluminate anions under Formula II include but are not limited to tetrakis(pentafluorophenyl)aluminate, tris(perfluorobiphenyl)fluoroaluminate, (octyloxy)tris (pentafluorophenyl)aluminate, tetrakis(3,5-bis (trifluoromethyl)phenyl)aluminate, and methyltris (pentafluorophenyl)aluminate.

In Formula III M' is boron or aluminum, $R^{28'}$, $R^{29'}$, $R^{30'}$, and $R^{31'}$ independently represent linear and branched $C_1$–$C_{10}$ alkyl, linear and branched $C_1$–$C_{10}$ haloalkyl, $C_2$–$C_{10}$ haloalkenyl, substituted and unsubstituted $C_6$–$C_{30}$ aryl, and substituted and unsubstituted $C_7$–$C_{30}$ aralkyl groups, subject to the proviso that at least three of $R^{28'}$ to $R^{31'}$ must contain a halogen containing substituent. When substituted the aryl and aralkyl groups can be monosubstituted or multisubstituted, wherein the substituents are independently selected from linear and branched $C_1$–$C_5$ alkyl, linear and branched $C_1$–$C_5$ haloalkyl, linear and branched $C_1$–$C_5$ alkoxy, linear and branched $C_1$–$C_{10}$ haloalkoxy, and halogen selected from chlorine, bromine, and fluorine. In another embodiment, the halogen is fluorine. The groups $OR^{28'}$ and $OR^{29'}$ can be taken together to form a chelating substituent represented by —O—$R^{32'}$—O—, wherein the oxygen atoms are bonded to M' and $R^{32'}$ is a divalent radical selected from substituted and unsubstituted $C_6$–$C_{30}$ aryl and substituted and unsubstituted $C_7$–$C_{30}$ aralkyl. In one embodiment, the oxygen atoms are bonded, either directly or through an alkyl group, to the aromatic ring in the ortho or meta position. When substituted the aryl and aralkyl groups can be monosubstituted or multisubstituted, wherein the substituents are independently selected from linear and branched $C_1$–$C_5$ alkyl, linear and branched $C_1$–$C_5$ haloalkyl, linear and branched $C_1$–$C_5$ alkoxy, linear and branched $C_1$–$C_{10}$ haloalkoxy, and halogen selected from chlorine, bromine, and fluorine. In another embodiment, the halogen is fluorine. Representative structures of divalent $R^{32'}$ radicals are illustrated below:

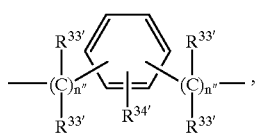

-continued

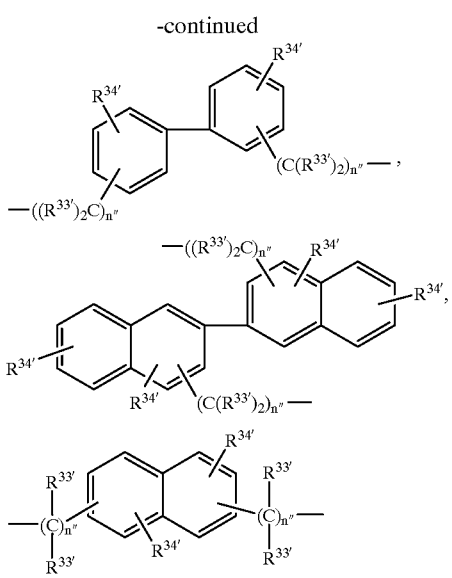

wherein $R^{33'}$ independently represents hydrogen, linear and branched $C_1$–$C_5$ alkyl, linear and branched $C_1$–$C_5$ haloalkyl, and halogen selected from chlorine, bromine, and fluorine (in another embodiment, the halogen is fluorine); $R^{34'}$ can be a monosubstituent or taken up to four times about each aromatic ring depending on the available valence on each ring carbon atom and independently represents hydrogen, linear and branched $C_1$–$C_5$ alkyl, linear and branched $C_1$–$C_5$ haloalkyl, linear and branched $C_1$–$C_5$ alkoxy, linear and branched $C_1$–$C_{10}$ haloalkoxy, and halogen selected from chlorine, bromine, and fluorine (in one embodiment, the halogen is fluorine); and n" independently represents an integer from 0 to 6. It should be recognized that when n" is 0 the oxygen atom in the formula —O—$R^{32'}$—O— is bonded directly to a carbon atom in the aromatic ring represented by $R^{32'}$. In the above divalent structural formulae the oxygen atom(s), i.e., when n" is 0, and the methylene or substituted methylene group(s), —(C($R^{33'}$)$_2$)$_{n''}$—, are, in one embodiment, located on the aromatic ring in the ortho or meta positions. Representative chelating groups of the formula —O—$R^{32'}$—O— include but are not limited to are 2,3,4,5-tetrafluorobenzenediolate (—OC$_6$F$_4$O—), 2,3,4,5-tetrachlorobenzenediolate (—OC$_6$Cl$_4$O—), and 2,3,4,5,-tetrabromobenzenediolate (—OC$_6$Br$_4$O—), and bis (1,1'-biterafluorophenyl-2,2'-diolate).

Representative borate anions under Formula III include but are not limited to [B(OC(CF$_3$)$_3$)$_4$]$^-$, [B(OC(CF$_3$)$_2$ (CH$_3$))$_4$]$^-$, [B(OC(CF$_3$)$_2$H)$_4$]$^-$, [B(OC(CF$_3$)(CH$_3$)H)$_4$]$^-$, [Al (OC(CF$_3$)$_2$Ph)$_4$]$^-$, [B(OCH$_2$(CF$_3$)$_2$)$_4$]$^-$, [Al(OC(CF$_3$)$_2$ C$_6$H$_4$CH$_3$)$_4$]$^-$, [Al(OC(CF$_3$)$_3$)$_4$]$^-$, [Al(OC(CF$_3$)(CH$_3$)H)$_4$]$^-$, [Al(OC(CF$_3$)$_2$H)$_4$]$^-$, [Al(OC(CF$_3$)$_2$C$_6$H$_4$-4-i-Pr)$_4$]$^-$, [Al(OC (CF$_3$)$_2$C$_6$H$_4$-4-t-butyl)$_4$]$^-$, [Al(OC(CF$_3$)$_2$C$_6$H$_4$-4-SiMe$_3$)$_4$]$^-$, [Al(OC(CF$_3$)$_2$C$_6$H$_4$-4-Si-i-Pr$_3$)$_4'$]$^-$, [Al(OC (CF$_3$)$_2$C$_6$H$_2$-2,6-(CF$_3$)$_2$-4-Si-i-Pr$_3$)$_4$]$^-$, [Al(OC(CF$_3$)$_2$C$_6$H$_3$-3,5-(CF$_3$)$_2$)$_4$]$^-$, [Al(OC(CF$_3$)$_2$C$_6$H$_2$-2,4,6-(CF$_3$)$_3$)$_4$]$^-$, and [Al(OC(CF$_3$)$_2$C$_6$F$_5$)$_4$]$^-$.

The boratobenzene anions useful as the weakly coordinating counteranion can be represented by Formula IV below:

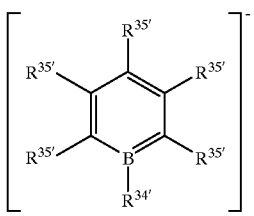

IV wherein $R^{34'}$ is selected from fluorine, fluorinated hydrocarbyl, perfluorocarbyl, and fluorinated and perfluorinated ethers. As used here and throughout the specification, the term halohydrocarbyl means that at least one hydrogen atom on the hydrocarbyl radical, e.g., alkyl, alkenyl, alkynyl, cycloalkyl, aryl, and aralkyl groups, is replaced with a halogen atom selected from chlorine, bromine, iodine, and fluorine (e.g., haloalkyl, haloalkenyl, haloalkynyl, halocycloalkyl, haloaryl, and haloaralkyl). The term fluorohydrocarbyl means that at least one hydrogen atom on the hydrocarbyl radical is replaced by fluorine. The degree of halogenation can range from at least one hydrogen atom being replaced by a halogen atom (e.g., a monofluoromethyl group) to full halogenation (perhalogenation) wherein all hydrogen atoms on the hydrocarbyl group have been replaced by a halogen atom (e.g., perhalocarbyl such as trifluoromethyl (perfluoromethyl)). The fluorinated hydrocarbyl and perfluorocarbyl radicals contain, in one embodiment, 1 to 24 carbon atoms. In another embodiment, the fluorinated hydrocarbyl and perfluorocarbyl radicals contain 1 to 12 carbon atoms. In yet another embodiment, fluorinated hydrocarbyl and perfluorocarbyl radicals contain 6 carbon atoms and can be linear or branched, cyclic, or aromatic. The fluorinated hydrocarbyl and perfluorocarbyl radicals include but are not limited to fluorinated and perfluorinated linear and branched $C_1$–$C_{24}$ alkyl, fluorinated and perfluorinated $C_3$–$C_{24}$ cycloalkyl, fluorinated and perfluorinated $C_2$–$C_{24}$ alkenyl, fluorinated and perfluorinated $C_3$–$C_{24}$ cycloalkenyl, fluorinated and perfluorinated $C_6$–$C_{24}$ aryl, and fluorinated and perfluorinated $C_7$–$C_{24}$ aralkyl. The fluorinated and perfluorocarbyl ether substituents are represented by the formulae —$(CH_2)_mOR^{36'}$, or —$(CF_2)_mOR^{36'}$ respectively, wherein $R^{36'}$ is a fluorinated or perfluorocarbyl group as defined above, m is and integer of 0 to 5. It is to be noted that when m is 0 the oxygen atom in the ether moiety is directly bonded attached to the boron atom in the boratobenzene ring.

In one embodiment, $R^{34'}$ radicals include those that are electron withdrawing in nature such as, for example, fluorinated and perfluorinated hydrocarbyl radicals selected from trifluoromethyl, perfluoroethyl, perfluoropropyl, perfluoroisopropyl, pentafluorophenyl and bis(3,5-trifluoromethyl)phenyl.

$R^{35'}$ independently represents hydrogen, halogen, perfluorocarbyl, and silylperfluorocarbyl radicals, wherein the perfluorocarbyl and silylperfluorocarbyl are as defined previously. In one embodiment, the halogen groups are selected from chlorine, fluorine. In another embodiment, the halogen is fluorine. When $R^{35'}$ is halogen, perfluorocarbyl, and/or silylperfluorocarbyl, the radical(s) are, in one embodiment, ortho or para to the boron atom in the boratobenzene ring. In another embodiment, when $R^{35'}$ is halogen, perfluorocarbyl, and/or silylperfluorocarbyl, the radical(s) are para to the boron atom in the boratobenzene ring.

Representative boratobenzene anions include but are not limited to [1,4-dihydro-4-methyl-1-(pentafluorophenyl)]-2-borate, 4-(1,1-dimethyl)-1,2-dihydro-1-(pentafluorophenyl)-2-borate, 1-fluoro-1,2-dihydro-4-(pentafluorophenyl)2-borate, and 1-[3,5-bis(trifluoromethyl)phenyl]-1,2-dihydro-4-(pentafluorophenyl)-2-borate.

The carborane and halocarborane anions useful as the weakly coordinating counteranion include but are not limited to $CB_{11}(CH_3)_{12}^-$, $CB_{11}H_{12}^-$, $1\text{-}C_2H_5CB_{11}H_{11}^-$, $1\text{-}Ph_3SiCB_{11}H_{11}^-$, $1\text{-}CF_3CB_{11}H_{11}^-$, $12BrCB_{11}H_{11}^-$, $12\text{-}BrCB_{11}H_{11}^-$, $12\text{-}BrCB_{11}H_{11}^-$, $7,12\text{-}Br_2CB_{11}H_{10}^-$, $12\text{-}ClCB_{11}H_{11}^-$, $7,12\text{-}Cl_2CB_{11}H_{10}^-$, $1\text{-}H\text{-}CB_{11}F_{11}^-$, $1\text{-}CH_3\text{-}CB_{11}F_{11}^-$, $1\text{-}CF_3\text{-}CB_{11}F_{11}^-$, $12\text{-}CB_{11}H_{11}F^-$, $7,12\text{-}CB_{11}H_{11}F_2^-$, $7,9,12\text{-}CB_{11}H_{11}F_3^-$, $CB_{11}H_6Br_6^-$, $6\text{-}CB_9H_9F^-$, $6,8\text{-}CB_9H_8F_2^-$, $6,7,8\text{-}CB_9H_7F_3^-$, $6,7,8,9\text{-}CB_9H_6F_4^-$, $2,6,7,8,9\text{-}CB_9H_5F_5^-$, $CB_9H_5Br_5^-$, $CB_{11}H_6Cl_6^-$, $CB_{11}H_6F_6^-$, $CB_{11}H_6F_6^-$, $CB_{11}H_6I_6^-$, $CB_{11}H_6Br_6^-$, $6,7,9,10,11,12\text{-}CB_{11}H_6F_6^-$, $2,6,7,8,9,10\text{-}CB_9H_5F_5^-$, $1\text{-}H\text{-}CB_9F_9^-$, $12\text{-}CB_{11}H_{11}(C_6H_5)^-$, $1\text{-}C_6F_5\text{-}CB_{11}H_5Br_6^-$, $CB_{11}Me_{12}^-$, $CB_{11}(CF_3)_{12}^-$, $Co(B_9C_2H_{11})_2^-$, $CB_{11}(CH_3)_{12}^-$, $CB_{11}(C_4H_9)_{12}^-$, $CB_{11}(C_6H_{13})_{12}^-$, $Co(C_2B_9H_{11})_2^-$, $CO(Br_3C_2B_9H_8)_2^-$ and dodecahydro-1-carbadodecaborate.

Catalyst Preparation

The catalysts of Formula I can be prepared as a preformed single component catalyst in solvent or can be prepared in situ by admixing the catalyst precursor components in the desired monomer to be polymerized.

The single component catalyst of Formula I can be prepared by admixing the catalyst precursors in an appropriate solvent, allowing the reaction to proceed under appropriate temperature conditions, and isolating the catalyst product. In another embodiment, a Group 10 metal pro-catalyst is admixed with a Group 15 electron donor compound and/or a labile neutral electron donor compound, and a salt of a weakly coordinating anion in an appropriate solvent to yield the preformed catalyst complex set forth under Formula I above. In another embodiment a Group 10 metal pro-catalyst containing a Group 15 electron donor ligand is admixed with a salt of a weakly coordinating anion in an appropriate solvent to yield the preformed catalyst complex.

The catalyst preparation reactions are carried out in solvents that are inert under the reaction conditions. Examples of solvents suitable for the catalyst preparation reaction include but are not limited to alkane and cycloalkane solvents such as pentane, hexane, heptane, and cyclohexane; halogenated alkane solvents such as dichloromethane, chloroform, carbon tetrachloride, ethylchloride, 1,1-dichloroethane, 1,2-dichloroethane, 1-chloropropane, 2-chloropropane, 1-chlorobutane, 2-chlorobutane, 1-chloro-2-methylpropane, and 1-chloropentane; ethers such as THF and diethylether; aromatic solvents such as benzene, xylene, toluene, mesitylene, chlorobenzene, and o-dichlorobenzene; and halocarbon solvents such as Freon® 112; and mixtures thereof. In one embodiment, solvents include, for example, benzene, fluorobenzene, o-difluorobenzene, p-difluorobenzene, pentafluorobenzene, hexafluorobenzene, o-dichlorobenzene, chlorobenzene, toluene, o-, m-, and p-xylenes, mesitylene, cyclohexane, THF, and dichloromethane.

A suitable temperature range for carrying out the reaction is from about −80° C. to about 150° C. In another embodiment, the temperature range for carrying out the reaction is from about −30° C. to about 100° C. In yet another embodiment, the temperature range for carrying out the reaction is from about 0° C. to about 65° C. In still yet another embodiment, the temperature range for carrying out the reaction is from about 10° C. to about 40° C. Pressure is not critical but may depend on the boiling point of the solvent employed, i.e. sufficient pressure to maintain the solvent in the liquid phase. Reaction times are not critical, and can range from several minutes to 48 hours. In one embodiment, the reactions are carried out under inert atmosphere such as nitrogen or argon.

The reaction is carried out by dissolving the pro-catalyst in a suitable solvent and admixing the appropriate ligand(s) and the salt of the desired weakly coordinating anion with the dissolved pro-catalyst, and optionally heating the solution until the reaction is complete. The preformed single component catalyst can be isolated or can be used directly by adding aliquots of the preformed catalyst in solution to the polymerization medium. Isolation of the product can be accomplished by standard procedures, such as evaporating the solvent, washing the solid with an appropriate solvent, and then recrystallizing the desired product. The molar ratios of catalyst components employed in the preparation the preformed single component catalyst of the invention is based on the metal contained in the pro-catalyst component. In one embodiment, the molar ratio of pro-catalyst/Group 15 electron donor component/WCA salt is 1:1–10:1–100, In another embodiment, the molar ratio of pro-catalyst/Group 15 electron donor component/WCA salt is 1:1–5:1–20. In yet another embodiment, the molar ratio of pro-catalyst/Group 15 electron donor component/WCA salt is 1:1–2:1–5. In embodiments of the invention where the pro-catalyst is ligated with a Group 15 electron donor ligand and/or a labile neutral electron donor ligand the molar ratio of pro-catalyst (based on the metal content) to WCA salt is 1:1 –100. In another embodiment, this ratio is 1:1–20. In yet another embodiment, this ratio is 1:1–5.

In one embodiment, a Group 10 metal pro-catalyst dimer of the formula [R'MA']$_2$ is admixed with a Group 15 electron donor compound, (L'), and a salt of a suitable weakly coordinating anion in an appropriate solvent to produce the single component catalyst product as shown in equation (1) below.

[R'MA']$_2$+xL'+yL"+[WCA] salt→[R'M(L')$_x$(L")$_y$]$_b$[WCA]$_d$     1.

Suitable pro-catalyst dimers of the formula [R'MA']$_2$ include but are not limited to the following compositions (allyl) palladiumtrifluoroacetate dimer, (allyl)palladiumchloride dimer, (crotyl)palladiumchloride dimer, (allyl) palladiumiodide dimer, (β-pinenyl)palladiumchloride dimer, methallylpalladium chloride dimer, 1,1-dimethylallylpalladium chloride dimer, and (allyl) palladiumacetate dimer.

In another embodiment, a ligated Group 10 metal pro-catalyst of the formula [R'M(L")$_y$A'] is admixed with a Group 15 electron donor compound, (L'), and a salt of a suitable weakly coordinating anion in an appropriate solvent to produce the single component catalyst product as shown in equation (2) below.

[R'M(L")$_y$A']+xL'+[WCA] salt→[R'M(L')$_x$(L")$_y$]$_b$[WCA]$_d$     2.

A representative pro-catalyst of the formula [R'M(L")$_y$A'] includes but is not limited to (COD)palladium (methyl) chloride.

In a further embodiment, a Group 10 metal ligated pro-catalyst of the formula [R'M(L')$_x$A'] containing the Group 15 electron donor ligand (L') is admixed with a salt of a suitable weakly coordinating anion in an appropriate solvent to produce the single component catalyst product as shown in equation (3) below.

[R'M(L')$_x$A']+yL"+[WCA] salt→[R'M(L')$_x$(L")$_y$]$_b$[WCA]$_d$     3.

Suitable pro-catalysts of the formula [R'M(L')$_x$A'] include but are not limited to the following compositions:
(allyl)palladium(tricyclohexylphosphine)chloride,
(allyl)palladium(tricyclohexylphosphine)triflate,
(allyl)palladium(triisopropylphosphine)triflate,
(allyl)palladium(tricyclopentylphosphine)triflate,
(allyl)palladium(tricyclohexylphosphine)trifluoroacetate (also referred to herein as Allyl Pd-PCy$_3$TFA),
(allyl)palladium(tri-o-tolylphosphine)chloride,
(allyl)palladium(tri-o-tolylphosphine)triflate,
(allyl)palladium(tri-o-tolylphosphine)nitrate,
(allyl)palladium(tri-o-tolylphosphine)acetate,
(allyl)palladium(triisopropylphosphine)triflimide,
(allyl)palladium(tricyclohexylphosphine)triflimide,
(allyl)palladium(triphenylphosphine)triflimide,
(allyl)palladium(trinaphthylphosphine)triflate,
(allyl)palladium(tricyclohexylphosphine) p-tolylsulfonate,
(allyl)palladium(triphenylphosphine)triflate,
(allyl)palladium(triisopropylphosphine)trifluoroacetate,
(allyl)platinum(tricyclohexylphosphine)chloride,
(allyl)platinum(tricyclohexylphosphine)triflate,
(1,1-dimethylallyl)palladium(triisopropylphosphine) trifluoroacetate.
(2-chloroallyl)palladium(triisopropylphosphine) trifluoroacetate,
(crotyl)palladium(triisopropylphosphine)triflate,
(crotyl)palladium(tricyclohexylphosphine)triflate,
(crotyl)palladium(tricyclopentylphosphine)triflate,
(methallyl)palladium(tricyclohexylphosphine)triflate,
(methallyl)palladium(triisopropylphosphine)triflate,
(methallyl)palladium(tricyclopentylphosphine)triflate,
(methallyl)palladium(tricyclohexylphosphine)chloride,
(methallyl)palladium(triisopropylphosphine)chloride,
(methallyl)palladium(tricyclopentylphosphine)chloride,
(methallyl)palladium(tricyclohexylphosphine)triflimide,
(methallyl)palladium(triisopropylphosphine)triflimide,
(methallyl)palladium(tricyclopentylphosphine)triflimide,
(methallyl)palladium(tricyclohexylphosphine) trifluoroacetate,
(methallyl)palladium(triisopropylphosphine) trifluoroacetate,
(methallyl)palladium(tricyclopentylphosphine) trifluoroacetate,
(methallyl)palladium(tricyclohexylphosphine)acetate,
(methallyl)palladium(triisopropylphosphine) acetate,
(methallyl)palladium(tricyclopentylphosphine)acetate,
(methallyl)nickel(tricyclohexylphosphine)triflate,
{2-[(dimethylamino)methyl]phenyl-C,N-}-palladium (tricyclohexylphosphine)chloride,
[(dimethylamino)methyl]phenyl-C,N-}-palladium (tricyclohexylphosphine)triflate,
(hydrido)palladium bis(tricyclohexylphosphine)triflate,
(hydrido)palladium bis(tricyclohexylphosphine)formate
(hydrido)palladium bis(tricyclohexylphosphine)chloride,
(hydrido)palladium bis(triisopropylphosphine)chloride,
(hydrido)palladium bis(tricyclohexylphosphine)nitrate,
(hydrido)palladium bis(tricyclohexylphosphine) trifluoroacetate, and
(hydrido)palladium bis(triisopropylphosphine)triflate.

Other pro-catalyst components suitable for use in the foregoing process include (Me$_2$NCH$_2$C$_6$H$_4$)Pd(O$_3$SCF$_3$)P (cyclohexyl)$_3$ (i.e., ortho-metallatedphenylmethlyenedimethylamino palladium tricyclohexylphosphine), (allyl)Pd(P-i-Pr$_3$)C$_6$F$_5$, (allyl)Pd (PCy$_3$)C$_6$F$_5$, (CH$_3$)Pd(PMe$_3$)$_2$Cl, (C$_2$H$_5$)Pd(PMe$_3$)$_2$Cl (Ph) Pd(PMe$_3$)$_2$Cl, (CH$_3$)Pd(PMe$_3$)$_2$Br, (CH$_3$)Pd(PMe$_2$Ph)$_2$Cl, ($C_2H_5$)Pd($PMe_3$)$_2$Br, ($C_2H_5$)Pd($PMe_3$)$_2$Br, (Ph)Pd($PMe_3$)$_2$Br, ($CH_3$)Pd($PMe_3$)$NO_3$, ($CH_3$)Pd(P(i-Pr)$_3$)$_2O_3SCCF_3$, ($\eta^1$-benzyl)Pd($PEt_3$)$_2$Cl, (allyl)Pd($PMe_3$)OC(O)$CH_2$CH=$CH_2$, (allyl)Pd($AsPh_3$)Cl, (allyl)Pd($PPh_3$)Cl, (allyl)Pd($SbPh_3$)Cl, (methylallyl)Pd($PPh_3$)Cl, (methylallyl)Pd($AsPh_3$)Cl, (methylallyl)Pd($SbPh_3$)Cl, (methylallyl)Pd($PBu_3$)Cl, and (methylallyl)Pd(P[(OCH$_2$)$_3$]CH)Cl.

In another embodiment, the catalyst can be formed by protonating a pro-catalyst of the formula:

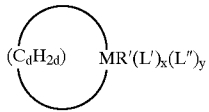

in the presence of a Brønsted acid based WCA salt or an equivalent reaction utilizing a carbonium or silylium based WCA salt to yield an active catalyst as illustrated in Eq. 4.

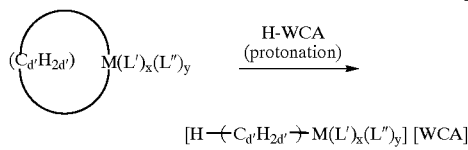

In this embodiment R' is a divalent hydrocarbyl ligand of the formula —($C_{d}H_{2d}$)— that is taken together with the Group 10 metal center M to form a metallacycle where d' represents the number of carbon atoms in the divalent hydrocarbyl backbone and is an integer from 3 to 10. Any of the hydrogen atoms on the divalent hydrocarbyl backbone can be replaced by linear and branched $C_1$–$C_5$ alkyl, linear and branched $C_1$–$C_5$ haloalkyl, $C_5$–$C_{10}$ cycloalkyl, and $C_6$–$C_{10}$ aryl. The cycloalkyl and aryl moieties can optionally be substituted with a halogen substituent selected from bromine, chlorine, fluorine, and iodine. In another embodiment, the halogen is fluorine. In addition, any two or three of the alkyl substituents taken together with the hydrocarbyl backbone carbon atoms to which they are attached can form an aliphatic or aromatic ring system. The rings can be monocyclic, polycyclic, or fused. Protonation occurs at one of the hydrocarbyl/metal center bond interfaces to yield a cation complex with a monovalent hydrocarbyl ligand coordinated to the metal center M.

In another embodiment a Group 10 metal ligated pro-catalyst of the formula [R'M(L')$_x$(L")$_y$A'] containing a Group 15 electron donor ligand (L') and a labile neutral electron donor ligand (L") is admixed with a salt of a suitable weakly coordinating anion in an appropriate solvent to produce the single component catalyst product as shown in equation (5) below.

[R'M(L')$_x$(L")$_y$A']+[WCA] salt→[R'M(L')$_x$(L")$_y$]$_b$[WCA]$_d$   5.

Suitable pro-catalysts of the formula [R'M(L')$_x$(L")$_y$A'] include but are not limited to the following compositions:
[(allyl)Pd(NCCH$_3$)(P-i-Pr$_3$)][B(O$_{2-3,4,5,6}$-Cl$_4$C$_6$)$_2$], [(allyl)Pd(HOCH$_3$)(P-i-Pr$_3$)][B(O$_{2-3,4,5,6}$-Cl$_4$C$_6$)$_2$], [(allyl)Pd(HOCH$_3$)(P-i-Pr$_3$)][B(O$_2$-3,4,5,6-Br$_4$C$_6$)$_2$], [(allyl)Pd(HOCH$_3$)(P-i-Pr$_3$)][B(O$_2$C$_6$H$_4$)$_2$], [(allyl)Pd(OEt$_2$)(P-i-Pr$_3$)][BPh$_4$], [(allyl)Pd(OEt$_2$)(P-i-Pr$_3$)], [SbF$_6$][(allyl)Pd(OEt$_2$)(P-i-Pr$_3$)][BF$_4$], (allyl)Pd(OEt$_2$)(PCy$_3$)][BF$_4$], [(allyl)Pd(OEt$_2$)(PPh$_3$)][BF$_4$], [(allyl)Pd(OEt$_2$)(P-i-Pr$_3$)][PF$_6$], [(allyl)Pd(OEt$_2$)(PCy$_3$)][PF$_6$], [(allyl)Pd(OEt$_2$)(PPh$_3$)][PF$_6$], [(allyl)Pd(OEt$_2$)(P-i-Pr$_3$)][ClO$_4$], [(allyl)Pd(OEt$_2$)(PCy$_3$)][ClO$_4$], [(allyl)Pd(OEt$_2$)(PPh$_3$)][ClO$_4$], [(allyl)Pd(OEt$_2$)(P-i-Pr$_3$)][SbF$_6$], [(allyl)Pd(OEt$_2$)(PCy$_3$)][SbF$_6$], and [(allyl)Pd(OEt$_2$)(PPh$_3$)][SbF$_6$].

In another embodiment of the invention the catalyst of Formula I is generated by reacting a pro-catalyst of the formula [M(L')$_x$(L")$_y$(A')$_2$] with an organometallic compound of aluminum, lithium or magnesium, and a source of a weakly coordinating anion (WCA) or a strong Lewis Acid. In this embodiment the anionic hydrocarbyl ligand (R') on the group 10 metal center (M) is supplied via reaction with the organometallic compound to yield the active catalyst as shown below.

[M(L')$_x$(L")$_y$(A')$_2$]+[WCA] salt or Strong Lewis Acid+organometallic compound→[R'M(L')$_x$(L")$_y$]$_b$[WCA]$_d$   6.

Examples of pro-catalysts suitable for use in this embodiment include:
nickel acetylacetonate,
nickel carboxylates,
nickel (II) chloride,
nickel (II) bromide,
nickel ethylhexanoate,
nickel (II) trifluoroacetate,
nickel (II) hexafluoroacetylacetonate,
NiCl$_2$(PPh$_3$)$_2$,
NiBr$_2$(P(p-tolyl)$_3$)$_2$,
trans-PdCl$_2$(PPh$_3$)$_2$,
palladium (II) bis(trifluoroacetate),
palladium (II) acetylacetonate,
(cyclooctadiene)palladium (II) dichloride,
Pd(acetate)$_2$(PPh$_3$)$_2$,
PdCl$_2$(PPh$_3$)$_2$
PdBr$_2$(PPh$_3$)$_2$
PdBr$_2$(P(p-tolyl)$_3$)$_2$,
PdCl$_2$(P(o-tolyl)$_3$)$_2$,
PdCl$_2$(P(cyclohexyl)$_3$)$_2$,
palladium (II) bromide,
palladium (II) chloride,
palladium (II) iodide,
palladium (II) ethylhexanoate,
dichloro bis(acetonitrile)palladium (II),
dibromo bis(benzonitrile)palladium (II),
platinum (II) chloride,
platinum (II) bromide, and
platinum bis(triphenylphosphine)dichloride.

In general the Group 10 metal pro-catalyst is a nickel (II), platinum (II) or palladium (II) compound containing two anionic leaving groups (A'), which can be readily displaced by the weakly coordinating anion that is provided by the WCA salt or strong Lewis acid described below and can be replaced by hydrocarbyl groups originating from the organometallic compound. The leaving groups can be the same or different. The Group 10 metal pro-catalyst may or may not be ligated.

When the pro-catalyst of this embodiment is not ligated with a Group 15 electron donor component (L'), the Group 15 electron donor ligand can be added to the reaction medium as shown in the following reaction scheme.

[M(L")$_y$(A')$_2$]+xL'+[WCA] salt or Strong Lewis Acid+organometallic compound→[R'M(L')$_x$(L")$_y$]$_b$[WCA]$_d$   7.

The strong Lewis acids suitable for use in this embodiment are selected from compounds of the formula:

M'(R$^{41'}$)$_3$ wherein M' represents aluminum or boron and R$^{41'}$ represents monosubstituted and multisubstituted $C_6$–$C_{30}$ aryl, wherein the substituents on the aryl group are independently selected from halogen (in one embodiment, the halogen is fluorine), linear and branched $C_1$–$C_5$ haloalkyl (in one embodiment, trifluoromethyl), and halogenated and perhalogenated phenyl (in one embodiment, pentafluorophenyl). Examples of such strong Lewis acids include: tris (pentafluorophenyl)boron, tris(3,5-bis(trifluoromethyl) phenyl)boron, tris(2,2',2"-nonafluorobiphenyl)borane, and tris(pentafluorophenyl)aluminum.

The organometallic compound is a hydrocarbyl derivative of silicon, germanium, tin, lithium, magnesium or aluminum. In one embodiment, aluminum derivatives are utilized. The organoaluminum component of the catalyst system is represented by the formula:

$$AlR'_{3-x''}Q_{x''}$$

wherein R' independently represents hydrogen, linear and branched $C_1$–$C_{20}$ alkyl, $C_5$–$C_{10}$ cycloalkyl, linear and branched $C_2$–$C_{20}$ alkenyl, $C_6$–$C_{15}$ cycloalkenyl, allylic ligands or canonical forms thereof, $C_6$–$C_{20}$ aryl, and $C_7$–$C_{30}$ aralkyl, *Q is a halide or pseudohalide selected from chlorine, fluorine, bromine, iodine, linear and unbranched $C_1$–$C_{20}$ alkoxy, $C_6$–$C_{24}$ aryloxy; x" is 0 to 2.5. In another embodiment, x" is 0 to 2. In yet another embodiment, x' is 0 to 1. In one embodiment, trialkylaluminum compounds are used. Examples of suitable organometallic compounds include: methyllithium, sec-butyllithium, n-butyllithium, phenyllithium, butylethylmagnesium, di-n-butylmagnesium, butyloctylmagnesium, trimethylaluminum, triethylaluminum, tri-n-propylaluminum, tri-i-propylaluminum, tri-i-butylaluminum, tri-2-methylbutylaluminum, tri-octylaluminum, diethylaluminum chloride, ethylaluminum dichloride, di-i-butylaluminum chloride, diethylaluminum bromide, ethylaluminum sesquichloride, diethylaluminum ethoxide, diethylaluminum(i-butylphenoxide), and diethylaluminum(2,4-di-tert-butylphenoxide).

Embodiments of the catalyst devoid of a hydrocarbyl containing ligand can be synthesized by reacting a pro-catalyst of the formula [M(A')₂] with the desired ligands and WCA salt in accordance with the following reaction scheme:

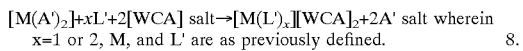

[M(A')₂]+xL'+2[WCA] salt→[M(L')ₓ][WCA]₂+2A' salt wherein x=1 or 2, M, and L' are as previously defined.     8.

Examples of pro-catalyst compounds include palladium (II) bis(acetylacetonate, palladium (acetate)₂, Pd(NO₃)₂, PdCl₂, PdBr₂, and PdI₂.

The foregoing schematic equations (1 to 8) have been presented for illustrative purposes only. While they have been written in balanced form, it should be recognized that an excess of reaction components can be employed without deviating from the spirit of invention. For example, an excess of L', L", A', or WCA salt containing components can be employed in the process of the invention so long as the process is not deleteriously affected.

In a one embodiment the molar ratio of the Group 10 metal/Group 15 electron donor compound/source of a weakly coordinating anion/organometallic compound is 1:1–10:1–100:2–200. In another embodiment, the molar ratio of the Group 10 metal/Group 15 electron donor compound/source of a weakly coordinating anion/ organometallic compound is 1:1–5:1–40:4–100. In yet another embodiment, the molar ratio of the Group 10 metal/Group 15 electron donor compound/source of a weakly coordinating anion/organometallic compound is 1:1–2:2–20:5–50. In embodiments where the Group 10 metal ion source is an adduct containing a Group 15 electron donor compound, no additional Group 15 electron donor compound need be employed. In this embodiment the molar ratio of the Group 10 metal/Group 15 electron donor compound/source of a weakly coordinating anion/ organometallic compound is 1:0:2–20:5–50.

In all of the forgoing embodiments the catalysts of Formula I can be prepared as a preformed single component catalyst in solvent or they can be prepared in situ by admixing the precursor components (ligated or non-ligated Group 10 metal component with leaving group(s), ligand component(s), and WCA source or strong Lewis acid source) in the desired monomer, monomer mixtures, or solutions thereof. It is also possible to admix two or even three of the catalyst precursor components and then add the mixture to the monomer or monomer solution containing the remaining catalyst precursor component(s).

In the equations and formulae set forth above and throughout the specification, R', M, L', L", [WCA], b, d, x, and y are as defined above unless otherwise defined, A' is an anionic leaving group which is defined below, [WCA] salt is a metal salt of the weakly coordinating anion [WCA], and the abbreviations Me, Et, Pr, Bu, Cy, and Ph, as used here and throughout the specification refer to methyl, ethyl, propyl, butyl, cyclohexyl, and phenyl, respectively.

The foregoing Group 10 metal pro-catalyst components are commercially available or can be synthesized by techniques well known in the art.

As described above catalyst complex of Formula I can be formed in situ by combining any of the Group 10 metal pro-catalysts with the desired catalyst system components in monomer. In cases where the Group 10 metal pro-catalyst already contains the desired ligand groups, the pro-catalyst is mixed in monomer along with the WCA salt or the alternative activators such as strong Lewis acids or Brønsted acids. The WCA salt, strong Lewis acid or Brønsted acid serves as the an activator for the pro-catalyst in the presence of monomer. The in situ reactions for preparing the catalysts of Formula I generally follow the same conditions and reaction schemes as outlined for the preparation of the preformed single component catalysts, the principal difference being that the catalysts are formed in monomer in lieu of solvent and that a polymer product is formed.

Leaving Groups

A' represents an anionic leaving group that can be readily displaced by the weakly coordinating anion that is provided by the WCA salt. The leaving group forms a salt with the cation on the WCA salt. Leaving group A' is selected from halogen (i.e., Br, Cl, I, and F), nitrate, triflate (trifluoromethanesulfonate), triflimide (bistrifluoromethanesulfonimide), trifluoroacetate, tosylate, $AlBr_4^-$, $AlF_4^-$, $AlCl_4^-$, $AlF_3O_3SCF_3^-$, $AsCl_6^-$, $SbCl_6^-$, $SbF_6^-$, $PF_6^-$, $BF_4^-$, $ClO_4^-$, $HSO_4^-$, carboxylates, acetates, acetylacetonates, carbonates, aluminates, and borates.

In another embodiment the leaving group can be a hydrocarbyl group or halogenated hydrocarbyl group when a Bronsted acid based WCA salt is utilized as the activator. In this embodiment the activator protonates the hydrocarbyl or halogenated hydrocarbyl forming a neutral moiety. The leaving group moiety is, in one embodiment, selected from the hydride, linear and branched $C_1$–$C_5$ alkyl, linear and branched $C_1$–$C_5$ haloalkyl, $C_5$–$C_{10}$ cycloalkyl, and $C_6$–$C_{10}$ aryl. The cycloalkyl and aryl moieties can optionally be substituted with a halogen substituent selected from bromine, chlorine, fluorine, and iodine. In one embodiment, the halogen is fluorine. In this embodiment, A' is protonated to yield the neutral moiety A'H. Methyl and pentafluorophenyl groups are representative examples of leaving groups under this embodiment.

Halogen leaving groups include chlorine, iodine, bromine and fluorine. The acetates include groups of the formula $R^{38'}C(O)O^-$, and the carbonates include groups of the formula $R^{38'}OC(O)O^-$, wherein $R^{38'}$ represents linear and branched $C_1$–$C_5$ alkyl, linear and branched $C_1$–$C_5$ haloalkyl (in one embodiment, the haloalkyl contains only fluorine), linear or branched $C_1$–$C_5$ alkenyl, $C_6$–$C_{12}$ aryl, optionally monosubstituted or independently multisubstituted with linear and branched $C_1$–$C_5$ alkyl, linear and branched $C_1$–$C_5$ haloalkyl, and halogen (in one embodiment, fluorine).

The aluminate and borate leaving groups can be represented by the formulae $M'(R^{39'})_4^-$, $M'(GR^{39'})_4^-$, $M'(-C{\equiv}CPh)_4$, or a moiety represented by the following structures:

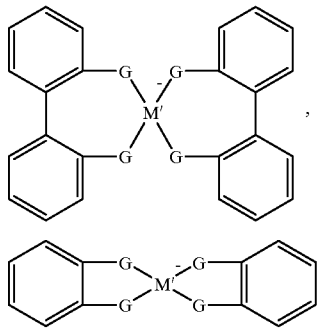

wherein G is a sulfur or oxygen atom Ph represents phenyl and substituted phenyl as defined below, and $R^{39'}$ independently represents linear and branched $C_1$–$C_{10}$ alkyl, linear and branched $C_1$–$C_{10}$ chloro- or bromoalkyl, $C_5$–$C_{10}$ cycloalkyl, substituted and unsubstituted aryl (in one embodiment, phenyl and substituted phenyl), substituted and unsubstituted $C_7$–$C_{20}$ aralkyl (in one embodiment, phenylalkyl and substituted phenylalkyl). By substituted is meant that the aryl or phenyl groups can contain one or more of linear and branched $C_1$–$C_5$ alkyl, linear and branched $C_1$–$C_5$ haloalkyl, chlorine, and bromine substituents, and combinations thereof.

Representative aluminate groups include but are not limited to tetraphenoxyaluminate, tetrakis(cyclohexanolato) aluminate, tetraethoxyaluminate, tetramethoxyaluminate, tetrakis(isopropoxy)aluminate, tetrakis(2-butanolato) aluminate, tetrapentyloxyaluminate, tetrakis(2-methyl-2-propanolato)aluminate, tetrakis(nonyloxy)aluminate, and bis(2-methoxyethanolate-O,O')bis(2-methoxyethanolate-O') aluminate, tetrakis(phenyl)aluminate, tetrakis(p-tolyl) aluminate, tetrakis(m-tolyl)aluminate, tetrakis(2,4-dimethylphenyl)aluminate, and tetrakis(3,5-dimethylphenyl)aluminate.

Representative borate groups include tetraphenylborate, tetrakis(4-methylphenyl)borate, tetrakis(4-chlorophenyl) borate, tetrakis(4-bromophenyl)borate, tetrakis(2-bromo-4-chlorophenyl)borate, butyltriphenylborate, tetrakis(4-methoxyphenyl)borate, tetrakis(phenylethynyl)borate, bis (1,2-benzenediolato)borate, triphenyl(phenylethynyl)borate, bis(tetrafluorobenzenediolate)borate, bis (tetrachlorobenzenediolate)borate, bis (tetrabromobenzenediolate)borate, bis(1,1'-biphenyl-2,2'-diolato)borate, tetrakis(thiophenolyl)borate, bis(3,5-di-tert-butylbenzenediolate)borate, tetrakis(2,4-dimethylphenyl) borate, tetrakis(p-tolyl)borate, tetrakis(3,5-dimethylphenyl) borate, and tetrakis(m-tolyl)borate.

In addition to the anionic leaving groups described above, A' can also be selected from highly fluorinated and perfluorinated alkylsulfonyl and arylsulfonyl containing anions of the formulae $(R^{40'}SO_2)_2CH^-$, $(R^{40'}SO_2)_3C^-$, and $(R^{40'}SO_2)_2N^-$, wherein $R^{40'}$ independently represents linear and branched $C_1$–$C_{20}$ highly fluorinated and perfluorinated alkyl, $C_5$–$C_{15}$ highly fluorinated and perfluorinated cycloalkyl, and highly fluorinated and perfluorinated $C_6$–$C_{22}$ aryl. Optionally, the alkyl and cycloalkyl groups can contain a heteroatom in the chain of cyclic structure, respectively. In one embodiment, the heteroatoms include divalent (non-peroxidic) oxygen (i.e., —O—), trivalent nitrogen, and hexavalent sulfur. Any two of $R^{40'}$ can be taken together to form a ring. When $R^{40'}$ is a cycloalkyl substituent, a heterocycloalkyl substituent, or is taken with another $R^{40'}$ group to form a ring, the ring structures, in one embodiment, contain 5 or 6 atoms, 1 or 2 of which can be heteroatoms.

In the above formulae the term highly fluorinated means that at least 50 percent of the hydrogen atoms bonded to the carbon atoms in the alkyl, cycloalkyl, and aryl moieties are replaced by fluorine atoms. In one embodiment, at least 2 out of every 3 hydrogen atoms on the alkyl, cycloalkyl, and aryl moieties under $R^{40'}$ are replaced by fluorine. In another embodiment, at least 3 out of every 4 hydrogen atoms are replaced by fluorine. In yet another embodiment, all of the hydrogen atoms on the $R^{40'}$ substituent are replaced by fluorine to give the perfluorinated moiety. In addition to or in lieu of fluorine atom substitution on the aryl ring(s), the aryl groups can contain linear and branched $C_1$–$C_{10}$ highly fluorinated and perfluorinated alkyl groups, such as, for example, trifluoromethyl. In embodiments where hydrogen atoms remain on the alkyl, cycloalkyl, and aryl moieties, a portion or all of the remaining hydrogen atoms can be replaced with bromine and/or chlorine atoms.

Representative highly fluorinated and perfluorinated alkylsulfonyl and arylsulfonyl containing anions of the foregoing formulae include but are not limited to $(C_2F_5SO_2)_2N^-$, $(C_4F_9SO_2)_2N^-$, $(CF_3SO_2)_2N^-$, $(CF_3SO_2)(C_4F_9SO_2)N^-$, $((CF_3)_2NC_2F_4SO_2)_2N^-$, $(C_6F_5SO_2)(CF_3SO_2)N^-$, $(CF_3SO_2)(CHF_2SO_2)N^-$, $(C_2F_5SO_2)(CF_3SO_2)N^-$, $(C_3F_7SO_2)_2N^-$, $((CF_3)_2(F)CSO_2)_2N^-$,$(C_4F_8(CF_3)_2NSO_2)_2N^-$, $(C_8F_{17}SO_2)_3C^-$, $(CF_3SO_2)_3C^-$, $(CF_3SO_2)_2CH^-$, $(C_4F_9SO_2)_3C^-$, $(CF_3SO_2)_2(C_4F_9SO_2)C^-$, $((CF_3)_2NC_2F_4SO_2)C(SO_2CF_3)_2^-$, $(3,5\text{-bis}(CF_3)C_6H_3)SO_2N(SO_2CF_3)^-$, $(C_6F_5SO_2)C(SO_2CF_3)_2^-$, and the structures exemplified below:

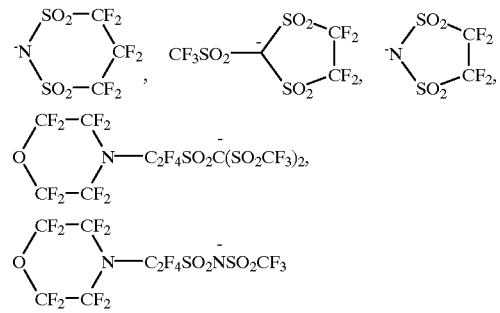

Additional highly fluorinated and perfluorinated alkylsulfonyl and arylsulfonyl anions suitable as leaving groups are described in Turowsky and Seppelt, *Inorganic Chemistry*, 1988, 27, 2135–2137, and in U.S. Pat. Nos. 4,387,222; 4,505,997; 5,021,308; 5,072,040; 5,162,177; and 5,273,840 the disclosures of which are hereby incorporated by reference.

WCA Salts

The salt of the weakly coordinating anion employed in the process of the invention can be represented by the formula

[C(L")$_z$]$_b$[WCA]$_d$, wherein C represents a proton (H$^+$), an alkaline earth metal cation, a transition metal cation or an organic group containing cation, L" and WCA, are as defined above, z is an integer from 0 to 8, and b and d represent the number of times the cation complex and weakly coordinating counteranion complex (WCA), respectively, are taken to balance the electronic charge on the overall salt complex.

The alkali metal cations include Group 1 metals selected from lithium, sodium, potassium, rubidium, and cesium. In one embodiment, the Group 1 metal cations are lithium, sodium and potassium.

The alkali earth metal cations include Group 2 metals selected from beryllium, magnesium, calcium, strontium, and barium. In one embodiment, the Group 2 metal cations are magnesium, calcium, strontium, and barium. The transition metal cation is selected from zinc, silver, and thallium.

The organic group cation is selected from ammonium, phosphonium, carbonium and silylium cations, i.e., [NHR$^{41'}_3$]$^+$, [NR$^{41'}_4$]$^+$, [PHR$^{41'}_3$], [PR$^{41'}_4$], [R$^{41'}_3$C]$^+$, and [R$^{41'}_3$Si]$^+$, where R$^{41'}$ independently represent a hydrocarbyl, silylhydrocarbyl, or perfluorocarbyl group, each containing 1 to 24 carbon atoms, (or in another embodiment, from 1 to 12 carbons) arranged in a linear, branched, or ring structure. By perfluorocarbyl is meant that all carbon bonded hydrogen atoms are replaced by a fluorine atom. Representative hydrocarbyl groups include but are not limited to linear and branched C$_1$–C$_{20}$ alkyl, C$_3$–C$_{20}$ cycloalkyl, linear and branched C$_2$ to C$_{20}$ alkenyl, C$_3$–C$_{20}$ cycloalkenyl, C$_6$–C$_{24}$ aryl, and C$_7$–C$_{24}$ aralkyl, and organometallic cations. The organic cations are selected from trityl, trimethylsilylium, triethylsilylium, tris(trimethylsilyl)silylium, tribenzylsilylium, triphenylsilylium, tricyclohexylsilylium, dimethyloctadecylsilylium, and triphenylcarbenium (i.e., trityl). In addition to the above cation complexes ferrocenium cations such as [(C$_5$H$_5$)$_2$Fe]$^+$ and [(C$_5$(CH$_3$))$_2$Fe]$^+$ are also useful as the cation in the WCA salts of the invention.

Examples of WCA salts having a weakly coordinating anion described under Formula II include but are not limited to
lithium tetrakis(2-fluorophenyl)borate,
sodium tetrakis(2-fluorophenyl)borate,
silver tetrakis(2-fluorophenyl)borate,
thallium tetrakis(2-fluorophenyl)borate,
lithium tetrakis(3-fluorophenyl)borate,
sodium tetrakis(3-fluorophenyl)borate,
silver tetrakis(3-fluorophenyl)borate,
thallium tetrakis(3-fluorophenyl)borate,
ferrocenium tetrakis(3-fluorophenyl)borate,
ferrocenium tetrakis(pentafluorophenyl)borate,
lithium tetrakis(4-fluorophenyl)borate,
sodium tetrakis(4-fluorophenyl)borate,
silver tetrakis(4-fluorophenyl)borate,
thallium tetrakis(4-fluorophenyl)borate,
lithium tetrakis(3,5-difluorophenyl)borate,
sodium tetrakis(3,5-difluorophenyl)borate,
thallium tetrakis(3,5-difluorophenyl)borate,
trityl tetrakis(3,5-difluorophenyl)borate,
2,6-dimethylanilinium tetrakis(3,5-difluorophenyl)borate,
lithium tetrakis(pentafluorophenyl)borate (also referred to herein as LiFABA),
lithium(diethyl ether) tetrakis(pentafluorophenyl)borate,
lithium(diethyl ether)$_{2.5}$ tetrakis(pentafluorophenyl)borate,
lithium tetrakis(2,3,4,5-tetrafluorophenyl)borate,
lithium tetrakis(3,4,5,6-tetrafluorophenyl)borate,
lithium tetrakis(1,2,2-trifluoroethylenyl)borate,
lithium tetrakis(3,4,5-trifluorophenyl)borate,
lithium methyltris(perfluorophenyl)borate,
lithium phenyltris(perfluorophenyl)borate,
lithium tris(isopropanol) tetrakis(pentafluorophenyl)borate,
lithium tetrakis(methanol) tetrakis(pentafluorophenyl) borate,
silver tetrakis(pentafluorophenyl)borate,
tris(toluene)silver tetrakis(pentafluorophenyl)borate,
tris(xylene)silver tetrakis(pentafluorophenyl)borate,
trityl tetrakis(pentafluorophenyl)borate,
trityl tetrakis(4-triisopropylsilyltetrafluorophenyl)borate,
trityl tetrakis(4-dimethyl-tert-butylsilyltetrafluorophenyl) borate,
thallium tetrakis[3,5-bis(trifluoromethyl)phenyl]borate,
2,6-dimethylanilinium tetrakis(pentafluorophenyl)borate,
N,N-dimethylanilinium tetrakis(pentafluorophenyl)borate,
N,N-dimethylanilinium tetrakis[3,5-bis(trifluoromethyl) phenyl]borate
lithium (triphenylsiloxy)tris(pentafluorophenyl)borate,
sodium (triphenylsiloxy)tris(pentafluorophenyl)borate,
sodium tetrakis(2,3,4,5-tetrafluorophenyl)borate,
sodium tetrakis(3,4,5,6-tetrafluorophenyl)borate,
sodium tetrakis(1,2,2-trifluoroethylenyl)borate,
sodium tetrakis(3,4,5-trifluorophenyl)borate,
sodium methyltris(perfluorophenyl)borate,
sodium phenyltris(perfluorophenyl)borate,
thallium tetrakis(2,3,4,5-tetrafluorophenyl)borate,
thallium tetrakis(3,4,5,6-tetrafluorophenyl)borate,
thallium tetrakis(1,2,2-trifluoroethylenyl)borate,
thallium tetrakis(3,4,5-trifluorophenyl)borate,
sodium methyltris(perfluorophenyl)borate,
thallium phenyltris(perfluorophenyl)borate,
trityl tetrakis(2,3,4,5-tetrafluorophenyl)borate,
trityl tetrakis(3,4,5,6-tetrafluorophenyl)borate,
trityl tetrakis(1,2,2-trifluoroethylenyl)borate,
trityl tetrakis(3,4,5-trifluorophenyl)borate,
trityl methyltris(pentafluorophenyl)borate,
trityl phenyltris(perfluorophenyl)borate,
silver tetrakis[3,5-bis(trifluoromethyl)phenyl]borate,
silver(toluene) tetrakis[3,5-bis(trifluoromethyl)phenyl]borate,
thallium tetrakis[3,5-bis(trifluoromethyl)phenyl]borate,
lithium (hexyltris(pentafluorophenyl)borate,
lithium triphenylsiloxytris(pentafluorophenyl)borate,
lithium(octyloxy)tris(pentafluorophenyl)borate,
lithium tetrakis(3,5-bis(trifluoromethyl)phenyl)borate,
sodium tetrakis(pentafluorophenyl)borate,
trityl tetrakis(pentafluorophenyl)borate,
sodium(octyloxy)tris(pentafluorophenyl)borate,
sodium tetrakis(3,5-bis(trifluoromethyl)phenyl)borate,
potassium tetrakis(pentafluorophenyl)borate,
trityl tetrakis(pentafluorophenyl)borate,
potassium(octyloxy)tris(pentafluorophenyl)borate,
potassium tetrakis(3,5-bis(trifluoromethyl)phenyl)borate,
magnesium tetrakis(pentafluorophenyl)borate,
magnesium magnesium(octyloxy)tris(pentafluorophenyl) borate,
magnesium tetrakis(3,5-bis(trifluoromethyl)phenyl)borate,
calcium tetrakis(pentafluorophenyl)borate,
calcium (octyloxy)tris(pentafluorophenyl)borate,
calcium tetrakis(3,5-bis(trifluoromethyl)phenyl)borate,
lithium tetrakis[3,5-bis[1-methoxy-2,2,2-trifluoro-1-(trifluoromethyl)ethyl]phenyl]borate,
sodium tetrakis[3,5-bis[1-methoxy-2,2,2-trifluoro-1-(trifluoromethyl)ethyl]phenyl]borate,
silver tetrakis[3,5-bis[1-methoxy-2,2,2-trifluoro-1-(trifluoromethyl)ethyl]phenyl]borate, thalium tetrakis[3,5-bis[1-methoxy-2,2,2-trifluoro-1-(trifluoromethyl)ethyl]phenyl]borate,
lithium tetrakis[3-[1-methoxy-2,2,2-trifluoro-1-(trifluoromethyl)ethyl]-5-(trifluoromethyl)phenyl]borate,
sodium tetrakis[3-[1-methoxy-2,2,2-trfluoro-1-(trifluoromethyl)ethyl]-5-(trifluoromethyl)phenyl]borate,
silver tetrakis[3-[1-methoxy-2,2,2-trifluoro-1-(trifluoromethyl)ethyl]-5-(trifluoromethyl)phenyl]borate,
thallium tetrakis[3-[1-methoxy-2,2,2-trifluoro-1-(trifluoromethyl)ethyl]-5-(trifluoromethyl)phenyl]borate,
lithium tetrakis[3-[2,2,2-trifluoro-1-(2,2,2-trifluoroethoxy)-1-(trifluoromethyl)ethyl]-5-(trifluoromethyl)phenyl]borate,
sodium tetrakis[3-[2,2,2-trifluoro-1-(2,2,2-trifluoroethoxy)-1-(trifluoromethyl)ethyl]-5-(trifluoromethyl)phenyl]borate,
silver tetrakis[3-[2,2,2-trifluoro-1-(2,2,2-trifluoroethoxy)-1-(trifluoromethyl)ethyl]-5-(trifluoromethyl)phenyl]borate,
thallium tetrakis[3-[2,2,2-trifluoro-1-(2,2,2-trifluoroethoxy)-1-(trifluoromethyl)ethyl]-5-(trifluoromethyl)phenyl]borate,
trimethylsilylium tetrakis(pentafluorophenyl)borate,
trimethylsilylium etherate tetrakis(pentafluorophenyl)borate,
triethylsilylium tetrakis(pentafluorophenyl)borate,
triphenylsilylium tetrakis(pentafluorophenyl)borate,
tris(mesityl)silylium tetrakis(pentafluorophenyl)borate,
tribenzylsilylium tetrakis(pentafluorophenyl)borate,
trimethylsilylium methyltris(pentafluorophenyl)borate,
triethylsilylium methyltris(pentafluorophenyl)borate,
triphenylsilylium methyltris(pentafluorophenyl)borate,
tribenzylsilylium methyltris(pentafluorophenyl)borate,
trimethylsilylium tetrakis(2,3,4,5-tetrafluorophenyl)borate,
triethylsilylium tetrakis(2,3,4,5-tetrafluorophenyl)borate,
triphenylsilylium tetrakis(2,3,4,5-tetrafluorophenyl)borate,
tribenzylsilylium tetrakis(2,3,4,5-tetrafluorophenyl)borate,
trimethylsilylium tetrakis(2,3,4,5-tetrafluorophenyl)borate,
triphenylsilylium tetrakis(2,3,4,5-tetrafluorophenyl)borate,
trimethylsilylium tetrakis(3,4,5-trifluorophenyl)borate,
tribenzylsilylium tetrakis(3,4,5-trifluorophenyl)aluminate,
triphenylsilylium methyltris(3,4,5-trifluorophenyl)aluminate,
triethylsilylium tetrakis(1,2,2-trifluoroethenyl)borate,
tricyclohexylsilylium tetrakis(2,3,4,5-tetrafluorophenyl)borate,
dimethyloctadecylsilylium tetrakis(pentafluorophenyl)borate,
tris(trimethyl)silyl)silylium methyltri(2,3,4,5-tetrafluorophenyl)borate,
2,2'-dimethyl-1,1-binaphthylmethylsilylium tetrakis(pentafluorophenyl)borate,
2,2'-dimethyl-1,1-binaphthylmethylsilylium tetrakis(3,5-bis(trifluoromethyl)phenyl)borate,
lithium tetrakis(pentafluorophenyl)aluminate,
trityl tetrakis(pentafluorophenyl)aluminate,
trityl (perfluorobiphenyl)fluoroaluminate,
lithium(octyloxy)tris(pentafluorophenyl)aluminate,
lithium tetrakis(3,5-bis(trifluoromethyl)phenyl)aluminate,
sodium tetrakis(pentafluorophenyl)aluminate,
trityl tetrakis(pentafluorophenyl)aluminate,
sodium(octyloxy)tris(pentafluorophenyl)aluminate,
sodium tetrakis(3,5-bis(trifluoromethyl)phenyl)aluminate,
potassium tetrakis(pentafluorophenyl)aluminate,
trityl tetrakis(pentafluorophenyl)aluminate,
potassium (octyloxy)tris(pentafluorophenyl)aluminate,
potassium tetrakis(3,5-bis(trifluoromethyl)phenyl)aluminate,
magnesium tetrakis(pentafluorophenyl)aluminate,
magnesium(octyloxy)tris(pentafluorophenyl)aluminate,
magnesium tetrakis(3,5-bis(trifluoromethyl)phenyl)aluminate,
calcium tetrakis(pentafluorophenyl)aluminate,
calcium (octyloxy)tris(pentafluorophenyl)aluminate, and
calcium tetrakis(3,5-bis(trifluoromethyl)phenyl)aluminate.

Examples of WCA salts having a weakly coordinating anion described under Formula III include but are not limited to $LiB(OC(CF_3)_3)_4$, $LiB(OC(CF_3)_2(CH_3))_4$, $LiB(OC(CF_3)_2H)_4$, $LiB(OC(CF_3)(CH_3)H)_4$, $TlB(OC(CF_3)_3)_4$, $TlB(OC(CF_3)_2H)_4$, $TlB(OC(CF_3)(CH_3)H)_4$, $TlB(OC(CF_3)_2(CH_3))_4$, $(Ph_3C)B(OC(CF_3)_3)_4$, $(Ph_3C)B(OC(CF_3)_2(CH_3))_4$, $(Ph_3C)B(OC(CF_3)_2H)_4$, $(Ph_3C)B(OC(CF_3)(CH_3)H)_4$, $AgB(OC(CF_3)_3)_4$, $AgB(OC(CF_3)_2H)_4$, $AgB(OC(CF_3)(CH_3)H)_4$, $LiB(O_2C_6F_4)_2$, $TlB(O_2C_6F_4)_2$, $Ag(toluene)_2B(O_2C_6F_4)_2$, and $Ph_3CB(O_2C_6F_4)_2$, $LiB(OCH_2(CF_3)_2)_4$, $[Li(HOCH_3)_4]B(O_2C_6Cl_4)_2$, $[Li(HOCH_3)_4]B(O_2C_6F_4)_2$, $[Ag(toluene)_2]B(O_2C_6Cl_4)_2$, $LiB(O_2C_6Cl_4)_2$, $(LiAl(OC(CF_3)_2Ph)_4)$, $(TlAl(OC(CF_3)_2Ph)_4)$, $(AgAl(OC(CF_3)_2Ph)_4)$, $(Ph_3CAl(OC(CF_3)_2Ph)_4$, $(LiAl(OC(CF_3)_2C_6H_4CH_3)_4)$, $(ThAl(OC(CF_3)_2C_6H_4CH_3)_4)$, $(AgAl(OC(CF_3)_2C_6H_4CH_3)_4)$, $(Ph_3CAl(OC(CF_3)_2C_6H_4CH_3)_4)$, $LiAl(OC(CF_3)_3)_4$, $ThAl(OC(CF_3)_3)_4$, $AgAl(OC(CF_3)_3)_4$, $Ph_3CAl(OC(CF_3)_3)_4$, $LiAl(OC(CF_3)(CH_3)H)_4$, $TlAl(OC(CF_3)(CH_3)H)_4$, $AgAl(OC(CF_3)(CH_3)H)_4$, $Ph_3CAl(OC(CF_3)(CH_3)H)_4$, $LiAl(OC(CF_3)_2H)_4$, $TlAl(OC(CF_3)_2H)_4$, $AgAl(OC(CF_3)_2H)_4$, $Ph_3CAl(OC(CF_3)_2H)_4$, $LiAl(OC(CF_3)_2C_6H_4-4-i-Pr)_4$, $TlAl(OC(CF_3)_2C_6H_4-4-i-Pr)_4$, $AgAl(OC(CF_3)_2C_6H_4-4-i-Pr)_4$, $Ph_3CAl(OC(CF_3)_2C_6H_4-4-i-Pr)_4$, $LiAl(OC(CF_3)_2C_6H_4-4-t-butyl)_4$, $TlAl(OC(CF_3)_2C_6H_4-4-t-butyl)_4$, $AgAl(OC(CF_3)_2C_6H_4-4-t-butyl)_4$, $Ph_3CAl(OC(CF_3)_2C_6H_4-4-t-butyl)_4$, $LiAl(OC(CF_3)_2C_6H_4-4-Si\ Me_3)_4$, $TlAl(OC(CF_3)_2C_6H_4-4-Si\ Me_3)_4$, $AgAl(OC(CF_3)_2C_6H_4-4-Si\ Me_3)_4$, $Ph_3CAl(OC(CF_3)_2\ C_6H_4-4-Si\ Me_3)_4$, $LiAl(OC(CF_3)_2C_6H_4-4-Si-i-Pr_3)_4$, $TlAl(OC(CF_3)_2C_6H_4-4-Si-i-Pr_3)_4$, $AgAl(OC(CF_3)_2C_6H_4-4-Si-i-Pr_3)_4$, $Ph_3CAl(OC(CF_3)_2C_6H_4-4-Si-i-Pr_3)_4$, $LiAl(OC(CF_3)_2\ C_6H_2-2,6-(CF_3)_2-4-Si-i-Pr_3)_4$, $TlAl(OC(CF_3)_2C_6H_2-2,6-(CF_3)_2-4-Si-i-Pr_3)_4$, $AgAl(OC(CF_3)_2C_6H_2-2,6-(CF_3)_2-4-Si-i-Pr_3)_4$, $Ph_3CAl(OC(CF_3)_2C_6H_2-2,6-(CF_3)_2-4-Si-i-Pr_3)_4$, $LiAl(OC(CF_3)_2C_6H_3-3,5-(CF_3)_2)_4$, $TlAl(OC(CF_3)_2C_6H_3-3,5-(CF_3)_2)_4$, $AgAl(OC(CF_3)_2C_6H_3-3,5-(CF_3)_2)_4$, $Ph_3CAl(OC(CF_3)_2C_6H_3-3,5-(CF_3)_2)_4$, $LiAl(OC(CF_3)_2C_6H_2-2,4,6-(CF_3)_3)_4$, $TlAl(OC(CF_3)_2C_6H_2-2,4,6-(CF_3)_3)_4$, $AgAl(OC(CF_3)_2C_6H_2-2,4,6-(CF_3)_3)_4$, $Ph_3CAl(OC(CF_3)_2C_6H_2-2,4,6-(CF_3)_3)_4$, $LiAl(OC(CF_3)_2C_6F_5)_4$, $TlAl(OC(CF_3)_2\ C_6F_5)_4$, $AgAl(OC(CF_3)_2C_6F_5)_4$, and $Ph_3CAl(OC(CF_3)_2\ C_6F_5)_4$.

Examples of boratobenzene salts include but are not limited to [1,4-dihydro-4-methyl-1-(pentafluorophenyl)]-2-borinyl lithium, [1,4-dihydro-4-methyl-1-(pentafluorophenyl)]-2-borinyl triphenylmethylium, 4-(1,1-dimethyl)-1,2-dihydro-1-(pentafluorophenyl)-2-borinyl lithium, 4-(1,1-dimethyl)-1,2-dihydro-1-(pentafluorophenyl)-2-borinyl triphenylmethylium, 1-fluoro-1,2-dihydro-4-(pentafluorophenyl)-2-borinyl lithium, 1-fluoro-1,2-dihydro-4-(pentafluorophenyl)-2-borinyl triphenylmethylium, 1-[3,5-bis(trifluoromethyl)phenyl]-1,2-dihydro-4-(pentafluorophenyl)-2-borinyl lithium, and 1-[3,5-bis(trifluoromethyl)phenyl]-1,2-dihydro-4-(pentafluorophenyl)-2-borinyl triphenylmethylium.

Examples of WCA carborane and halocarborane salts include but are not limited to silver dodecahydro-1-carbadodecaborate, $LiCB_{11}$, $(CH_3)_{12}$, $LiCB_{11}H_{12}$, $(Me_3NH)[CB_{11}H_{12}]$, $(Me_4N)[1-C_2H_5CB_{11}H_{11}]$, $(Me_4N)[1-Ph_3SiCB_{11}H_{11}]$, $(Me_4N)[1-CF_3CB_{11}H_{11}]$, $Cs[12-BrCB_{11}H_{11}]$, $Ag[12-BrCB_{11}H_{11}]$, $Cs[7,12-Br_2CB_{11}H_{10}]$, Cs[12-ClCB$_{11}$H$_{11}$], Cs[7,12-Cl$_2$CB$_{11}$H$_{10}$], Cs[1-H—CB$_{11}$F$_{11}$], Cs[1-CH$_3$—CB$_{11}$F$_{11}$], (i-Pr$_3$)Si[1-CF$_3$—CB$_{11}$F$_{11}$], Li[12-CB$_{11}$H$_{11}$F], Li[7,12-CB$_{11}$H$_{11}$F$_2$], Li[7,9,12-CB$_{11}$H$_{11}$F$_3$], (i-Pr$_3$)Si[CB$_{11}$H$_6$Br$_6$], Cs[CB$_{11}$H$_6$Br$_6$], Li[6-CB$_9$H$_9$F], Li[6,8-CB$_9$H$_8$F$_2$], Li[6,7,8-CB$_9$H$_7$F$_3$], Li[6,7,8,9-CB$_9$H$_6$F$_4$], Li[2,6,7,8,9-CB$_9$H$_5$F$_5$], Li[CB$_9$H$_5$Br$_5$], Ag[CB$_{11}$H$_6$Cl$_6$], Tl[CB$_{11}$H$_6$Cl$_6$], Ag[CB$_{11}$H$_6$F$_6$], Tl[CB$_{11}$H$_6$F$_6$], Ag[CB$_{11}$H$_6$I$_6$], Tl[CB$_{11}$H$_6$I$_6$], Ag[CB$_{11}$H$_6$Br$_6$], Tl[CB$_{11}$H$_6$Br$_6$], Li[6,7,9,10,11,12-CB$_{11}$H$_6$F$_6$], Li[2,6,7,8,9,10-CB$_9$H$_5$F$_5$], Li[1-H—CB$_9$F$_9$], Tl[12-CB$_{11}$H$_{11}$(C$_6$H$_5$)], Ag[1-C$_6$F$_5$—CB$_{11}$H$_5$Br$_6$], Li[CB$_{11}$Me$_{12}$], Li[CB$_{11}$(CF$_3$)$_{12}$], Li[CB$_{11}$H$_6$I$_6$], Li[CB$_9$H$_5$Br$_5$], Li[Co(B$_9$C$_2$H$_{11}$)$_2$], Li[CB$_{11}$(CH$_3$)$_{12}$], Li[CB$_{11}$(C$_4$H$_9$)$_{12}$], Li[CB$_{11}$(C$_6$H$_{13}$)$_{12}$], Na[Co(C$_2$B$_9$H$_{11}$)$_2$], and Na[Co(Br$_3$C$_2$B$_9$H$_8$)$_2$]. Additional halocarborane salts are disclosed in International Patent Publication WO 98/43983, which is hereby incorporated by reference.

Monomers

The catalysts of the invention are suitable for the preparation of a wide range of polymers comprising cyclic repeating units. The cyclic polymers are prepared by the addition polymerization of a polycycloolefin monomer(s) in the presence of a catalytic amount of a catalyst of Formula I or the pro-catalyst components described above. The monomer(s) can be polymerized via solution or mass polymerization techniques. As used herein the terms "polycycloolefin," "polycyclic," and "norbornene-type" monomer are used interchangeably and mean that the monomer contains at least one norbornene moiety as shown below:

where X''' represents oxygen, nitrogen with hydrogen or a C$_1$ to C$_{10}$ alkyl linear or branched being bonded thereto, sulfur or a methylene group of the formula —(CH$_2$)$_{n'}$— where n' is an integer of 1 to 5.

The simplest polycyclic monomer of the invention is the bicyclic monomer, bicyclo[2.2.1]hept-2-ene, commonly referred to as norbornene. The term norbornene-type monomer is meant to include norbornene, substituted norbornene (s), and any substituted and unsubstituted higher cyclic derivatives thereof so long as the monomer contains at least one norbornene-type or substituted norbornene-type moiety. In one embodiment, the substituted norbornene-type monomers and higher cyclic derivatives thereof contain a pendant hydrocarbyl substituent(s) or a pendant functional substituent(s) containing an oxygen atom. In one embodiment, the norbornene-type or polycycloolefin monomers are represented by the structure below:

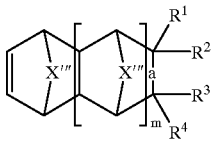

wherein X''' is defined as above, "a" represents a single or double bond, R$^1$ to R$^4$ independently represents a hydrocarbyl or functional substituent, m is an integer from 0 to 5, and when "a" is a double bond one of R$^1$, R$^2$ and one of R$^3$, R$^4$ is not present.

When the substituent is a hydrocarbyl group, halohydrocarbyl, or perhalocarbyl group R$^1$ to R$^4$ independently represent hydrocarbyl, halogenated hydrocarbyl and perhalogenated hydrocarbyl groups selected from hydrogen, linear and branched C$_1$–C$_{10}$ alkyl, linear and branched, C$_2$–C$_{10}$ alkenyl, linear and branched C$_2$–C$_{10}$ alkynyl, C$_4$–C$_{12}$ cycloalkyl, C$_4$–C$_{12}$ cycloalkenyl, C$_6$–C$_{12}$ aryl, and C$_7$–C$_{24}$ aralkyl, R$^1$ and R$^2$ or R$^3$ and R$^4$ can be taken together to represent a C$_1$–C$_{10}$ alkylidenyl group. Representative alkyl groups include but are not limited to methyl, ethyl, propyl, isopropyl, butyl, isobutyl, sec-butyl, tert-butyl, pentyl, neopentyl, hexyl, heptyl, octyl, nonyl, and decyl. Representative alkenyl groups include but are not limited to vinyl, allyl, butenyl, and cyclohexenyl. Representative alkynyl groups include but are not limited to ethynyl, 1-propynyl, 2-propynyl, 1-butynyl, and 2-butynyl. Representative cycloalkyl groups include but are not limited to cyclopentyl, cyclohexyl, and cyclooctyl substituents. Representative aryl groups include but are not limited to phenyl, naphthyl, and anthracenyl. Representative aralkyl groups include but are not limited to benzyl, and phenethyl. Representative alkylidenyl groups include methylidenyl, and ethylidenyl, groups.

In one embodiment, the perhalohydrocarbyl groups include perhalogenated phenyl and alkyl groups. The halogenated alkyl groups useful in the invention are partially or fully halogenated and are linear or branched, and have the formula C$_z$X''$_{2z+1}$ wherein X'' is independently a halogen as set forth above or a hydrogen and z is selected from an integer of 1 to 20. In another embodiment, each X'' is independently selected from hydrogen chlorine, fluorine and/or bromine. In yet another embodiment, each X'' is independently either a hydrogen or a fluorine.

In one embodiment, the perfluorinated substituents include perfluorophenyl, perfluoromethyl, perfluoroethyl, perfluoropropyl, perfluorobutyl, and perfluorohexyl. In addition to the halogen substituents, the cycloalkyl, aryl, and aralkyl groups of the invention can be further substituted with linear and branched C$_1$–C$_5$ alkyl and haloalkyl groups, aryl groups and cycloalkyl groups.

When the pendant group(s) is a functional substituent, R$^1$ to R$^4$ independently represent a radical selected from —(CH$_2$)$_n$C(O)NH$_2$, —(CH$_2$)$_n$C(O)Cl, —(CH$_2$)$_n$C(O)OR$^5$, —(CH$_2$)$_n$—OR$^5$, —(CH$_2$)$_n$—OC(O)R$^5$, —(CH$_2$)$_n$—C(O)R$^5$, —(CH$_2$)$_n$—OC(O)OR$^5$, —(CH$_2$)$_n$Si(R$^5$)$_3$, —(CH$_2$)$_n$Si(OR$^5$)$_3$, —(CH$_2$)$_n$—O—Si(R$^5$)$_3$, and —(CH$_2$)$_n$C(O)OR$^6$ wherein n independently represents an integer from 0 to 10 and R$^5$ independently represents hydrogen, linear and branched C$_1$-C$_{10}$ alkyl, linear and branched, C$_2$–C$_{10}$ alkenyl, linear and branched C$_2$–C$_{10}$ alkynyl, C$_5$–C$_{12}$ cycloalkyl, C$_6$–C$_{14}$ aryl, and C$_7$–C$_{24}$ aralkyl. Representative hydrocarbyl groups set forth under the definition of R$^5$ are the same as those identified above under the definition of R$^1$ to R$^4$. As set forth above under R$^1$ to R$^4$ the hydrocarbyl groups defined under R$^5$ can be halogenated and perhalogenated. The R$^6$ radical represents an acid labile moiety selected from —C(CH$_3$)$_3$, —Si(CH$_3$)$_3$, —CH(R$^7$)OCH$_2$CH$_3$, —CH(R$^7$)OC(CH$_3$)$_3$ or the following cyclic groups:

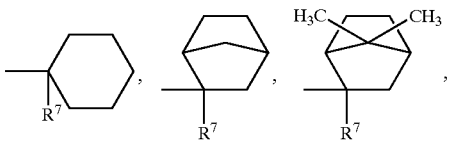

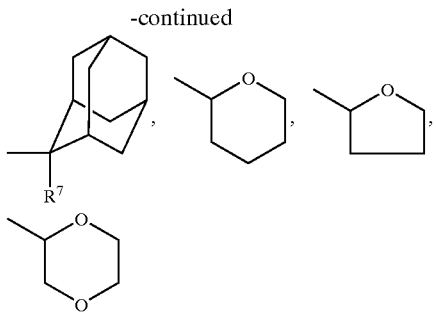

wherein R⁷ represents hydrogen or a linear or branched (C₁–C₅) alkyl group. The alkyl groups include methyl, ethyl, propyl, i-propyl, butyl, i-butyl, t-butyl, pentyl, t-pentyl and neopentyl. In the above structures, the single bond line projecting from the cyclic groups indicates the position where the cyclic protecting group is bonded to the acid substituent. Examples of R⁶ radicals include 1-methyl-1-cyclohexyl, isobornyl, 2-methyl-2-isobornyl, 2-methyl-2-adamantyl, tetrahydrofuranyl, tetrahydropyranoyl, 3-oxocyclohexanonyl, mevalonic lactonyl, 1-ethoxyethyl, and 1-t-butoxy ethyl.

The R⁶ radical can also represent dicyclopropylmethyl (Dcpm), and dimethylcyclopropylmethyl (Dmcp) groups which are represented by the following structures:

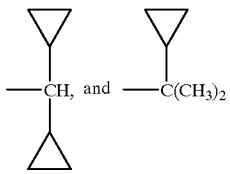

In Structure VII above, R¹ and R⁴ together with the two ring carbon atoms to which they are attached can represent a substituted or unsubstituted cycloaliphatic group containing 4 to 30 ring carbon atoms or a substituted or unsubstituted aryl group containing 6 to 18 ring carbon atoms or combinations thereof. The cycloaliphatic group can be monocyclic or polycyclic. When unsaturated the cyclic group can contain monounsaturation or multiunsaturation, In one embodiment, the unsaturated cyclic group is a monounsaturated cyclic group. When substituted, the rings contain monosubstitution or multisubstitution wherein the substituents are independently selected from hydrogen, linear and branched C₁–C₅ alkyl, linear and branched C₁–C₅ haloalkyl, linear and branched C₁–C₅ alkoxy, halogen, or combinations thereof. R₁ and R⁴ can be taken together to form the divalent bridging group, —C(O)—Q—(O)C—, which when taken together with the two ring carbon atoms to which they are attached form a pentacyclic ring, wherein Q represents an oxygen atom or the group N(R⁸), and R⁸ is selected from hydrogen, halogen, linear and branched C₁–C₁₀ alkyl, and C₆–C₁₈ aryl. A representative structure is shown in below.

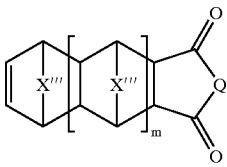

VIIa wherein X''' is defined as above and m is an integer from 0 to 5.

Deuterium enriched norbornene-type monomers wherein at least one of the hydrogen atoms on the norbornene-type moiety and/or one at least one of the hydrogen atoms on a pendant hydrocarbyl substituent described under R₁ to R⁴ have been replaced by a deuterium atom are contemplated within the scope of the invention. In one embodiment, at least 40 percent of the hydrogen atoms on the norbornene-type moiety and/or the hydrocarbyl substituent are replaced by deuterium. In another embodiment, at least about 50 percent of the hydrogen atoms on the norbornene-type moiety and/or the hydrocarbyl substituent are replaced by deuterium. In yet another embodiment, at least about 60 percent of the hydrogen atoms on the norbornene-type moiety and/or the hydrocarbyl substituent are replaced by deuterium. In one embodiment, the deuterated monomers are represented by the structure below:

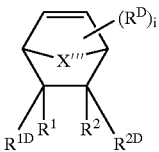

wherein X''' is defined as above, $R^D$ is deuterium, "i" is an integer ranging from 0 to 6, with the proviso that when "i" is 0, at least one of $R^{1D}$ and $R^{2D}$ must be present, $R^1$ and $R^2$ independently represent a hydrocarbyl or functional substituent as defined above, and $R^{1D}$ and $R^{2D}$ may or may not be present and independently represent a deuterium atom or a deuterium enriched hydrocarbyl group containing at least one deuterium atom. In one embodiment, the deuterated hydrocarbyl group is selected from linear and branched C₁–C₁₀ alkyl wherein at least 40 percent of the hydrogen atoms on the carbon backbone are replaced by deuterium. In another embodiment, the deuterated hydrocarbyl group is selected from linear and branched C₁–C₁₀ alkyl wherein at least 50 percent of the hydrogen atoms on the carbon backbone are replaced by deuterium. In yet another embodiment, the deuterated hydrocarbyl group is selected from linear and branched C₁–C₁₀ alkyl wherein at least 60 percent of the hydrogen atoms on the carbon backbone are replaced by deuterium.

Crosslinked polymers can be prepared by copolymerizing the norbornene-type monomer(s) set forth under Structure VII above with a multifunctional norbornene-type crosslinking monomer(s). By multifunctional norbornene-type crosslinking monomer is meant that the crosslinking monomer contains at least two norbornene-type moieties (norbornene-type double bonds), each functionality being polymerizable in the presence of the catalyst system of the invention. The crosslinkable monomers include fused multicyclic ring systems and linked multicyclic ring systems. Examples of fused crosslinkers are illustrated in structures below. For brevity, norbornadiene is included as a fused multicyclic crosslinker and is considered to contain two polymerizable norbornene-type double bonds.

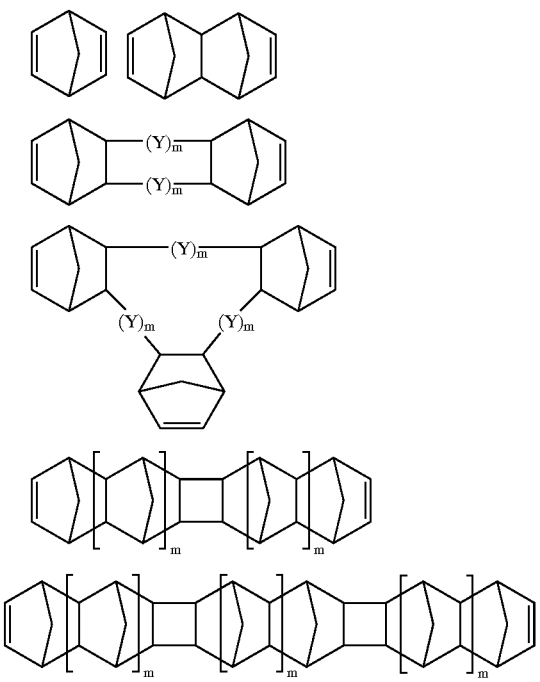

wherein Y represents a methylene (—CH$_2$—) group and m independently represents an integer from 0 to 5, and when m is 0, Y represents a single bond. Representative monomers under the forgoing formulae are set forth below.

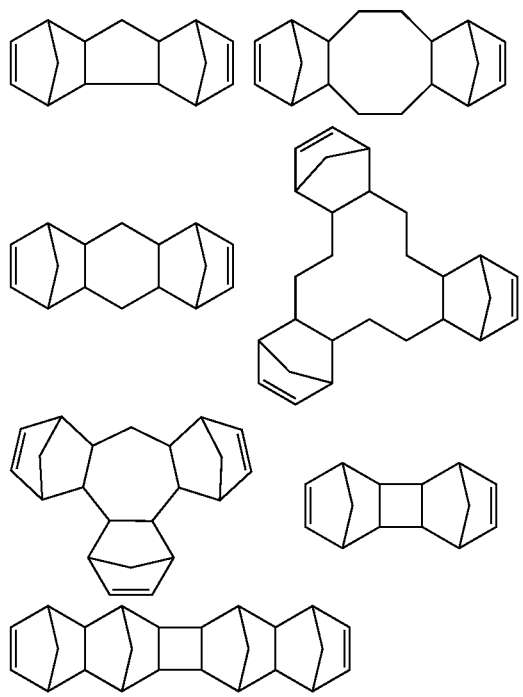

A linked multicyclic crosslinker is illustrated generically in Structure VIII below.

VIII wherein "a" independently represents a single or double bond, m independently is an integer from 0 to 5, $R^9$ is a divalent radical selected from divalent hydrocarbyl radicals and divalent ether radicals. By divalent is meant that a free valence at each terminal end of the radical is attached to a norbornene-type moiety. In one embodiment, the divalent hydrocarbyl radicals are alkylene radicals and divalent aromatic radicals. The alkylene radicals are represented by the formula —(C$_d$H$_{2d}$)— where d represents the number of carbon atoms in the alkylene chain and is an integer from 1 to 10. The alkylene radicals are, in one embodiment, selected from linear and branched (C$_1$–C$_{10}$) alkylene such as methylene, ethylene, propylene, butylene, pentylene, hexylene, heptylene, octylene, nonylene, and decylene. When branched alkylene radicals are contemplated, it is to be understood that a hydrogen atom in the alkylene backbone is replaced with a linear or branched (C$_1$ to C$_5$) alkyl group.

The divalent aromatic radicals are selected from divalent phenyl, and divalent naphthyl radicals. The divalent ether radicals are represented by the group —$R^{10}$—O—$R^{10}$—, wherein $R^{10}$ independently is the same as $R^9$. Examples of specific linked multicyclic crosslinkers are represented as in Structures VIIIa to VIIIc as follows.

VIIIa

VIIIc

VIIIb in one embodiment, the crosslinker is selected from those shown below:

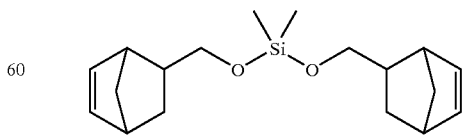

which is dimethyl bis[bicyclo[2.2.1]hept-2-ene-5-methoxy] silane (also referred to herein as dimethyl bis(norbornene methoxy) silane),

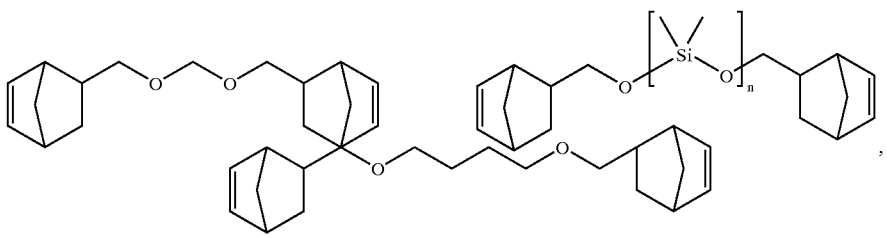
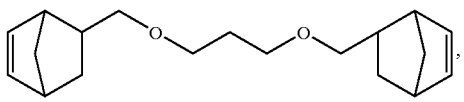
where n is 1 to 4,
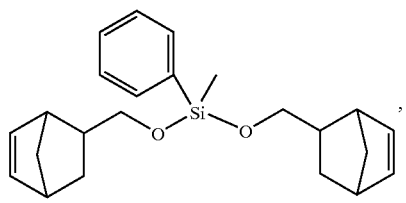
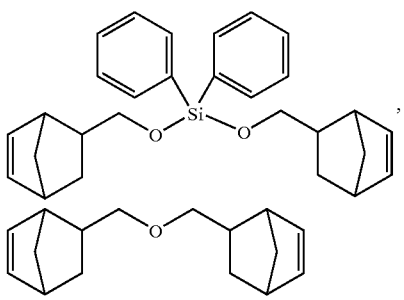
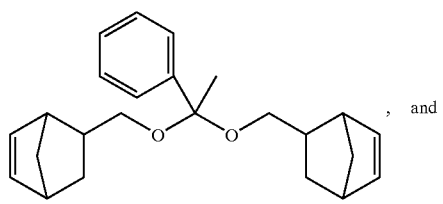
, and
Some other types of norbornene-based crosslinkers include, but are not limited to, those represented in formulas a–m below.
a.
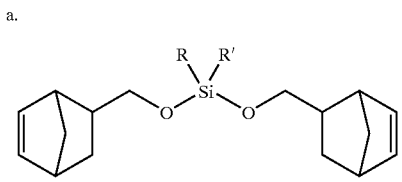
R and R' = alkyl or aryl
b.
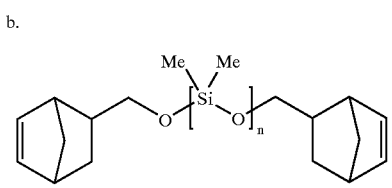
c.
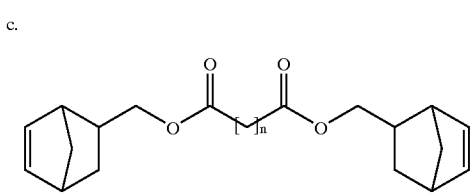
d.
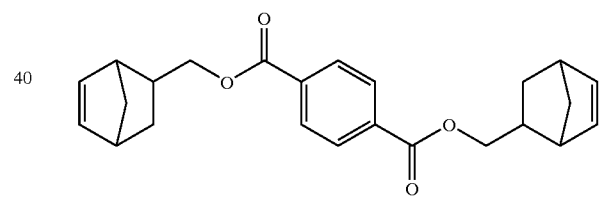
e.
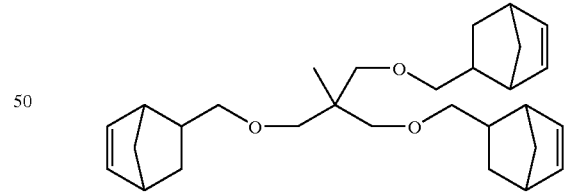
f.
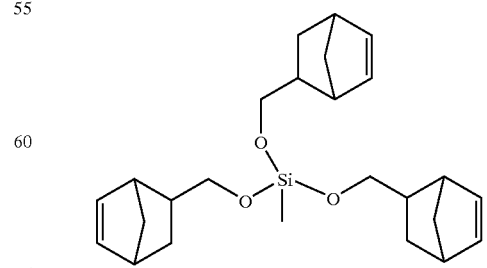

g.

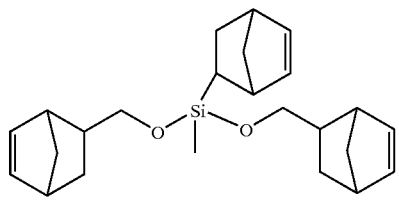

h.

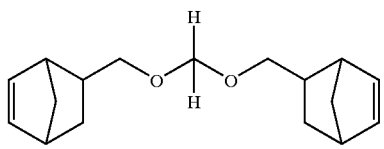

l.

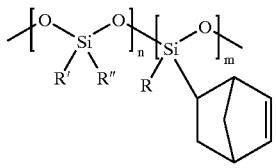

R, R', R'' = alkyl or aryl m.

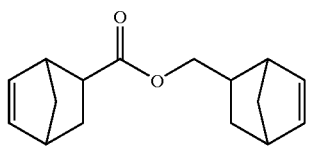

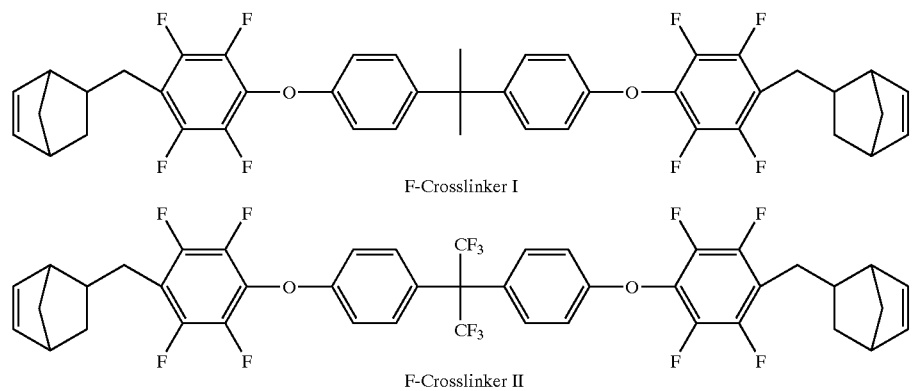

F-Crosslinker I

F-Crosslinker II

-continued i.

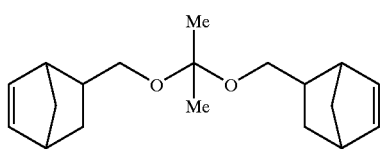

j.

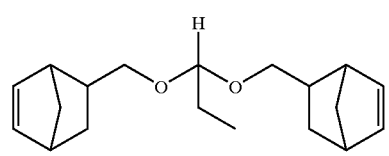

k.

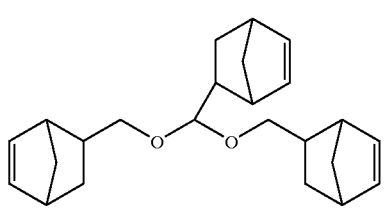

In another embodiment, fluorine-containing norbornene-based cross linkers are used. For example, in one embodiment one of the following fluorinated norbornene crosslinkers can be utilized.

Norbornadiene may be employed as a crosslinker in this invention. In another embodiment, higher homologs are utilized. Norbornadiene can be converted into higher homologs or Diels-Alder products using a variety of dimerization catalysts or heating it with cyclopentadiene. In the case of the crosslinking monomer norbornadiene dimer an alternative synthesis is employed in which norbornadiene is coupled catalytically to yield a mixture of isomers of norbornadiene dimer as shown below:

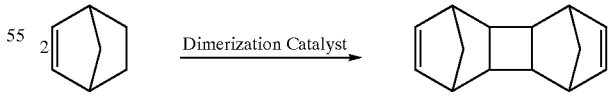

The dimerization of norbornadiene is easily achieved by numerous catalysts to yield a mixed composition of up to six isomers, i.e., Wu et al. U.S. Pat. No. 5,545,790). In one embodiment, the isomers are the exo-trans-exo, endo-trans-endo, and exo-trans-endo-1,4,4a,4b,5,8,8a,8b-octahydro-1,4:5,8-dimethanobiphenylene ("norbornadiene dimer" or "[NBD]$_2$"). In another embodiment, the exo-trans-exo norbornadiene dimer is utilized as a crosslinker. Heating norbornadiene dimer with dicyclopentadiene or cyclopentadiene can produce higher oligomers of norbornadiene dimer. Other crosslinkers are prepared by the reaction of cyclopentadiene with olefins containing two or more reactive olefins, e.g., cyclooctadiene, 1,5-hexadiene, 1,7-octadiene, and tricycloheptatriene.

In one embodiment, the crosslinkable monomers are those containing two reactive norbornene type moieties (containing two polymerizable double bonds). In another embodiment, the monomer is 5,5'-(1,2-ethanediyl)bisbicyclo[2.2.1]hept-2-ene (NBCH$_2$CH$_2$NB) prepared by the reaction of 5-(3-butenyl)bicyclo[2.2.1]hept-2-ene and cyclopentadiene via a Diels-Alder reaction. The higher homolog of 5-(3-butenyl)bicyclo[2.2.1]hept-2-ene is also a co-monomer of choice, i.e., 2-(3-butenyl)-1,2,3,4,4a,5,8,8a-octahydro-1,4:5,8-dimethanonaphthalene. Similarly, 1,4,4a,5,6,6a,7,10,10a,11,12,12a-dodecahydro-1,4:7,10-dimethanodibenzo[a,e]cyclooctene is prepared in the Diels Alder reaction between 1,4,4a,5,6,9,10,10a-octahydro-1,4-methanobenzocyclooctene and cyclopentadiene. The higher homolog of between 1,4,4a,5,6,9,10,10a-octahydro-1,4-methanobenzocyclooctene is also a comonomer of choice, i.e., 1,4,4a,5,5a,6,7,10,11,11a,12,12a-dodecahydro-1,4:5,12-dimethanocycloocta[b]naphthalene. The symmetric and asymmetric trimers of cyclopentadiene are also useful crosslinking reagents, i.e., 4,4a,4b,5,8,8a,9,9a-octahydro-1,4:5,8-dimethano-1H-fluorene and 3a,4,4a,5,8,8a,9,9a-octahydro4,9:5,8-dimethano-1H-benz[f]indene, respectively. In yet another embodiment, the monomer is obtained from the reaction of cyclopentadiene and norbornadiene, i.e., 1,4,4a,5,8,8a-hexahydro-1,4:5,8-dimethanonaphthalene. Divinylbenzene and excess cyclopentadiene forms the symmetric crosslinker 5,5'-(1,4-phenylene)bisbicyclo[2.2.1]hept-2-ene.

An economical route for the preparation of hydrocarbyl substituted and functionally substituted norbornene monomers relies on the Diels-Alder addition reaction in which CPD or substituted CPD is reacted with a suitable dienophile at elevated temperatures to form the substituted norbornene-type adduct generally shown by the following reaction scheme:

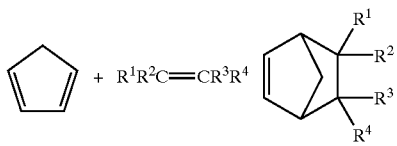

$R^1$ to $R^4$ independently represent hydrogen, hydrocarbyl, and/or a functional group as previously described.

Other norbornene type adducts can be prepared by the thermal pyrolysis dicyclopentadiene (DCPD) in the presence of a suitable dienophile. The reaction proceeds by the initial pyrolysis of DCPD to CPD followed by the Diels-Alder addition of CPD and the dienophile to give the adducts shown below:

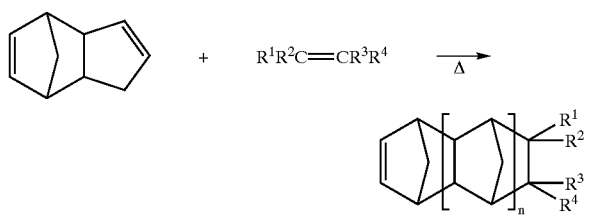

wherein n represents the number of cyclic units in the monomer and $R^1$ to $R^4$ independently represent hydrogen, hydrocarbyl, and/or a functional group as previously defined. Norbornadiene and higher Diels-Alder adducts thereof similarly can be prepared by the thermal reaction of CPD and DCPD in the presence of an acetylenic reactant as shown below.

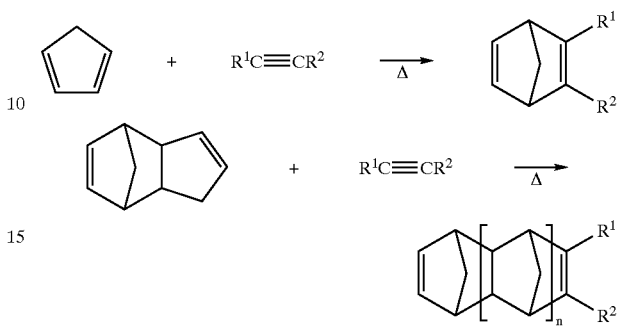

wherein n, $R^1$ and $R^2$ are as defined above.

Deuterium enriched norbornene-type monomers can be prepared by heating DCPD in the presence of D$_2$O and a base such as NaOH to yield deuterated CPD which in turn can be reacted with a dienophile (Eq. 1) or a deuterated dienophile (Eq. 2) to give the respective deuterated norbornene containing a pendant deuterated hydrocarbyl substituent or a pendant hydrocarbyl substituent. In another embodiment non-deuterated CPD can be reacted with a deuterium enriched dienophile to yield norbornene containing a deuterium enriched hydrocarbyl pendant group (Eq. 3).

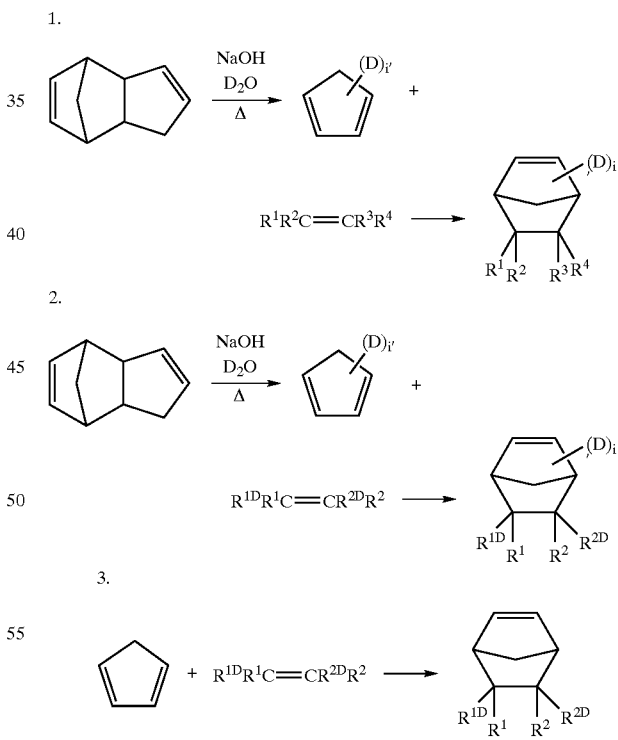

In Eq. 1 and Eq. 2 above, $R^1$ to $R^4$, $R^{1D}$ and $R^{2D}$ are as previously defined, and i' is an integer ranging from 1 to 6.

Examples of polymerizable norbornene-type monomers include but are not limited to norbornene (bicyclo[2.2.1]hept-2-ene), 5-ethylidenenorbornene, dicyclopentadiene, tricyclo[5.2.1.0$^{2,6}$]deca-8-ene, 5-methoxycarbonylbicyclo[2.2.1]hept-2-ene, 5-methylbicyclo[2.2.1]hept-2-ene-5- carboxylic acid, 5-methylbicyclo[2.2.1]hept-2-ene, 5-ethylbicyclo[2.2.1]hept-2-ene, 5-ethoxycarbonylbicyclo[2.2.1]hept-2-ene, 5-n-proepoxycarbonylbicyclo[2.2.1]hept-2-ene, 5-i-propoxycarbonylbicyclo[2.2.1]hept-2-ene, 5-n-butoxycarbonylbicyclo[2.2.1]hept-2-ene, 5-(2-methylpropoxy)carbonylbicyclo[2.2.1]hept-2-ene, 5-(1-methylpropoxy)carbonylbicyclo[2.2.1]hept-2-ene, 5-t-butoxycarbonylbicyclo[2.2.1]hept-2-ene, 5-cyclohexyloxycarbonylbicyclo[2.2.1]hept-2-ene, 5-(4'-t-butylcycpohexyloxy)carbonylbicyclo[2.2.1]hept-2-ene, 5-phenoxycarbonylbicyclo[2.2.1]hept-2-ene, 5-tetrahydrofuranyloxycarbonylbicyclo[2.2.1]hept-2-ene, 5-tetrahydrofuranyloxycarbonylbicyclo[2.2.1]hept-2-ene, bicyclo[2.2.1]hept-2-ene-5-carboxylic acid, 5-acetyloxybicyclo[2.2.1]hept-2-ene, 5-methyl-5-methoxycarbonylbicyclo[2.2.1]hept-2-ene, 5-methyl-5-ethoxycarbonylbicyclo[2.2.1]hept-2-ene, 5-methyl-5-n-propoxycarbonylbicyclo[2.2.1]hept-2-ene, 5-methyl-5-i-propoxycarbonylbicyclo[2.2.1]hept-2-ene, 5-methyl-5-n-butoxycarbonylbicyclo[2.2.1]hept-2-ene, 5-methyl-5-(2-methylpropoxy)carbonylbicyclo[2.2.1]hept-2-ene, 5-methyl-5-(1-methylpropoxy)carbonylbicyclo[2.2.1]hept-2-ene, 5-methyl-5-t-butoxycarbonylbicyclo[2.2.1]hept-2-ene, 5-methyl-5-cyclohexyloxycarbonylbicyclo[2.2.1]hept-2-ene, 5-methyl-5-(4'-t-butylcyclohexyloxy)carbonylbicyclo[2.2.1]hept-2-ene, 5-methyl-5-phenoxycarbonyl bicyclo[2.2.1]hept-2-ene, 5-methyl-5-tetrahydrofuranyloxycarbonylbicyclo[2.2.1]hept-2-ene, 5-methyl-5-tetrahydropyranyloxycarbonylbicyclo[2.2.1]hept-2-ene, 5-methyl-5-acetyloxybicyclo[2.2.1]hept-2-ene, 5-methyl-5-cyanobicyclo[2.2.1]hept-2-ene, 5,6-di(methoxycarbonyl)bicyclo[2.2.1]hept-2-ene, 5,6-di(ethoxycarbonyl)bicyclo[2.2.1]hept-2-ene, 5,6-di(n-propoxycarbonyl)bicyclo[2.2.1]hept-2-ene, 5,6-di(i-propoxycarbonyl)bicyclo[2.2.1]hept-2-ene, 5,6-di(n-butoxycarbonyl)bicyclo[2.2.1]hept-2-ene, 5,6-di(t-butoxycarbonyl,)bicyclo[2.2.1]hept-2-ene, 5,6-di(phenoxycarbonyl)bicyclo[2.2.1]hept-2-ene, 5,6-di(tetrahydrofuranyloxycarbonyl)bicyclo[2.2.1]hept-2-ene, 5,6-di(tetrahydropyranyloxycarbonyl)bicyclo[2.2.1]hept-2-ene, and 5,6-dicarboxyanhydridebicyclo[2.2.1]hept-2-ene, 8-methoxycarbonyltetracyclo[4.4.0.1$^{2,5}$.1$^{7,10}$]dodec-3-ene, 8-ethoxycarbonyltetracyclo[4.4.0.1$^{2,5}$.1$^{7,10}$]dodec-3-ene, 8-n-propoxycarbonyltetracyclo[4.4.0.1$^{2,5}$.1$^{7,10}$]dodec-3-ene, 8-i-propoxycarbonyltetracyclo[4.4.0.1$^{2,5}$.1$^{7,10}$]dodec-3-ene, 8-n-butoxycarbonyltetracyclo[4.4.0.1$^{2,5}$.1$^{7,10}$]dodec-3-ene, 8-(2-methylpropoxy)carbonyltetracyclo[4.4.0.1$^{2,5}$.1$^{7,10}$]dodec-3-ene, 8-(1-methylpropoxy)carbonyltetracyclo[4.4.0.1$^{2,5}$.1$^{7,10}$]dodec-3-ene, 8-t-butoxycarbonyltetracyclo[4.4.0.1$^{2,5}$.1$^{7,10}$]dodec-3-ene, 8-cyclohexyloxycarbonyltetracyclo[4.4.0.1$^{2,5}$.1$^{7,10}$]dodec-3-ene, 8-(4'-t-butylcyclohexyloxy)carbonyltetracyclo[4.4.0.1$^{2,5}$.1$^{7,10}$]dodec-3-ene, 8-phenoxycarbonyltetracyclo[4.4.0.1$^{2,5}$.1$^{7,10}$]dodec-3-ene, 8-tetrahydrofuranyloxycarbonyltetracyclo[4.4.0.1$^{2,5}$.1$^{7,10}$]-3-dodecene, 8-tetrahydropyranyloxycarbonyltetracyclo[4.4.0.1$^{2,5}$.1$^{7,10}$]dodec-3-ene, 8-acetyloxytetracyclo[4.4.0.1$^{2,5}$.1$^{7,10}$]dodec-3-ene, 8-methyl-8-methoxycarbonyltetracyclo[4.4.0.1$^{2,5}$.1$^{7,10}$]dodec-3-ene, 8-methyl-8-ethoxycarbonyltetracyclo[4.4.0.1$^{2,5}$.1$^{7,10}$]dodec-3-ene, 8-methyl-8-n-propoxycarbonyltetracyclo[4.4.0.1$^{2,5}$.1$^{7,10}$]dodec-3-ene, 8-methyl-8-i-propoxycarbonyltetracyclo[4.4.0.1$^{2,5}$.1$^{7,10}$]dodec-3-ene, 8-methyl-8-n-butoxycarbonyltetracyclo[4.4.0.1$^{2,5}$.1$^{7,10}$]dodec-3-ene, 8-methyl-8-(2-methylpropoxy)carbonyltetracyclo[4.4.0.1$^{2,5}$.1$^{7,10}$]dodec-3-ene, 8-methyl-8-(1-methylpropoxy)carbonyltetracyclo[4.4.0.1$^{2,5}$.1$^{7,10}$]dodec-3-ene, 8-methyl-8-t-butoxycarbonyltetracyclo[4.4.0.1$^{2,5}$.1$^{7,10}$]dodec-3-ene, 8-methyl-8-cyclohexyloxycarbonyltetracyclo[4.4.0.1$^{2,5}$.1$^{7,10}$]dodec-3-ene, 8-methyl-8-(4'-t-butylcyclohexyloxy)carbonyltetracyclo[4.4.0.1$^{2,5}$.1$^{7,10}$]dodec-3-ene, 8-methyl-8-phenoxycarbonyltetracyclo[4.4.0.1$^{2,5}$.1$^{7,10}$]dodec-3-ene, 8-methyl-8-tetrahydrofuranyloxycarbonyltetracyclo[4.4.0.1$^{2,5}$.1$^{7,10}$]-3-dodecene, 8-methyl-8-tetrahydropyranyloxycarbonyltetracyclo[4.4.0.1$^{2,5}$.1$^{7,10}$]-3-dodecene, 8-methyl-8-acetyloxytetracyclo[4.4.0.1$^{2,5}$.1$^{7,10}$]dodec-3-ene, 8-methyl-8-cyanotetracyclo[4.4.0.1$^{2,5}$.1$^{7,10}$]dodec-3-ene, 8,9-di(methoxycarbonyl)tetracyclo[4.4.0.1$^{2,5}$.1$^{7,10}$]dodec-3-ene, 8,9-di(ethoxycarbonyl)tetracyclo[4.4.0.1$^{2,5}$.1$^{7,10}$]dodec-3-ene, 8,9-di(n-propoxycarbonyl)tetracyclo[4.4.0.1$^{2,5}$.1$^{7,10}$]dodec-3-ene, 8,9-di(i-propoxycarbonyl)tetracyclo[4.4.0.1$^{2,5}$.1$^{7,10}$]dodec-3-ene, 8,9-di(n-butoxycarbonyl)tetracyclo[4.4.0.1$^{2,5}$.1$^{7,10}$]dodec-3-ene, 8,9-di(t-butoxycarbonyl)tetracyclo[4.4.0.1$^{2,5}$.1$^{7,10}$]dodec-3-ene, 8,9-di(cyclohexyloxycarbonyl)tetracyclo[4.4.0.1$^{2,5}$.1$^{7,10}$]dodec-3-ene, 8,9-di(phenoxycarbonyl)tetracyclo[4.4.0.1$^{2,5}$.1$^{7,10}$]dodec-3-ene, 8,9-di(tetrahydrofuranyloxycarbonyl)tetracyclo[4.4.0.1$^{2,5}$.1$^{7,10}$]-3-dodecene, 8,9-di(tetrahydropyranyloxycarbonyl)tetracyclo[4.4.0.1$^{2,5}$.1$^{7,10}$]-3-dodecene, 8,9-dicarboxyanhydridetetracyclo[4.4.0.1$^{2,5}$.1$^{7,10}$]dodec-3-ene, tetracyclo[4.4.0.1$^{2,5}$.1$^{7,10}$]dodec-3-ene, tetracyclo[4.4.0.1$^{2,5}$.1$^{7,10}$]dodec-3-ene-8-carboxylic acid, 8-methyltetracyclo[4.4.0.1$^{2,5}$.1$^{7,10}$]dodec-3-ene-8-carboxylic acid, 8-methyltetracyclo[4.4.0.1$^{2,5}$.1$^{7,10}$]dodec-3-ene, 8-ethyltetracyclo[4.4.0.1$^{2,5}$.1$^{7,10}$]dodec-3-ene, 8-fluorotetracyclo[4.4.0.1$^{2,5}$.1$^{7,10}$]dodec-3-ene, 8-fluoromethyltetracyclo[4.4.0.1$^{2,5}$.1$^{7,10}$]dodec-3-ene, 8-difluoromethyltetracyclo[4.4.0.1$^{2,5}$.1$^{7,10}$]dodec-3-ene, 8-trifluoromethyltetracyclo[4.4.0.1$^{2,5}$.1$^{7,10}$]dodec-3-ene, 8-pentafluoroethyltetracyclo[4.4.0.1$^{2,5}$.1$^{7,10}$]dodec-3-ene, 8,8-difluorotetracyclo[4.4.0.1$^{2,5}$.1$^{7,10}$]dodec-3-ene, 8,9-difluorotetracyclo[4.4.0.1$^{2,5}$.1$^{7,10}$]dodec-3-ene, 8,8-bis(trifluoromethyl)tetracyclo[4.4.0.1$^{2,5}$.1$^{7,10}$]dodec-3-ene, 8,9-bis(trifluoromethyl)tetracyclo[4.4.0.1$^{2,5}$.1$^{7,10}$]dodec-3-ene, 8-methyl-8-trifluoromethyltetracyclo[4.4.0.1$^{2,5}$.1$^{7,10}$]dodec-3-ene, 8,8,9-trifluorotetracyclo[4.4.0.1$^{2,5}$.1$^{7,10}$]dodec-3-ene, 8,8,9-tris(trifluoromethyl)tetracyclo[4.4.0.1$^{2,5}$.1$^{7,10}$]dodec-3-ene, 8,8,9,9-tetrafluorotetracyclo[4.4.0.1$^{2,5}$.1$^{7,10}$]dodec-3-ene, 8,8,9,9-tetrakis(trifluoromethyl)tetracyclo[4.4.0.1$^{2,5}$.1$^{7,10}$]dodec-3-ene, 8,8-difluoro-9,9-bis(trifluoromethyl)tetracyclo[4.4.0.1$^{2,5}$.1$^{7,10}$]dodec-3-ene, 8,9-difluoro-8,9-bis(trifluoromethyl)tetracyclo[4.4.0.1$^{2,5}$.1$^{7,10}$]dodec-3-ene, 8,8,9-trifluoro-9-trifluoromethyltetracyclo[4.4.0.1$^{2,5}$.1$^{7,10}$]dodec-3-ene, 8,8,9-trifluoro-9-trifluoromethyltetracyclo[4.4.0.1$^{2,5}$.1$^{7,10}$]dodec-3-ene, 8,8,9-trifluoro-9-pentafluoropropoxytetracyclo[4.4.0.1$^{2,5}$.1$^{7,10}$]dodec-3-ene, 8-fluoro-8-pentafluoroethyl-9,9-bis(trifluoromethyl)tetracyclo[4.4.0.1$^{2,5}$.1$^{7,10}$]dodec-3-ene, 8-9-difluoro-8-heptafluoroisopropyl-9-trifluoromethyltetracyclo[4.4.0.1$^{2,5}$.1$^{7,10}$]dodec-3-ene, 8-chloro-8,9,9-trifluorotetracyclo[4.4.0.1$^{2,5}$.1$^{7,10}$]dodec-3-ene, 8,9-dichloro-8,9-bis(trifluoromethyl)tetracyclo[4.4.0.1$^{2,5}$.1$^{7,10}$]dodec-3-ene, 8-(2,2,2-trifluorocarboxyethyl)tetracyclo[4.4.0.1$^{2,5}$.1$^{7,10}$]dodec-3-ene, 8-methyl-8-(2,2,2-trifluorocarboxyethyl)tetracyclo[4.4.0.1$^{2,5}$.1$^{7,10}$]dodec-3-ene, tricyclo[4.4.0.1$^{2,5}$]undeca-3-ene, tricyclo[6.2.1.0$^{1,8}$]undeca-9-ene, tetracyclo[4.4.0.1$^{2,5}$.1$^{7,10}$.0$^{1,6}$]dodec-3-ene, 8-methyltetracyclo[4.4.0.1$^{2,5}$.1$^{7,10}$.0$^{1,6}$]dodec-3-ene, 8-ethylidenetetracyclo[4.4.0.1$^{2,5}$.1$^{7,12}$]dodec-3-ene, 8-ethylidenetetracyclo[4.4.0.1$^{2,5}$.1$^{7,10}$.0$^{1,6}$]dodec-3-ene, pentacyclo[6.5.1.1$^{3,6}$.0$^{2,7}$.0$^{9,13}$]pentadeca-4-ene, pentacyclo[7.4.0.1$^{2,5}$.1$^{9,12}$.0$^{8,13}$]

pentadeca-3-ene, 5-(n-hexyl)-bicyclo[2.2.1]hept-2-ene, 5-(triethoxysily)bicyclo[2.2.1]]hept-2-ene, and bicyclo[2.2.1]hept-2-ene-5-methoxy diphenyl methyl silane (also referred to herein as diphenyl methyl (norbornene methoxy) silane).

Examples of polymerizable norbornene-type monomers include but are not limited to, norbornene (bicyclo[2.2.1]hept-2-ene), 5-methyl-2-norbornene, ethylnorbornene, propylnorbornene, isopropylnorbornene, butylnorbornene, isobutylnorbornene, pentylnorbornene, hexylnorbornene, heptylnorbornene, octylnorbornene, decylnorbornene, dodecylnorbornene, octadecylnorbornene, trimethoxysilylnorbornene, butoxynorbornene, p-tolylnorbornene, methylidene norbornene, pentylnorbornene, ethylidenenorbornene, vinylnorbornene, exo-dicyclopentadiene, endo-dicyclopentadiene, tetracyclododecene, methyltetracyclododecene, dimethyltetracyclododecene, ethyltetracyclododecene, ethylidenyl tetracyclododecene, phenyltetracyclodecene, tetramers of cyclopentadiene, propylnorbornene, 5,8-methylene-5a,8a-dihydrofluorene, cyclohexenylnorbornene, dimethanohexahydronaphthalene, endo,exo-5,6-dimethoxynorbornene, endo,endo-5,6-dimethoxynorbornene, 2,3-dimethoxynorbornadiene, 5,6-bis(chloromethyl)bicyclo[2.2.1]hept-2-ene, 5-tris(ethoxy) silylnorbornene, 2-dimethylsilylbicyclo[2.2.1]hepta-2,5-diene, 2,3-bistrifluoromethylbicyclo[2.2.1]hepta-2,5-diene, 5-fluoro-5-pentafluoroethyl-6-,6-bis(trifluoromethyl) bicyclo[2.2.1]hept-2-ene, 5,6-difluoro-5-heptafluoroisopropyl-6-trifluoromethyl)bicyclo[2.2.1]hept-2-ene, 2,3,3,4,4,5,5,6-octafluorotricyclo[5.2.1.0]dec-8-ene, and 5-trifluoromethylbicyclo[2.2.1]hept-2-ene, 5-a-naphthyl-2-norbornene, 5,5-dimethyl-2-norbornene, 1,4,4a,9,9a,10-hexahydro-9,10[1',2']-benzeno-1,4-methanoanthracene, indanylnorbornene (i.e., 1,4,4,9-tetrahydro-1,4-methanofluorene, the reaction product of CPD and indene), 6,7,10,10-tetrahydro-7,10-methanofluoranthene (i.e., the reaction product of CPD with acenaphthalene), 1,4,4,9,9,10-hexahydro-9,10[1',2']-benzeno-1,4-methanoanthracene, endo,endo-5,6-dimethyl-2-norbornene, endo,exo-5,6-dimethyl-2-norbornene, exo,exo-5,6-dimethyl-2-norbornene, 1,4,4,5,6,9,10,13,14,14-decahydro-1,4-methanobenzocyclododecene (i.e., reaction product of CPD and 1,5,9-cyclododecatriene), 2,3,3,4,7,7-hexahydro-4,7-methano-1H-indene (i.e., reaction product of CPD and cyclopentene), 1,4,4,5,6,7,8,8-octahydro-1,4-methanonaphthalene (i.e., reaction product of CPD and cyclohexene), 1,4,4,5,6,7,8,9,10,10-decahydro-1,4-methanobenzocyclooctene (i.e., reaction product of CPD and cyclooctene), and 1,2,3,3,3,4,7,7,8,8,decahydro4,7-methanocyclopent[a]indene.

In another embodiment of the invention the polymer can be crosslinked during a post polymerization curing step (latent crosslinking). In this embodiment a norbornene-type monomer containing a pendant post crosslinkable functional group is copolymerized into the polycyclic backbone whereupon the functional group is subsequently crosslinked via well known techniques. By post crosslinkable functional group is meant that the functional group is inert to the initial polymerization reaction but is receptive to subsequent chemical reactions to effect the crosslinking of adjacent polymer chains. Suitable post crosslinkable monomers are set forth under Structure VII wherein at least one of $R^1$ to $R^4$ is selected from linear and branched, $C_2$–$C_{10}$ alkenyl, $C_4$–$C_{10}$ cycloalkenyl, —$(CH_2)_n Si(OR^5)_3$, wherein n and $R^5$ are as defined above, $R^1$ and $R^2$ or $R^3$ and $R^4$ can be taken together to represent a $C_1$–$C_{10}$, alkylidenyl radical, fused cyclic groups wherein $R^1$ and $R^4$ taken together with the two ring carbon atoms to which they are attached form an unsaturated $C_4$ to $C_8$ ring. In one embodiment, post crosslinkable alkenyl functional groups include vinyl, butenyl, and cyclohexyl. In one embodiment, alkylidenyl groups include methylidenyl and ethylidenyl substituents. In one embodiment, alkoxysilyl groups include trimethoxysilyl and triethoxysilyl moieties. In one embodiment, crosslinkers containing fused multicyclic ring systems include dicyclopentadiene (DCPD) and unsymmetrical trimer of cyclopentadiene (CPD).

The latent crosslinkable pendant groups can be reacted via a variety chemistries known to initiate the reaction of the various functional groups. For example, the alkenyl, cycloalkenyl, and alkylidenyl groups set forth under the definition $R^1$ to $R^5$ of Structure VII above can be crosslinked via a free radical mechanism. The alkoxysilyl groups can be crosslinked via a cationic reaction mechanism. Representative monomers that contain post crosslinkable functional groups are represented below.

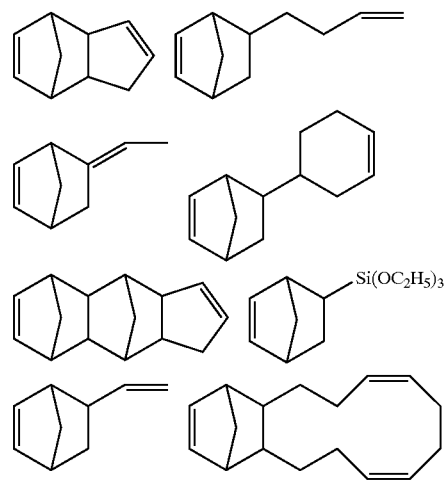

In the latent crosslinking embodiment of the invention the crosslinking reaction step can be induced by a free radical initiator. Suitable initiators are those that can be activated thermally or photochemically. The initiator can be added to the reaction medium and the polymerization of the monomer mixture is allowed to proceed to completion. If the latent initiator is present during polymerization, then a key consideration is that the radical generating compound employed be stable (does not decompose) at the polymerization temperature of the monomeric reaction medium. Alternatively, the latent initiator can be added to a solution of the polymer in an appropriate solvent after the polymerization has been completed. When utilizing thermally activated free radical generators or embodiments utilizing photo-acid generators, latent crosslinking is induced by exposing the polymer medium to temperatures above the decomposition temperature of the free radical generating compound. In embodiments utilizing photoinitiated free radical generators, latent crosslinking is induced by exposing the polymer medium to a radiation source such as e-beam and UV radiation. Suitable free radical generator compounds (crosslinking agents) include the organic peroxides and aliphatic azo compounds. The aliphatic azo compounds are suitable initiators for the thermal and photochemical activated crosslinking embodiments of the invention, while the organic peroxides are suitable for use in as thermally activated initiators only. The amount of crosslinking agent employed ranges from about 0.005 part by weight to about 5.0 parts by weight based on 100 parts by weight of monomer in the reaction medium.

Suitable organic peroxide include, but are not limited to, dibenzoyl peroxide, di(2,4-dichlorobenzoyl) peroxide, diacetyl peroxide, diisobutyryl peroxide, dilauroyl peroxide, t-butylperbenzoate, t-butylperacetate, 2,5-di (benzoylperoxy)-1,2-dimethylhexane, di-t-butyl diperoxyazelate, t-butyl peroxy-2-ethylhexanoate, t-amyl peroctoate, 2,5-di(2-ethylhexanoylperoxy)-2,5-dimethylhexane, t-butylperoxyneodecanoate, ethyl 3,3-di(t-butylperoxy)butyrate, 2,2-di(t-butylperoxy)butane, 1,1-di(t-butylperoxy)cyclohexane, 1,1-di(t-butylperoxy)-3,3,5-trimethylcyclohexane, 2,5-di(t-butylperoxy)-2,5-dimethylhex-3-yne, di-t-butyl peroxide, 2,5-di(t-butylperoxy)-2,5-dimethylhexane, dicumyl peroxide, n-propyl peroxydicarbonate, i-propyl peroxydicarbonate, cyclohexyl peroxydicarbonate, and acetyl peroxydicarbonate.

Suitable azo compounds include, but are not limited to, 2,2'-azobis[2,4-dimethyl]pentane, 2-(t-butylazo)-4-methoxy-2,4-dimethylpentanenitrile, 2,2'-azobis(i-butyronitrile), 2-(t-butylazo)-2,4-dimethylpentanenitrile, 2-(t-butylazo)i-butyronitrile, 2-(t-butylazo)-2-methylbutanenitrile, 1,1-azobis-cyclohexanecarbonitrile, 1-(t-amylazo)cyclohexanecarbonitrile, and 1-(t-butylazo) cyclohexanecarbonitrile.

Suitable photo-initiators for free-radical crosslinking include, but are not limited to, benzoin ethyl ether, diphenyl (2,4,6-trimethyl benzoyl) phosphine oxide, 4,4'-bis (diethylamino) benzophenone, 4,4'-bis(dimethylamino) benzophenone and 4-(dimethylamino) benzophenone.

Suitable photo-initiators for cationic crosslinking include, but are not limited to, onium salts, halogenated organic compounds, quinone diazide compounds, α,α-bis(sulfonyl) diazomethane compounds, α-carbonyl-α-sulfonyl diazomethane compounds, sulfone compounds, organic acid ester compounds, organic acid amide compounds, organic acid imide compounds, etc. Actual examples of onium salts are unsubstituted or symmetrically or asymmetrically substituted alkyl groups, alkenyl groups, aralkyl groups, aromatic groups, diazonium salts with heterocyclic groups, ammonium salts, iodonium salts, sulfonium salts, phosphonium salts, arsonium salts, oxonium salts, etc. There are no restrictions to counter anions of these onium salts as long as they are compounds that can form counter anions. Examples are boric acid, arsenic acid, phosphoric acid, antimonic acid, sulfonic acid, carboxylic acid, and their halides. There are no special restrictions to the halogenated organic compound as long as they are halides or organic compounds, and a variety of conventional compounds can be employed. Actual examples include halogen-containing oxadiazole compounds, halogen-containing triazine compounds, halogen-containing acetophenone compounds, halogen-containing benzophenone compounds, halogen-contianing sulfoxide compounds, halogen-containing sulfone compounds, halogen-containing thiazole compounds, halogen-containing oxazole compounds, halogen-containing triazole compounds, halogen-containing 2-pyrone compounds, halogen-containing aliphatic hydrocarbon compounds, halogen-containing aromatic compounds, other halogen-containing heterocyclic compounds, sulfonyl halide compounds, etc. Actual examples of o-quinone diazide compounds are 1,2-benzoquinone diazido-4-sulfonic acid ester, 1,2-naphthoquinone diazido-4-sulfonic acid ester, 1,2-naphthoquinone diazido-5-sulfonic acid ester, 1,2-naphthoquinone diazido-6-sulfonic acid ester, 2,1-naphthoquinone diazido-4-sulfonic acid ester, 2,1-naphthoquinone diazido-5-sulfonic acid ester, 2,1-naphthoquinone diazido-6-sulfonic acid ester, other quinone diazido derivative sulfonic acid esters, 1,2-benzoquinone diazido-4-sulfonic acid chloride, 1,2-naphthoquinone diazido-4-sulfonic acid chloride, 1,2-naphthoquinone diazido-5-sulfonic acid chloride, 1,2-naphthoquinone diazido-6-sulfonic acid chloride, 2,1-naphthoquinone diazido-4-sulfonic acid chloride, 2,1-naphthoquinone diazido-5-sulfonic acid chloride, 2,1-naphthoquinone diazido-6-sulfonic acid chloride, and other quinone diazide derivative sulfonic acid chlorides. Examples of α,α-bis (sulfonyl)diazomethane compounds are unsubstituted or symmetrically or asymmetrically substituted α,α-bis (sulfonyl)diazomethane with alkyl groups, alkenyl groups, aralkyl groups, aromatic groups, or heterocyclic groups, etc. Actual examples of α-carbonyl-α-sulfonyl diazomethane compounds are unsubstituted or symmetrically or asymmetrically substituted α-carbonyl-α-sulfonyl diazomethane with alkyl groups, alkenyl groups, arakyl groups, aromatic groups, or heterocyclic groups. Actual examples of sulfone compounds are non-substituted or symmetrically or asymmetrically substituted sulfone compounds or disulfone compounds with alkyl groups, alkenyl groups, aralkyl groups, aromatic groups or heterocyclic groups. Actual examples of organic acid esters are unsubstituted or symmetrically or asymmetrically substituted carboxylic acid esters, sulfonic acid esters, etc., with alkyl groups, alkenyl groups, aralkyl groups, aromatic groups or heterocyclic groups. Actual examples of organic acid amide groups are unsubstituted or symmetrically or asymmetrically substituted carboxylic acid amides, sulfonic acid amides, etc., with alkyl groups, alkenyl groups, aralkyl groups, aromatic groups or heterocyclic groups. Actual examples of organic imides are unsubstituted or symmetrically or asymmetrically substituted carboxylic acid imides, sulfonic acid imides, etc., with alkyl groups, alkenyl groups, aralkyl groups, aromatic groups or heterocyclic groups. One or more of the photo-initiators can be utilized in the invention.

When a latent initiator is present during polymerization or in the polymerization medium, the decomposition temperatures of the foregoing free radical generator compounds are well known in the art and can be selected on the basis of the polymerization temperatures employed in initial reaction. In other words the initiator compound must be stable at the polymerization temperatures so it is available for the post polymerization crosslinking reaction. As described above latent crosslinking is can be effected by thermal or photochemical means.

As described above, monomers containing trialkoxysilyl groups can be crosslinked by latent crosslinking in the presence of a cationic initiator agent. A polymerization stable cationic initiator can be can be thermally activated to induce the latent crosslinking of the silyl groups. Suitable cationic crosslinking initiators include, for example, dibutyltin dilaurate, dimethyltin dilaurate, and dioctyltin dilaurate.

The amount of multifunctional norbornene-type crosslinkable monomers and post crosslinkable monomers that are optionally present in the reaction mixture can range from about 0.1 mole percent to about 50 mole percent based on the total monomer in the monomer mixture to be reacted. In one embodiment, the amount of crosslinker ranges from about 1 mole percent to about 25 mole percent of the total monomer mixture. In another embodiment,the amount of crosslinker ranges from about 1 mole percent to about 10 mole percent of the total monomer mixture.

Monomer Polymerization

The monomers of the invention are polymerized in solution or in mass. The catalyst is added to the reaction medium containing the desired monomer(s) as a preformed single component catalyst or the catalyst can be formed in situ by admixing the pro-catalyst component, the Group 15 electron donor component, and the WCA salt activator component in the reaction medium. When the pro-catalyst is ligated with the Group 15 electron donor component, it is not necessary to employ the Group 15 electron donor as a separate component. In one in situ embodiment the ligated pro-catalyst component (e.g., containing desired ligand group (s)) is admixed with the WCA salt activator component in the reaction medium. In another in situ embodiment a pro-catalyst component with or without ligands is admixed with a desired ligand containing component(s) and the WCA salt activator component in the reaction medium. The pro-catalyst components are generically exemplified in the preformed catalyst preparation equations (1) to (4) set forth above. In one embodiment, the molar ratio of pro-catalyst (based on the Group 10 metal): Group 15 electron donor component: WCA salt is 1:1–10:1–100. In anther embodiment, the ratio is 1:1–5:1–20. In yet another embodiment, the ratio is 1:1–2:1–5. In embodiments of the invention where the pro-catalyst is ligated with a Group 15 electron donor ligand and/or a labile neutral electron donor ligand, the molar ratio of pro-catalyst (based on the metal content) to WCA salt is 1:1–100. In another embodiment, the ratio is 1:1–20. In yet another embodiment, the ratio is 1:1–5. The order of addition of the various catalyst components to the reaction medium is not important.

The polymers prepared by the process of the invention are addition polymers of polycycloolefinic repeating units linked through 2,3-enchainment. The repeating units are polymerized from a polycycloolefin monomer or combination of polycycloolefin monomers that contain at least one norbornene-type moiety as described herein.

Solution Process

In the solution process the polymerization reaction can be carried out by adding a solution of the preformed catalyst or individual catalyst components to a solution of the cycloolefin monomer or mixtures of monomers to be polymerized. The amount of monomer in solvent, in one embodiment, ranges from 10 to 50 weight percent. In another embodiment, the amount of monomer in solventranges from 20 to 30 weight percent. After the single component catalyst or catalyst components are added to the monomer solution, the reaction medium is agitated (e.g., stirred) to ensure complete mixing of catalyst and monomer components.

The polymerization reaction temperatures can range from about 0° C. to about 150° C. In another embodiment, the polymerization reaction temperatures can range from about 10° C. to about 100° C. In yet another embodiment, the polymerization reaction temperatures can range from about 20° C. to about 80° C.

Examples of solvents for the polymerization reaction include but are not limited to alkane and cycloakane solvents such as pentane, hexane, heptane, and cyclohexane; halogenated alkane solvents such as dichloromethane, chloroform, carbon tetrachloride, ethylchloride, 1,1-dichloroethane, 1,2-dichloroethane, 1-chloropropane, 2-chloropropane, 1-chlorobutane, 2-chlorobutane, 1-chloro-2-methylpropane, and 1-chloropentane; aromatic solvents such as benzene, xylene, toluene, mesitylene, chlorobenzene, and o-dichlorobenzene, Freon® 112 halocarbon solvent, water; or mixtures thereof. In one embodiment, the solvent is selected from cyclohexane, toluene, mesitylene, dichloromethane, 1,2-dichloroethane, and water.

When an aqueous polymerization medium is desired, the Group 15 electron donor ligand or component may be chosen from the water soluble phosphines set forth above, although this is not a strict requirement. The polymerization reaction can be conducted in suspension or emulsion. In suspension, the monomers are suspended in an aqueous medium containing a suspension agent selected from one or more water soluble substances such as, for example, polyvinyl alcohol, cellulose ether, partially hydrolyzed polyvinyl acetate, or gelatin and then carrying out the reaction in the presence of the catalyst system of the invention.

The emulsion polymerization can in general be carried out by emulsifying the monomers in water or a mixed solvent of water and a water-miscible organic solvent (such as methanol, or ethanol). In one embodiment, this is done in the presence of at least one emulsifying agent. Then, the emulsion polymerization is carried out in the presence of the catalyst as described herein. Emulsifying agents include, for example, mixed acid soaps containing fatty and rosin acids, alkyl sulfonate soaps and soaps of oligomeric naphthalene sulfonates.

Mass Process

In the mass polymerization process according to the invention at least one monomer component (e.g., at least one cycloolefinic monomer) is polymerized using a catalyst system. In another embodiment, the mass polymerization process according to the invention polymerizes at least one monomer crosslinking component (e.g., at least one cycloolefinic crosslinking monomer) using a catalyst system. In yet another embodiment, the mass polymerization process according to the invention is a two component monomer system (i.e. at least two cycloolefinic monomers of which none, one or two can be a crosslinking monomer) which is polymerized using a catalyst system. In still another embodiment, the mass polymerization process according to the invention is at least a three component monomer system (i.e. at least two cycloolefinic monomers of which at least one of which is a crosslinking monomoer) which is polymerized using a catalyst system.

The term mass polymerization refers to a polymerization reaction which is generally carried out in the substantial absence of a solvent. In some cases, however, a small proportion of solvent is present in the reaction medium. Small amounts of solvent can be conveyed to the reaction medium via the introduction of the catalyst system components which are in some cases dissolved in solvent. Solvents also can be employed in the reaction medium to reduce the viscosity of the polymer at the termination of the polymerization reaction to facilitate the subsequent use and processing of the polymer. The amount of solvent that can be present in the reaction medium ranges from 0 to about 20 percent based on the weight of the monomer(s) present in the reaction mixture. In another embodiment, the amount of solvent that can be present in the reaction medium ranges from 0 to about 10 percent based on the weight of the monomer(s) present in the reaction mixture. In still another embodiment, the amount of solvent present that can be in the reaction medium ranges from 0 to about 1 percent, based on the weight of the monomer(s) present in the reaction mixture. In one embodiment, the solvent or solvents utilized are chosen such that the catalyst system components dissolve therein. Examples of solvents include, but are not limited to, alkane and cycloalkane solvents such as pentane, hexane, heptane, and cyclohexane; halogenated alkane solvents such as dichloromethane, chloroform, carbon tetrachloride, ethylchloride, 1,1-dichloroethane, 1,2-dichloroethane, 1-chloropropane, 2-chloropropane, 1-chlorobutane, 2-chlorobutane, 1-chloro-2-methylpropane, and 1-chloropentane; esters such as ethylacetate, i-amylacetate; ethers such as THF and diethylether; aromatic solvents such as benzene, xylene, toluene, mesitylene, chlorobenzene, and o-dichlorobenzene; and halocarbon solvents such as Freon® 112; and mixtures thereof. In one embodiment, the solvent or solvents is/are selected from benzene, fluorobenzene, o-difluorobenzene, p-difluorobenzene, pentafluorobenzene, hexafluorobenzene, o-dichlorobenzene, chlorobenzene, toluene, o-, m-, and p-xylenes, mesitylene, cyclohexane, ethylacetate, THF, and dichloromethane.

A ligated pro-catalyst containing a Group 15 electron donor ligand is prepared in solvent and then added to the desired monomer or mixture of monomers containing the dissolved WCA salt activator. The reaction mixture is mixed and the reaction is permitted to proceed from about 1 minute to about 2 hours. The reaction mixture can be optionally heated at a temperature ranging from about 20° C. to about 200° C. The polymerization temperature is not specifically limited. In one embodiment, the polymerization temperature is in the range of 20° C. to 120° C. In another embodiment, the polymerization temperature is in the range of 20° C. to 90° C.

The polymerization reaction can be carried out under an inert atmosphere such as nitrogen or argon. Advantageously, however, it has been found that the catalyst system components of the invention are moisture and oxygen insensitive, allowing for less stringent handling and processing conditions. Following the initial polymerization reaction a polymer cement is obtained. The cement can be applied to a desired substrate or conveyed into a mold and post cured to complete the polymerization reaction.

Without wishing to be bound by theory of invention it is believed that post curing is desirable from the standpoint of monomer to polymer conversion. In a mass process the monomer is essentially the diluent for the catalyst system components. As monomer is converted to polymer a plateau is reached beyond which conversion of monomer to polymer can go no higher (vitrification). This conversion barrier results from the loss of reactant mobility as the reaction medium becomes converted to a polymeric matrix. Consequently, the catalyst system components and unconverted monomer become segregated and can not react. It is well known that diffusivity within a polymer decreases dramatically as the polymer passes from the rubbery state to the glassy state. It is believed that post curing at elevated temperatures increases the mobility of the reactants in the matrix allowing for the further conversion of monomer to polymer.

Post curing of the polymers of the invention is, in one embodiment, conducted at elevated temperatures for a time period sufficient to reach a desired conversion of monomer to polymer. In one embodiment, the post curing cycle is conducted for about 1 to about 2 hours over a temperature range of from about 100° C. to about 300° C. In another embodiment, the post curing cycle is conducted for about 0.5 to about 4 hours at a over a temperature range of from about 100° C. to about 300° C. In another embodiment, the post curing cycle is conducted for 1 to 2 hours over a temperature range of from about 125° C. to about 200° C. In still another embodiment, the post curing cycle is conducted for 1 to 2 hours over a temperature range of from about 140° C. to about 180° C. The cure cycle can be effected at a constant temperature or the temperature can be ramped, e.g., incrementally increasing the curing temperature from a desired minimum curing temperature to a desired maximum curing temperature over the desired curing cycle time range. In one embodiment (A) the temperature ramping can be effected by following a gradual increasing slope on a temperature vs. time plot from the desired minimum temperature to the desired maximum temperature in the cure cycle. In this embodiment when the maximum temperature is reached, the temperature maximum can optionally be held for a desired period of time until the desired cure state is attained. In an alternate embodiment (B) the temperature ramping can follow a stepwise curve on a temperature vs. time plot. In this embodiment the temperature ramping proceeds in step fashion from the desired minimum cure temperature to the desired maximum cure temperature in the cure cycle. In another embodiment (C) the post cure can be effected by combining post cure embodiments (A and B) wherein the cure cycle encompasses a combination of steps and slopes from the desired minimum cure temperature to the desired maximum cure temperature. In still another embodiment (D and E) the cure cycle can follow a curve from the desired minimum cure temperature to the desired maximum cure temperature. In embodiments A, B, and C the rise and run of the slope do not have to be constant between the minimum and maximum cure temperatures of the cure cycle. In other words the rise and run can vary when proceeding from the desired minimum to desired maximum cure temperatures. The foregoing cure cycle temperature ramping curves are illustrated below.

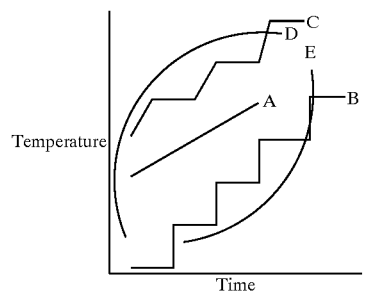

Ramping of the temperature during the cure cycle is advantageous because it diminishes the potential for catalyst degradation and the volatilization of unconverted monomer.

In another embodiment, the polymerization and the post-curing are both conducted together. In one embodiment, the polymerization/post-cure is conducted for 1 to 2 hours at a temperature in the range of from about 20° C. to about 200° C. In another embodiment, the polymerization/post cure is conducted for 1 to 2 hours at a temperature in the range of from about 125° C. to about 200° C. In still another embodiment, the post curing cycle is conducted for 1 to 2 hours over a temperature range of from about 140° C. to about 180° C.

Alternatively, the polymerization/post-cure can be conducted at more than one temperature (i.e. within a range of temperatures). For example, the polymerization/post-cure can be conducted over a range of temperatures similar to the ranges given immediately above. If the polymerization/post-cure is being conducted within a range of temperatures, the temperature at which the polymerization/post-cure is being conducted can be altered according to the description above with regard to temperature ramping.

Optionally, additives may include, but are not limited to, those selected from blowing agents, foaming agents, pigments, dyes, non-linear optical dyes, erbium complexes, praseodymium complexes, neodymium complexes, fillers such as mica, germania, titania, zirconia, boron nitrides, silicon nitrides, silicon carbides, barium titanate, lead magnesium niobate-lead titanate (Tamtron® Y5V183U dielectric filler available from Tam Ceramics), gold coated polymer latices, silver particles, plasticizers, lubricants, flame retardants, tackifiers, antioxidants (e.g., Irganox® 1010, 1076, 3114, or Cyanox® 1790), fibers, UV stabilizers, masking agents, odor absorbing agents, crosslinking agents, synergists (e.g., Irgafos® 168, thiodipropionic acid dilauryl ester, or a combination of both), tougheners and impact modifiers, polymeric modifiers and viscosifiers and mixtures thereof (e.g., poly-iso-butylene, EPDM rubbers, siloxane oligomers and mixtures thereof), can be added by mixing one or more of them into the monomer medium before the polymerization reaction is initiated. The identity and relative amounts of such components are well known to those skilled in the art and need not be described in detail here.

The optional additives are employed to enhance the processing, appearance and/or the physical properties of the polymer. For example, the additives can be utilized to enhance and modify inter alia the coefficient of thermal expansion, stiffness, impact strength, dielectric constant, solvent resistance, color, optical properties and odor of the polymer product. The viscosifiers are employed to modify the viscosity and shrinkage of the monomeric mixture before the polymerization reaction is initiated. Suitable viscosity modifiers include elastomers and the norbornene-type polymers of the invention. The viscosity modifiers can be dissolved in the polymerizable monomers of the invention to increase the viscosity of the monomer reaction mixture. As described above, crosslinking can be effected during the initial polymerization reaction of the monomer mixture or during a post polymerization thermal or photochemical curing step.

In one embodiment, when a pro-catalyst is employed in the mass polymerization system of the invention, the molar ratio of monomer to pro-catalyst (based on metal content) to WCA salt activator ratios ranges from about 500,000:1:1 to about 5,000:1:20. In another embodiment, the molar ratio of monomer to pro-catalyst (based on metal content) to WCA salt activator ratios ranges from about 250,000:1:5 to about 20,000:1:10. In yet another embodiment, the molar ratio of monomer to pro-catalyst (based on metal content) to WCA salt activator ratios ranges from about 200,000:1:20 to about 100,000:1:1.

Further information regarding the above can be found in International Patent Application Publication No. WO 00/20472 to The BFGoodrich Company, published on Apr. 13, 2000, and International Patent Application Publication No. WO 00/34344 also to The BFGoodrich Company, published on Jun. 15, 2000, both of which are hereby incorporated herein by reference in its entirety.

Optical Waveguide Formulations

In one embodiment, a waveguide is formed using one of the methods disclosed below with at least two polyacrylate, polyimide, benzocyclobutene, cyclic olefin polymers, such that the core material and the clad material have a difference in their indices of refraction at 830 nm (Δn at 830 nm), core versus clad, of at least 0.00075 or more (or at least 0.05% when the clad refractive index is 1.5). That is, the refractive index of the polymer core layer is at least 0.05% greater than the refractive index of the at least one polymer cladding layer. If the waveguide is a three layer waveguide, the cladding layers (top cladding layer and sub-cladding layer) may be different polymers layers so long as both cladding layers have a refractive index which is at least 0.05% less than that of the polymer used to form the core layer.

In another embodiment, when the waveguide is to be formed from cyclic olefin monomers, both the core and cladding polymer layers of the optical waveguide of the invention are formulated to include at least one cyclic olefin monomer (e.g., at least one norbornene-type monomers) and/or at least one crosslinking monomer, at least one pro-catalyst (see the description of pro-catalysts above under the Catalyst Preparation heading), at least one co-catalyst (i.e., a WCA salt having a weakly coordinating ion, see above), and optionally one or more of the additives described above (see the description under the Mass Process heading).

Such a mixture is polymerized using the above-described mass polymerization process (see the description under the Mass Process heading) by either adding the pro-catalyst to a mixture containing the at least one cyclic olefin monomer, the co-catalyst, and any optional additives, or by adding the co-catalysts to a mixture containing the at least one cyclic olefin monomer, the pro-catalysts, and any optional additives. In both these situations the active catalyst is generated in situ.

In yet another embodiment, each of the clad and core formulations (which differ to the extent necessary to produce the required difference in their respective refractive indices) is formed from a 2-component system. That is, the clad formulation is produced from at least two components, Components A and B. On the other hand, the core formulation is also produced from at least two components, Components C and D. Each of components A through D contain at least one norbornene-type monomer.

In another embodiment, Components A and B are two substantially identical mixtures of the at least one norbornene-type monomer and/or at least one crosslinking monomer. The difference between Components A and B generally arises from the inclusion of a pro-catalyst in Component A versus the inclusion of a co-catalyst in Component B. Additional differences between Component A and Component B may exist. For example, Component A may contain an optional additive not present in Component B, or vice versa.

In one embodiment, Component A comprises at least one norbornene-type monomer and/or at least one crosslinking monomer, at least one pro-catalyst and optionally an additive as described above (such as an antioxidant). Whereas, Component B comprises the same norbornene-type monomer(s), the same crosslinker(s), at least one co-catalyst, and optionally an additive (such as an antioxidant) and/or a synergist. In this situation, polymerization is conducted using the Mass Process polymerization method by mixing equal amounts of Components A and B, thereby generating the active polymerization catalyst in situ.

Alternatively, each of the clad and/or clad formulations may be a one part mixture in which at least one norbornene-type monomer and/or at least one crosslinking monomer, at least one co-catalyst, and any optional additives are present. To cause the polymerization reaction to occur a pro-catalyst is added to the above mixture(s). In another embodiment, each of the core and/or clad formulations may be a one part mixture in which at least one norbornene-type monomer and/or at least one crosslinker, at least one pro-catalyst, and any optional additives are present. To cause the polymerization reaction to occur a co-catalyst is added to the above mixture(s). Again it is noted, that generally the clad and core formulations differ with respect to the at least one norbornene-type monomer and/or at least one crosslinking monomer present therein. It is this difference, in one embodiment, that permits the formation of polymers having the necessary difference in their respective refractive indices.

In another embodiment, each of the clad and/or core formulations contain at least one norbornene-type crosslinking monomer (as described above), at least one co-catalyst and any optional additives as described above. To cause the polymerization reaction to occur a pro-catalyst is added to the above mixture(s). Alternatively, the above mixture could be divided into two or more portions and the co-catalyst added to one portion while the pro-catalyst is added to another portion. In this instance, polymerization is accomplished by the combination of all of the portions.

In yet another embodiment, each of the core and/or clad formulation may be a one part mixture in which at least one norbornene-type crosslinking monomer, at least one pro-catalyst, and any optional additives are present. To cause the polymerization reaction to occur a co-catalyst is added to the above mixture(s). Again it is noted, that generally the clad and core formulations differ with respect to the at least one norbornene-type crosslinking monomer present therein. It is this difference, in one embodiment, that permits the formation of polymers having the necessary difference in their respective refractive indices. Alternatively, the above mixture could be divided into two or more portions and the co-catalyst added to one portion while the pro-catalyst is added to another portion. In this instance, polymerization is accomplished by the combination of all of the portions.

Below are some exemplary clad and core formulations. These formations are exemplary in nature and are not meant to serve as an exhaustive list of the possible formulations for each of the clad and core. Rather, other clad and core formulations can be produced in view of the above disclosure so long as the refractive index of the polymer produced using the core formulation is at least 0.05% larger than that of the polymer produced using the clad formulation.

Exemplary Clad Formulations

In one embodiment, the clad formulation contains: (1) one norbornene-type monomer containing a pendant $C_4$ to $C_{20}$ alkyl group, (2) one norbornene-type monomer containing a pendant $C_1$ to $C_{10}$ alkoxysilyl group, and (3) at least one crosslinker (as disclosed above). In addition to components (1), (2) and (3), the clad formulation also contains at least one pro-catalyst, at least one co-catalyst, and optionally an additive or additives as described above. As noted above, if components (1), (2) and (3) are all present in one mixture then either the pro-catalyst or the co-catalyst is held out of the mixture and added to the mixture at a later time.

Alternatively, components (1), (2) and (3) can be divided into two or more portions and the pro-catalyst added to one portion to form Component A (which can optionally include an additive or additives). To another portion of components (1), (2) and (3) is added the co-catalyst to form Component B (which can optionally include the same, different or additional additives as Component A). Polymerization is accomplished in this embodiment by combining Component A and Component B (along with any other portion of component (1), (2) and (3) not used to for Components A and B).

In one embodiment, component (3) is at least one crosslinker selected from dimethyl bis(norbornenemethoxy) silane, octamethyl 1,8-bis(norbornenemethoxy) tetrasiloxane, bis(norbornenementhyl)acetal or a fluorinated crosslinker (such as F-Crosslinkers I and II shown above).

Exemplary Core Formulations

In one embodiment, the core formulation contains: (1) one norbornene-type monomer containing a pendant $C_4$ to $C_{20}$ alkyl group, (2) one norbornene-type monomer containing a pendant silane group with at least one $C_6$ to $C_{12}$ aryl group attached to the Si atom of the silane group, and (3) at least one crosslinker (as disclosed above). In addition to components (1), (2), and (3) the core formulation also contains at least one pro-catalyst, at least one co-catalyst, and optionally an antioxidant and/or a synergist. If components (1), (2) and (3) are all present in one mixture than either the pro-catalyst or the co-catalyst is held out of the mixture and added to the mixture at a later time.

Alternatively, components (1), (2) and (3) can be divided into two or more portions and the pro-catalyst added to one portion to form Component A (which can optionally include an additive such an antioxidant). The other portion of components (1), (2) and (3) can be combined with the co-catalyst to form Component B (which can optionally include an additive such as an antioxidant and/or a synergist).

In one embodiment, component (3) is at least one crosslinker selected from dimethyl bis(norbornenemethoxy) silane, octamethyl 1,8-bis(norbornenemethoxy) tetrasiloxane, bis(norbornenementhyl)acetal or a fluorinated crosslinker (such as F-Crosslinkers I and II shown above).

In one embodiment, the molar ratio, expressed in mole percent, of component (1):component (2):component (3) in either the clad or core formulation is 60–90:5–20:5–20. In another embodiment, the molar percent ratio of component (1):component (2):component (3) is 65–85:7.5–20:7.5–17.5. In still another embodiment, the molar ratio of component (1):component (2):component (3) is 75–85:10–20:5–15.

Examples of Crosslinkers: and Clad and Core Formulations:

The following examples are detailed descriptions of methods of preparation and use of certain compositions of the invention. The detailed preparation descriptions fall within the scope of, and serve to exemplify, the more generally described compositions and formulations set forth above.

Additionally, in the examples below Lithium tetrakis (pentafluoro phenyl borate).2.5 etherate is sometimes referred to in shorthand as LiFABA (see for example Table 2), and (allyl)palladium(tricyclohexylphosphine) trifluoroacetate is referred to as Allyl Pd-PCy$_3$TFA.

X. Examples of Formation of Selected Crosslinkers (X1) Synthesis of dimethyl bis(norbornenemethoxy) silane Norbornene methanol (108.5 g, 0.87 mol.) is added dropwise to bis(dimethylamino) dimethyl silane (63.97 g, 0.43 mol.) in a reactor which is connected to a scrubber containing dilute hydrochloric acid. The reaction mixture is stirred for about 4 hours. The mixture is then connected to a vacuum, and residual amounts of the amine are removed. Pure product is obtained by distillation under vacuum (117 g, ~90% yield).

The above reaction is also carried out using the dimethyl dichloro silane instead of bis(dimethylamino) dimethyl silane To a vigorously stirred mixture of 5-norbornene methanol (50 g, 0.40 mol.), triethyl amine (49 g, 0.49 mol.) and toluene (400 mL), dimethyl dichlorosilane (25.8 g, 0.20 mol.) is added dropwise. Stirring at room temperature results in the formation of salts. The crude product is isolated by filtration of the salts, washing the toluene solution with water (3 times) followed by evaporation of toluene. Distillation is conducted under vacuum to obtain pure product (53 g, ~87% yield).

(X2) Synthesis of octamethyl 1,8-bis(norbornenemethoxy) tetrasiloxane

Norbornenemethanol (21.2 g, 0.17 mol.) is added dropwise to a solution consisting of octamethyl dichlorotetrasiloxane (30 g, 0.085 mol.), triethyl amine (21 g, 0.21 mol.) and toluene (300 mL). The reaction mixture is stirred for 8 hours at room temperature. The solids that are formed (triethylamine hydrochloride) are filtered off. The toluene solution is then washed 3 times with small amounts of distilled water and the crude product is obtained by removing the toluene. Pure product is obtained by distillation under vacuum (39 g, ~87% yield).

(X3) Synthesis of Bis(norbornenemethyl)acetal

A mixture of norbornenemethanol (100 g, 0.81 mol.), formaldehyde (~37%) (32.6 g, 0.40 mol.) and a catalytic amount of p-toluene sulfonic acid (0.2 g) are heated at 100° C. in a flask which is directly connected to a Dean Stark Trap. As the reaction proceeds, the amount of water in the trap increases. Within about 3 hours, the reaction is complete. Pure product is obtained by distilling under vacuum (72.8 g, ~70% yield).

Examples of Clad Formulations (One Component)

CL1: Cladding Formulation Using Octamethyl 1.8-bis (norbornenemethoxy)tetrasiloxane Lithium tetrakis(pentafluoro phenyl borate).2.5 etherate (0.0200 g, $2.3 \times 10^{-5}$ mol.) is dissolved in a mixture of monomers consisting of hexylnorbornene (10 g, 0.056 mol.) octamethyl 1,8-bis(norbornenemethoxy)tetrasiloxane (3.9 g, 8.6 mmol.) and triethoxysilylnorbornene (2.9 g, 0.011 mol.). To the mixture is added 0.17 g of Irganox® 1076 (1% by weight).

To this mixture, is added 0.16 mL of catalyst stock solution ($3.02 \times 10^{-6}$ mol.). (Note: the stock solution was made up by dissolving 0.01 g of Allyl Pd-PCy$_3$TFA in 1 mL of dry dichloromethane.)

Cure/post-cure is conducted according to the following schedule: 10 min. at 65° C. and 60 min. at 160° C. After curing the monomer mixture, a clear and good optical quality film is obtained.

CL2: Cladding Formulation Using Bis(norbornenemethyl) acetal

Lithium tetrakis (pentafluoro phenyl borate).2.5 etherate (0.0042 g, $4.8 \times 10^{-6}$ mol.) is dissolved in a mixture of monomers consisting of hexylnorbornene (5 g, 0.028 mol.), bis(norbornenemethyl)acetal (1.57, 6.1 mmol.) and triethoxysilylnorbornene (1.54, 6.1 mmol.). To this mixture is added 0.08 g of Irganox® 1076 (1% by weight).

To this mixture, added 0.08 mL of catalyst stock solution ($1.6 \times 10^{-6}$ mol.). (Note: the stock solution was made up by dissolving 0.01 g of Allyl Pd-PCy$_3$TFA in 1 mL of dry dichloromethane.)

Cure/post-cure is conducted according to the following schedule: 10 min. at 65° C. and 60 min. at 160° C. After curing the monomer mixture, a clear and good optical quality film is obtained.

CL3: Cladding Formulation Using F-Crosslinker I

Lithium tetrakis(pentafluoro phenyl borate).2.5 etherate (0.0061 g, $6.9 \times 10^{-6}$ mol.) is dissolved in a mixture of monomers consisting of hexyl norbornene (6.2 g, 0.035 mol), F-Crosslinker I (3.2 g, 4.3 mmol.) and triethoxysilylnorbornene (1.11 g, 4.3 mmol.). To the mixture is added 0.10 g of Irganox® 1076 (1% by weight).

To this mixture, added 0.1 mL of catalyst stock solution ($1.7 \times 10^{-6}$ mol.). (Note: the stock solution was made up by dissolving 0.01 g of Allyl Pd-PCy$_3$TFA in 1 mL of dry dichloromethane.)

Cure/post-cure is conducted according to the following schedule: 10 min. at 65° C. and 60 min. at 160° C. After curing the monomer mixture, a clear and good optical quality film is obtained.

CL4: Cladding Formulation Using F-Crosslinker II

Lithium tetrakis(pentafluoro phenyl borate).2.5 etherate (0.0061 g, $6.9 \times 10^{-6}$ mol.) is dissolved in a mixture of monomers consisting of hexyl norbornene (6.2 g, 0.035 mol), F-Crosslinker II (3.6 g, 4.3 mmol.) and triethoxysilylnorbornene (1.11 g, 4.3 mmol.). To this mixture is added 0.10 g of Irganox® 1076 (1% by weight).

To this mixture, added 0.1 mL of catalyst stock solution ($1.7 \times 10^{-6}$ mol.). (Note: the stock solution was made up by dissolving 0.01 g of Allyl Pd-PCy$_3$TFA in 1 mL of dry dichloromethane.)

Cure/post-cure is conducted according to the following schedule: 10 min. at 65° C. and 60 min. at 160° C. After curing the monomer mixture, a clear and good optical quality film is obtained.

Example of Clad Formulation (Two Component) CL5

All monomers are degassed using dry nitrogen gas prior to use.

Component A

To a mixture of hexyl norbornene (33 g, 0.185 mol.), triethoxysilyl norbornene (9.5 g, 0.037 mol.) and dimethyl bis(norbornene methoxy) silane (7.5 g, 0.0247 mol.) is added Allyl Pd-PCy$_3$TFA (0.0107 g, $1.98 \times 10^{-5}$ mol.) dissolved in 0.2 ml of dichloromethane. To this mixture is added 0.50 g of Irganox® 1076.

Component B

Lithium tetrakis(pentafluoro phenyl borate).2.5 etherate (0.0689 g, $7.91 \times 10^{-5}$ mol.) is dissolved in a mixture of triethoxysilyl norbornene (9.5 g, 0.037 mol.) and dimethyl bis(norbornene methoxy) silane (7.5 g, 0.0247 mol.). Once the solids are completely dissolved, hexyl norbornene (33 g, 0.185 mol.) is added to the mixture. Also added to the mixture, and dissolved therein, is Irganox® 1076 (0.50 g). In addition to the antioxidant, 0.25 g of Irgafos® 168 is added as a synergist.

Equal amounts of Components A and B are mixed together and are cured. Cure/post-cure is conduced according to the following schedule: 10 min. at 65° C. and 60 min. at 160° C. After curing the monomer mixture, a clear and good optical quality film is obtained.

The formulation of this example is shown in Table 2 below.

TABLE 2

| Compound | Component (A) (g) | Component B (g) | Total Moles in A and B |
|---|---|---|---|
| Hexyl Norbornene | 33 | 33 | 0.3708 |
| Triethoxysilyl Norbornene | 9.5 | 9.5 | 0.0742 |
| Dimethyl Bis(Norbornene Methoxy) Silane | 7.5 | 7.5 | 0.0493 |
| Total Moles | N/A | N/A | 0.4943 |
| LiFABA | N/A | 0.0689 | 7.91E-05 |
| Allyl Pd-PCy$_3$TFA | 0.0107 | N/A | 1.98E-05 |
| Irganox ® 1076 | 0.50 | 0.50 | |
| Irgafos ® 168 | N/A | 0.25 | |

CO1. Example of Core Formulations (Two Component)

All monomers are degassed using dry nitrogen gas prior to use.

Component A

To a mixture of hexyl norbornene (31.5 g, 0.18 mol.), diphenyl methyl norbornene methoxy silane (11.3 g, 0.035 mol.) and dimethyl bis(norbornene methoxy) silane (7.5 g, 0.025 mol.), is added Allyl Pd-PCy$_3$TFA (0.0102 g, $1.89 \times 10^{-5}$ mol.) dissolved in 0.2 ml of dichloromethane. To this mixture is added 0.50 g of Irganox® 1076.

Component B

Lithium tetrakis(pentafluoro phenyl borate).2.5 etherate (0.0658 g, $7.55 \times 10^{-5}$ mol.) is dissolved in a mixture of diphenyl methyl (norbornene methoxy) silane (11.3 g, 0.035 mol.) and dimethyl bis(norbornene methoxy) silane (7.5 g, 0.0247 mol.) and hexyl norbornene (31.5 g, 0.18 mol.). To this mixture is added, and dissolved therein, Irganox® 1076 (0.50 g). In addition to the antioxidant, 0.25 g of Irgafos® 168 is added as a synergist.

Equal amounts of Components A and B are mixed together and are cured. Cure/post-cure is conduced according to the following schedule: 10 min. at 65° C. and 60 min. at 160° C. After curing the monomer mixture, a clear and good optical quality film is obtained.

The formulation of this example is shown in Table 3 below.

TABLE 3

| Compound | Component (A) (g) | Component B (g) | Total Moles in A and B |
|---|---|---|---|
| Hexyl Norbornene | 31.5 | 31.5 | 0.3539 |
| Diphenyl Methyl (Norbornene Methoxy) Silane | 11.3 | 11.3 | 0.0706 |
| Dimethyl Bis(Norbornene Methoxy) Silane | 7.2 | 7.2 | 0.0474 |
| Total Moles | N/A | N/A | 0.4719 |
| LiFABA | N/A | 0.0658 | 7.55E-05 |
| Allyl Pd-PCy$_3$TFA | 0.0102 | N/A | 1.89E-05 |
| Irganox ® 1076 | 0.50 | 0.50 | |
| Irgafos ® 168 | N/A | 0.25 | |

Formulations and Producing Waveguides
Cure/Post-Cure

As described above under the Mass Process heading, the monomer formulations of the invention are polymerized at a temperature of about 20° C. to about 200° C. for about 1 minute to about 2 hours. In another embodiment, the polymerization occurs at a temperature of about 20° C. to about 120° C. for about 1 to about 40 minutes. In yet another embodiment, polymerization occurs at a temperature of about 40° C. to about 80° C. for about 5 minutes to about 20 minutes. As noted above, the polymerization reaction can be carried out under an inert atmosphere such as nitrogen or argon. In another embodiment, the polymerization can be carried out in a forced air, vented oven. The terms "fully cured" and "cured" (when used as a adjective) refer to a polymer that is substantially fully polymerized (e.g., less than about 5 wt. % residual monomer, or wherein the rate of polymerization at the polymerization temperatures described above has substantially decreased (e.g., less than 20% of the maximum rate of polymerization)).

After polymerization, the polymer may be subjected to a post curing step. In one embodiment, the post curing step is conducted for about 1 to about 2 hours at a temperature range of from about 100° C. to about 300° C. (as noted above the temperature during post-cure can be increased over time). Additionally, in another embodiment, post-cure can be conducted for about 0.5 to about 4 hours at a temperature in the range of from about 100° C. to about 300° C. In another embodiment, the post curing step is conducted for about 1 to about 2 hours over a temperature range (or at a temperature in the range) of from about 125° C. to about 200° C. In still another embodiment, the post curing step is conducted for about 1 to about 2 hours over a temperature range of (or at a temperature in the range) from about 140° C. to about 180° C.
Partial Cure/Cure/Post Cure In another embodiment, at least one monomer formulation (e.g., either a core composition or a cladding (or clad) composition) is partially polymerized (cured) to gel point at a temperature of about 20° C. to about 120° C. for about 0.1 to about 10 minutes. In another embodiment, the polymerization occurs at a temperature of about 40° C. to about 100° C. for about 1 to about 8 minutes. In yet another embodiment, polymerization occurs at a temperature of about 50° C. to about 70° C. for about 2 minutes to about 6 minutes. As noted above, the polymerization reaction can be carried out under an inert atmosphere such as nitrogen or argon. In another embodiment, the polymerization can be carried out in a forced air, vented oven.

After partial cure, at least one more monomer formulation (not cured) can be placed over or on top of the partially cured monomer formulation(s). In one embodiment, if at least one core composition is subjected to partial cure, then at least one clad composition is placed over the at least one core composition. In another embodiment, if at least one clad composition is subjected to partial cure, then at least one core composition is placed over the at least one clad composition. In yet another embodiment, the at least one monomer formulation which is placed over the at least one partially cured monomer formulation can be another similar formulation (i.e., at least one additional core formulation over the at least one partially cured core formulation, etc.).

After the desired combination of monomer formulations is present (at least one of which is partially cured in accordance with the above description) the combination is cured at a temperature of about 20° C. to about 200° C. for about 1 minute to about 2 hours. In another embodiment, the polymerization occurs at a temperature of about 20° C. to about 120° C. for about 1 to about 40 minutes. In yet another embodiment, polymerization occurs at a temperature of about 40° C. to about 80° C. for about 5 minutes to about 20 minutes. As noted above, the polymerization reaction can be carried out under an inert atmosphere such as nitrogen or argon. In another embodiment, the polymerization can be carried out in a forced air, vented oven.

After the combination of monomers has been cured (polymerized), the polymer combination may be subjected to a post curing step. In one embodiment, the post curing step is conducted for about 1 to about 2 hours at a temperature range of from about 100° C. to about 300° C. (as noted above the temperature during post-cure can be increased over time). Additionally, in another embodiment, post-cure can be conducted for about 0.5 to about 4 hours at a temperature in the range of from about 100° C. to about 300° C. In another embodiment, the post curing step is conducted for about 1 to about 2 hours over a temperature range (or at a temperature in the range) of from about 125° C. to about 200° C. In still another embodiment, the post curing step is conducted for about 1 to about 2 hours over a temperature range of (or at a temperature in the range) from about 140° C. to about 180° C.
Method of Making Waveguides
Clad First:

Conventional molding processes of fabrication of waveguides are done in a clad-first fashion. For example, shown in FIG. 1 is a generic process of making a waveguide 1. First at (a) a cladding film 12 (sub-cladding) is formed by casting against a master 10 (a nickel master or other suitable master) in a molding process such as injection molding, hot embossing and reactive casting (see (a) of FIG. 1) and subsequently subjected to curing. The sub-cladding layer 12 is removed from the master 10 (see (b) of FIG. 1) and a liquid core material 14 is then applied onto the featured side of the sub-cladding film 12 and forced into the grooves 13 by pressure using, for example, a doctor blade 16 (see (c) of FIG. 1).

The substrate (sub-clad) in FIG. 1 and the other figures is shown in profile to illustrate the waveguide features (e.g., grooves 13) and the doctor blade 16 in FIG. 1 and in the other figures is shown with an arrow suggesting a direction of travel, however the invention is not so limited. A doctor blade or other coating apparatus, when used, can be drawn across the substrate in any direction. For a continuous process wherein multiple parallel waveguides are formed, preferably a doctor blade or other coating apparatus is drawn across the substrate in a direction parallel to the long axis of the waveguides. In practice, the coating apparatus may be fixed, and the substrate being coated would then be drawn.

Thereafter, the liquid core material 14 is cured to form a ribbed waveguide structure 14a (see (d) of FIG. 1). The waveguide structure depicted in FIG. 1 is ribbed. However, any suitable waveguide structure can be formed (e.g., a web, buried channels, etc.). Next, a top cladding layer 18 is formed over a portion or all of the waveguide structure 14a by a depositing thereupon a liquid clad material which upon curing forms the top cladding layer 18 (see (e) of FIG. 1).

Alternatively, the top cladding layer 18 may be formed independently rather than being polymerized from a liquid formulation placed on top of the waveguide structure 14a, and optionally a portion of the sub-cladding layer 12. In such an embodiment, the top cladding layer 18 may be joined to the exposed portion of the waveguide structure 14a using a suitable adhesive attachment means (e.g., a layer of liquid cladding material which acts as a glue).

In yet another embodiment, the method of FIG. 1 can be halted after step (d) has been completed. In such a case, a two layer waveguide is obtained rather than the three layer wave guide described above.

Using one of the above clad-first approaches results in the production of two and three layer waveguides. Additionally, this conventional clad-first approach can yield a variety of waveguide structures such as an array of buried rib waveguides, as shown in FIGS. 2A to 2C. A careful balance of the dimensions (height, width, spacing, and thickness of the slab region) of the rib guides, along with control over the difference in the refractive index between the core and clad layers, and the operating wavelength can lead to a waveguide structure in which light is well confined (FIGS. 2B and 2C).

The core/clad compositions disclosed herein can be used in other prior art waveguide formation methods (e.g., micro-molding/embossing; reactive ion etching; UV laser and e-beam writing; photochemical delineation; photo-bleaching; induced dopant diffusion (photo-induced dopant diffusion, photolocking and selective polymerization); selective poling of electro-optically active molecules induced by an electric field; and polymerization of self-assembled prepolymers).

Additionally, the master used in this embodiment may have a waveguide structure whose channels are actually bigger than desired in the final product. Such features permit a non-stick coating (e.g., PTFE) or a mold-release agent to be applied over the master so as to facilitate removal of the sub-cladding layer 12 from the master 10. Alternatively, separation of the sub-cladding layer from the master may be facilitated by running cold water over or otherwise chilling the sub-cladding layer.

Core-First Methods:

Using one of the core-first methods described below, a waveguide, even an isolated, buried-channel wave guide, can be formed. For the purposes of this description, the method will be described in relation to an isolated, buried-channel waveguide. However, it is within the scope of this invention to form other waveguide structures (such as a ribbed structure).

Compared with the conventional clad-first approach, the fabrication steps in the core-first approach are executed in a generally reverse fashion. For example, rather than form a sub-clad layer on a master, and then load the sub-cladding layer with core material, a core material is loaded on a master and then a cladding layer is formed over the core. The most general method includes the steps of forming a core structure, the core structure including an at least partially cured core composition, on a master defining a waveguide pattern; applying over the top of the core structure and the master a cladding layer including a liquid cladding composition; curing the cladding layer to form a core/cladding combination; and removing the core/cladding combination from the master so as to expose at least a portion of the core structure, wherein the refractive index of the cured core composition is at least 0.05 percent higher than the refractive index of the cured cladding composition.

One general embodiment of a core-first method is described as follows in conjunction with FIG. 3. A mixture of a core material 30 is applied (e.g., poured and/or spread) onto the surface of a master 32 (e.g., nickel or silicon masters, preferably rigid) having grooves 34 formed in the shape and dimensions of the desired waveguide structure, with lands 35 adjacent each waveguide structure (see (a) of FIG. 3). For example, for an isolated, buried-channel waveguide structure the channels are from about 1 $\mu$m to about 200 $\mu$m in width and from about 1 $\mu$m to about 200 $\mu$m in height. However, any desired thickness and height may be obtained so long as the channels are neither too narrow or too shallow to accept the core material.

A doctor blade 36 is set to rest directly on the surface of the master 32 (where a buried structure is desired) and used to scrape away the excess liquid core mixture 30 (see (b) of FIG. 3). Next, the core material 30 left in the grooves 34 is at least partially cured to form at least one waveguide structure 30a. If the core material 30 is one of the core materials described above, the core material 30 can be cured in accordance with any one of the above-mentioned methods. Preferably, the core material 30 is partially cured at least to a point whereat diffusion of the cladding composition into the core material is substantially reduced, minimized, or prevented. In another embodiment, the core material 30 is partially cured to at least its gel point. In another embodiment, the core material 30 is cured (i.e., substantially fully cured (e.g., less than about 5 wt. % residual monomer)).

After the core material 30 left in the grooves is at least partially cured, as described above (see (c) of FIG. 3), a mixture of a cladding material 38 is poured onto the top of the core-containing master so as to cover the exposed surface of the waveguide structure(s) 30a. The thickness of the sub-cladding layer is also controlled by a doctor blade 36 (see (d) of FIG. 3). Upon curing under the proper conditions, a sub-clad layer 40 is formed which is in contact with at least one surface of the waveguide structure(s) (see (e) of FIG. 3). If the core structure(s) 30a were only partially cured prior to application of cladding composition 38 over the core structure(s) 30a and master 32, then preferably the core structure(s) 30a are cured as the cladding composition 38 cures to form the sub-clad layer 40. Next, the sub-clad layer 40/waveguide structure(s) 30a combination is removed from the master 32 and flipped over so that the sub-clad layer is on the bottom (see (f) of FIG. 3).

Preferably, the thickness of the sub-clad layer is sufficient to allow for the removal of the sub-clad layer 40 and the waveguide structure(s) 30a from the master 32 without causing damage to either layer. For example, the thickness of the sub-clad layer is sufficient to prevent inelastic deformation of the combination when the force required to remove the waveguide structure(s) from the master is applied. In another embodiment, the thickness of the each clad (sub-clad and top clad) is from about 2 $\mu$m to about 20,000 $\mu$m or are in total about 4 $\mu$m to about 20,000 $\mu$m. In yet another embodiment, the thickness of each clad layer is about 10 $\mu$m to about 10,000 $\mu$m, or are in total about 20 $\mu$m to about 10,000 $\mu$m. By definition, the height of the top-clad includes the height of the core layer (see (h) of FIG. 3).

Next, a top cladding material 42 is applied to the core side of the film and the thickness thereof is also controlled by a doctor blade 36 (see (g) of FIG. 3). Thereafter, the top cladding material 42 is cured to form a top cladding layer 42a. Upon completion of the curing process of the top cladding layer a waveguide 50 is formed (see (h) of FIG. 3). Curing of this third layer results in a three-layer polymer film containing isolated channel waveguide cores 30a buried between the sub-cladding layer 40 and the top cladding layer 42a.

Alternatively, if a two layer optical waveguide is desired the above process is halted after removing the core/cladding combination from the master (e.g., step (f) in FIG. 3).

An embodiment of the core-first method that takes advantage of the previously described partial cure/cure/postcure polymerization method will now be described in relation to an isolated, buried-channel waveguide. However, it is within the scope of this invention to form other waveguide structures (such as a ribbed structure).

Figure 6:
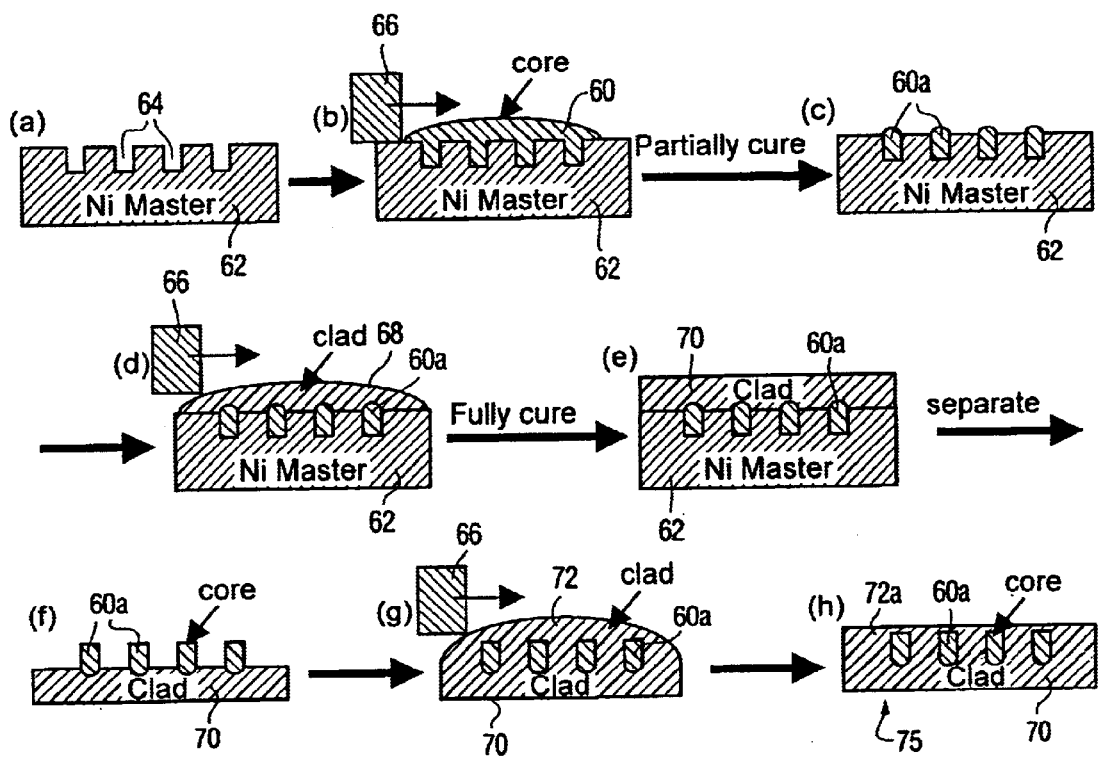
FIG. 6 is a step diagram of the steps of a modified core-first waveguide formation method.
Figure 7A:
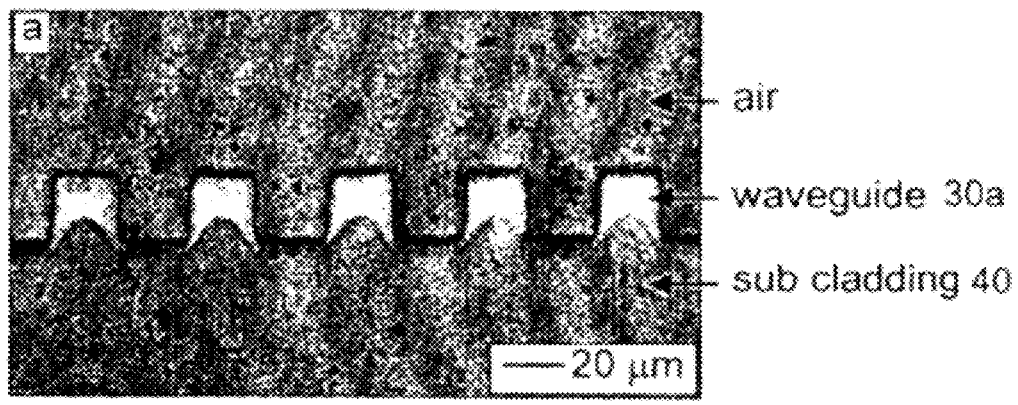
FIGS. 7A and 7B are optical micrographs depicting waveguides formed in accordance with the methods of FIGS. 3 and 6, respectively.
Figure 7B:
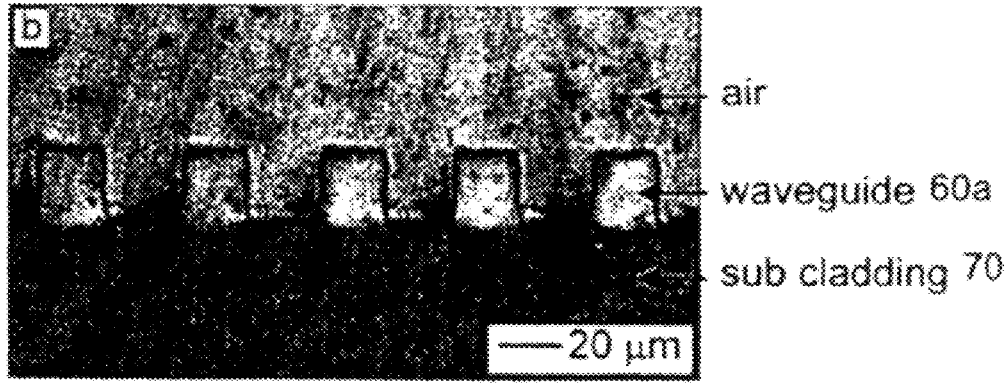

This embodiment of the core-first method will be described with reference to FIGS. 6, 7A and 7B. Referring to FIG. 6, a mixture of a core material 60 is poured onto the surface of a master 62 (e.g., nickel and silicon masters, preferably rigid) having grooves 64 formed in the shape and dimensions of the desired waveguide structure (see (a) of FIG. 6). For example, for an isolated, buried-channel waveguide structure the channels are from about 1 $\mu$m to about 200 $\mu$m in width and from about 1 $\mu$m to about 200 $\mu$m in height. However, any desired thickness and height may be obtained so long as the channels are neither too narrow nor too shallow to accept the core material.

A doctor blade 66 is set to rest directly on the surface of the master (where a buried structure is desired) and used to scrape away the excess liquid core mixture 60 (see (b) of FIG. 6). Next, the core material 60 left in the grooves is partially cured to form at least one pre-waveguide core structure 60a. If the core material 60 is one of the norbornene-type core materials described above, the core material 60 is partially cured in accordance with the above-mentioned partial cure/cure/post cure method.

After the core material 60 left in the grooves is partially cured, as described above (see (c) of FIG. 6), a mixture of a cladding material 68 is poured onto the top of the core-containing master so as to cover the at least one exposed surface of the waveguide core structure(s) 60a. The thickness of the sub-cladding layer is also controlled by a doctor blade 66 (see (d) of FIG. 6). Upon curing under the proper conditions (see the description under partial cure/cure/post cure above), a sub-clad film 70 is formed which is in contact with at least one surface of the waveguide structure(s) (see (e) of FIG. 6). Next, the sub-clad layer 70/waveguide core structure(s) 60a combination is removed from the master 62 and flipped over so that the sub-clad layer is on the bottom (see (f) of FIG. 6).

Preferably, the thickness of the sub-clad layer is sufficient to allow for the removal of the sub-clad layer 70 and the waveguide structure(s) 60a from the master 62 without causing damage to either layer. For example, the thickness of the sub-clad layer is sufficient to prevent inelastic deformation of the combination when the force required to remove the waveguide structure(s) from the master is applied. In another embodiment, the thickness of the each clad (sub-clad and top clad) is from about 2 $\mu$m to about 20,000 $\mu$m or are in total 4 $\mu$m to about 20,000 $\mu$m. In yet another embodiment, the thickness of each clad layer is about 10 $\mu$m to about 10,000 $\mu$m, or are in total about 20 $\mu$m to about 10,000 $\mu$m. The height of the top-clad by definition includes the height of the core layer (see (h) of FIG. 6).

Next, a top cladding material 72 is applied to the core side of the film and the thickness thereof is also controlled by a doctor blade 66 (see (g) of FIG. 6). Thereafter, the top cladding material 72 is cured to form a top cladding layer 72a. Upon completion of the curing process of the top cladding layer a waveguide 75 is formed (see (h) of FIG. 6). Curing of this third layer results in a three-layer polymer film containing isolated channel waveguide cores 60a buried between the sub-cladding layer 70 and the top cladding layer 72a.

Alternatively, if a two layer optical waveguide is desired the above process is halted after step (f) is complete.

In a variation on the general embodiment of a core-first method described above, the method of forming a core structure is different. In this embodiment, the method of forming one or more core structures 30a includes the steps of applying (e.g., pouring and/or spreading) core composition 30 on a master 32, striking off excess core composition 30 from the master 32 (e.g., by the use of a doctor blade), vaporizing residual core composition from lands 35 defined by the master 32 (see (a) of FIG. 3), and at least partially curing the core composition 30 simultaneously with or subsequently to the vaporizing step. This method has the advantage that when a doctor blade 36 is unable to strike off all of the excess core composition 30 from one or more lands 35, then the vaporizing step removes residual material that has the potential to optically couple adjacent core structures and contribute to cross-talk. This method also has the advantage that the thickness of a layer of core material 30 on top of the master can be controlled by a doctor blade 36, and then core material 30 can be vaporized from both the lands 35 and above the grooves 34 such that the grooves 34 are completely filled after vaporization. This method is applicable to volatile norbornene-type monomers described above and other vaporizable monomers suitable for use in creating optical waveguides.

Vaporization of volatile core compositions can be achieved with the passage of time, with heating, under application of reduced pressure, any combination of the foregoing, or any other suitable method. Volatility of a coated composition from the substrate can be encouraged by coating the substrate when the composition is relatively less polymerized (i.e., relatively high content of monomer) and/ or by decreasing the rate of polymerization (e.g., extended heating times at lower temperature and/or under reduced pressure). Volatility of a coated composition can be discouraged by pre-curing the composition so that it is thickened (i.e., relatively more polymerized) and/or by increasing the rate of polymerization (e.g., by using relatively shorter heating times at higher temperature and/or for the above-described norbornene-type monomers, polymerizing under a nitrogen atmosphere).

In another variation on the general embodiment of a core-first method described above (described in detail below as a "fill and remove" method), one or more core structures 30a can be formed by yet another method. In this variation, the method of forming a core structure 30a includes the steps of applying a core composition 30 to a master 32 defining a waveguide core pattern (e.g., grooves 34) to fill the waveguide pattern, removing a portion of the core composition 30 from an exposed surface of the filled waveguide core pattern (e.g., grooves 34), and at least partially curing the core composition 30.

Figure 10:
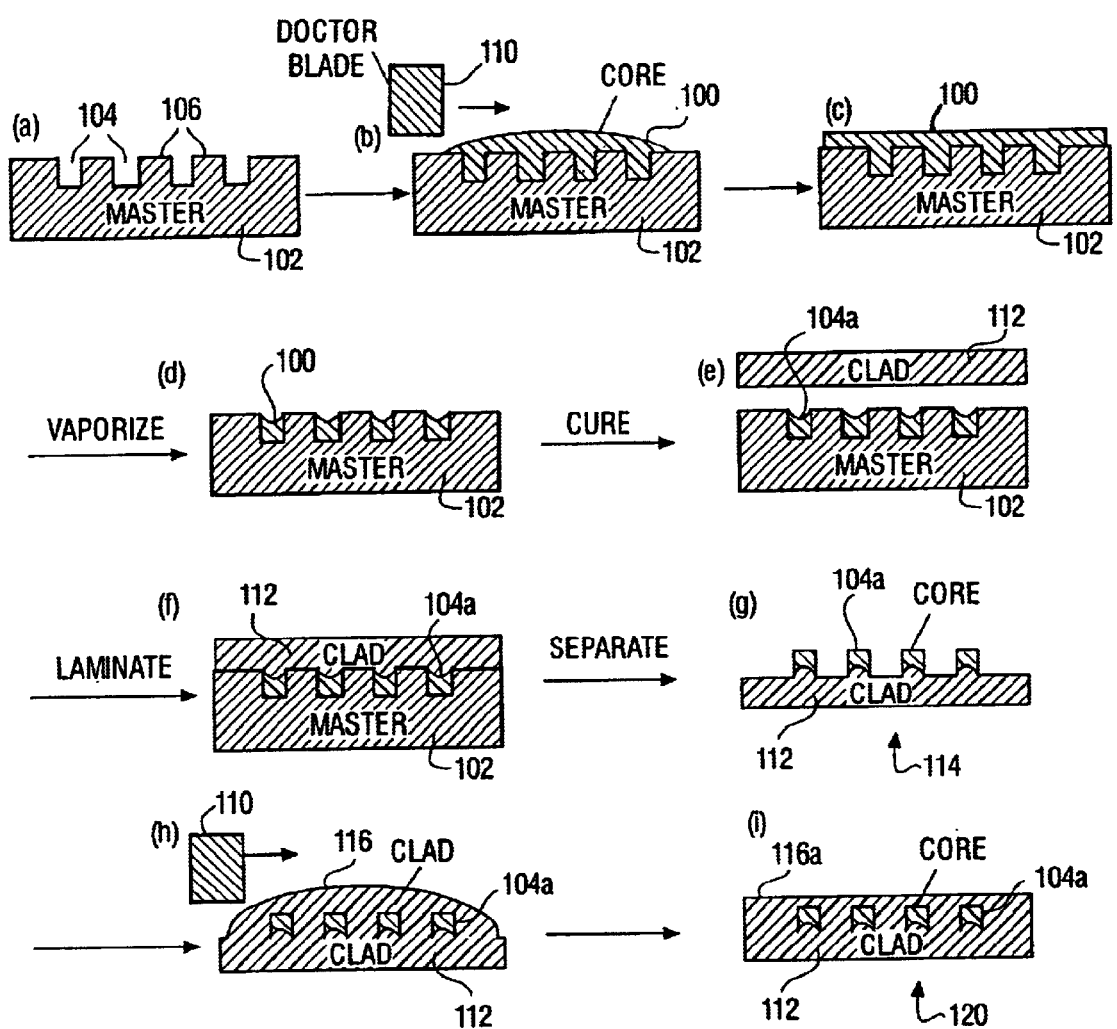
FIG. 10 is a step diagram of the steps of a method for forming waveguides by a core-first, lands vaporization/lamination method.

In another core-first method (referred to herein as a core-first, lands vaporization/lamination method), depicted in FIG. 10, a core structure can be formed by any one of the methods described above, but the application of the sub-cladding layer differs. In an example of this embodiment, mixture of a core material 100 is applied (e.g., poured and/or spread) onto the surface of a master 102 (e.g., nickel or silicon masters, preferably rigid) having one or more grooves 104 formed in the shape and dimensions of the desired waveguide structure, with lands 106 adjacent each waveguide structure (see (a) and (b) of FIG. 10). For example, for an isolated, buried-channel waveguide structure the channels are from about 1 $\mu$m to about 200 $\mu$m in width and from about 1 $\mu$m to about 200 $\mu$m in height. However, any desired thickness and height may be obtained so long as the channels are neither too narrow or too shallow to accept the core material.

A doctor blade 110 is set to rest directly on the surface of the master 102 (where a buried structure is desired) and used to scrape away the excess liquid core mixture 100 (see (b) and (c) of FIG. 10). Residual core material 100 on one or more lands 106 is then vaporized (see (d) of FIG. 10). The core material 100 remaining in the master 102 is at least partially cured simultaneously with or subsequently to the vaporization step.

The core material 100 left in the grooves 104 is at least partially cured to form at least one waveguide structure 104a. If the core material 100 is one of the core materials described above, the core material 100 can be cured in accordance with any one of the above-mentioned methods. Preferably, the core material 100 is partially cured at least to a point whereat diffusion of the subsequently-applied cladding composition into the core material is substantially reduced, minimized, or prevented. In another embodiment, the core material 100 is partially cured to at least its gel point. In another embodiment, the core material 100 is cured (i.e., substantially fully cured (e.g., less than about 5 wt. % residual monomer)).

After the core material 100 left in the grooves is at least partially cured, as described above, the master 102 containing core material 100 is brought together with a pre-formed film of sub-cladding composition 112 (see (e) of FIG. 10). The pre-formed film of sub-cladding composition 112 can be cured or partially cured, and is at least partially cured. The pre-formed sub-cladding film 112 is laminated (e.g., under the application of heat and pressure) over the core composition-containing master 102 and joined to one or more core structures 104a (see (f) of FIG. 10). If the pre-formed sub-cladding film 112 is only partially cured, then it is cured as it is laminated. Similarly, if the core structure(s) 104a were only partially cured prior to lamination of the pre-formed sub-cladding film 112, then preferably the core structure(s) 104a are cured as the sub-cladding film 112 is laminated. Optionally, the laminated combination can be cured subsequent to lamination.

Next, the sub-clad/waveguide structure(s) combination 114 is removed from the master 102 and flipped over so that the sub-clad layer 112 is on the bottom (see (g) of FIG. 10). Preferably, the thickness of the sub-clad layer 112 is sufficient to allow for the removal of the sub-clad/waveguide structure(s) combination 114 from the master 102 without causing damage to either layer. For example, the thickness of the sub-clad layer 112 is sufficient to prevent inelastic deformation of the combination when the force required to remove the waveguide structure(s) from the master is applied. In another embodiment, the thickness of the each clad (sub-clad and top clad) is from about 2 $\mu$m to about 20,000 $\mu$m or are in total about 4 $\mu$m to about 20,000 $\mu$m. In yet another embodiment, the thickness of each clad layer is about 10 $\mu$m to about 10,000 $\mu$m, or are in total about 20 $\mu$m to about 10,000 $\mu$m. By definition, the height of the top-clad includes the height of the core layer (see (i) of FIG. 10).

Next, a top cladding material 116 is applied to the core side of the combination film and the thickness thereof is also controlled by a doctor blade 110 (see (h) of FIG. 10). Thereafter, the top cladding material 116 is cured to form a top cladding layer 116a. Upon completion of the curing process of the top cladding layer a waveguide 120 is formed (see (i) of FIG. 10). Curing of this third layer results in a three-layer polymer film containing isolated channel waveguide cores 104a buried between the sub-cladding layer 112 and the top cladding layer 116a. Alternatively, if a two layer optical waveguide is desired the above process is halted after removing the core/cladding combination from the master (e.g., step (g) in FIG. 10).

An array of optical waveguides was made by the core-first lands vaporization/lamination method described above. The core material was made from a 2-part norbornene formulation with batch compositions in Table 4 below.

TABLE 4

| Compound | Component (A) (g) | Component B (g) | Total Moles in A and B |
|---|---|---|---|
| Hexyl Norbornene | 157.5 | 157.5 | 1.7697 |
| Diphenyl Methyl (Norbornene Methoxy) Silane | 56.5 | 56.5 | 0.3531 |
| Dimethyl Bis(Norbornene Methoxy) Silane | 36.0 | 36.0 | 0.2368 |
| Total Moles | N/A | N/A | 2.3596 |
| LiFABA | N/A | 0.3288 | 3.78E-04 |
| Allyl Pd-PCy$_3$TFA | 0.0511 | N/A | 9.44E-05 |
| Irganox ® 1076 | 2.5 | 2.5 | |

The core composition was made by mixing 2 ml of Components A with 2 ml of Component B at room temperature and then heating at 65° C. for about 2 to three minutes to pre-polymerize the mixture and achieve a slightly thickened viscosity for coating. The mixture was then poured onto a microreplicated mold measuring about 5 inches by about 11 inches with eleven 23 cm long grooves measuring 200 $\mu$m wide with a depth of 75 $\mu$m and land spaces 50 $\mu$m wide. The core material was loaded into the grooves using a rubber doctor blade (a 62 thousandths of an inch (mil) thick rubber sheet (measuring about 3 inches by about 5 inches) that was glued onto an eight mil-thick cold-rolled steel sheet of (similar dimensions).

Figure 11:
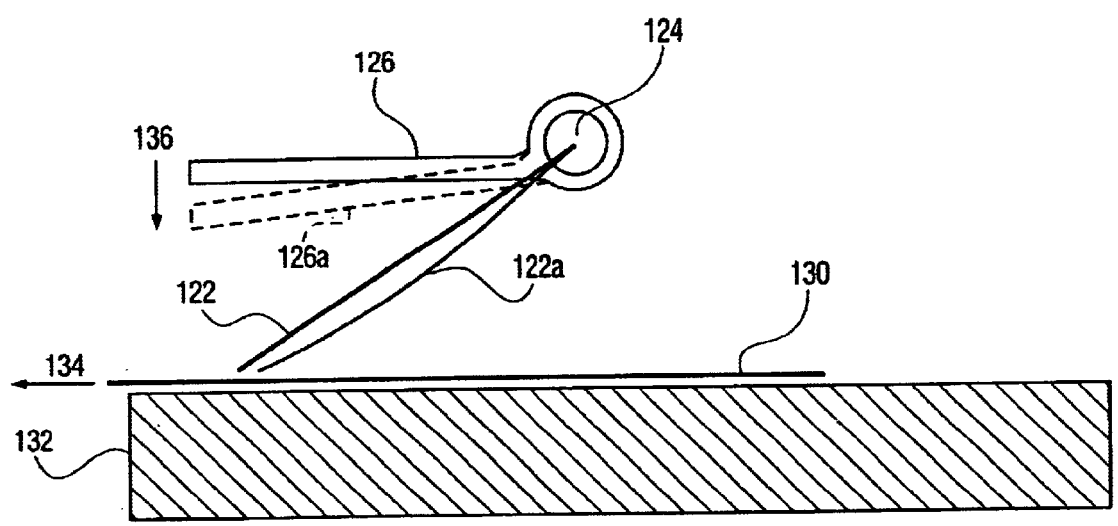
FIG. 11 depicts a coating apparatus including a doctor blade, substrate to be coated, and support.

FIG. 11 illustrates the doctor blade apparatus, wherein the blade 122 is affixed to a rotatable shaft 124 that is connected to a handle 126 (also shown in deflected position 126a) having a length approximately equal to the length of the blade. The substrate to be coated 130 was placed on a support 132 with grooves 104 (not shown) aligned in the direction of travel indicated by arrow 134. When pressure was applied, the blade deflected (shown as deflected blade 122a) in an amount that corresponded to a deflection of the handle of about 0.15 inches in the direction indicated by arrow 136. After loading into the master, the core material assembly was baked at about 150° C. for 7 minutes to vaporize residual monomer from the lands and partially cure the core material.

The cladding material was made from a 2-part norbornene formulation with batch compositions in Table 5 below.

TABLE 5

| Compound | Component (A) (g) | Component B (g) | Total Moles in A and B |
|---|---|---|---|
| Hexyl Norbornene | 1485 | 1485 | 16.6854 |
| 5-Triethoxysilyl Norbornene | 427.5 | 427.5 | 3.3385 |
| Dimethyl Bis(Norbornene Methoxy) Silane | 337.5 | 337.5 | 2.2204 |
| Total Moles | N/A | N/A | 22.2443 |
| LiFABA | N/A | 3.1 | 3.56E-03 |
| Allyl Pd-PCy$_3$TFA | 0.4814 | N/A | 8.9E-04 |
| Irganox ® 1076 | 22.5 | 22.5 | |

To create the cladding laminate, a sub-clad material of 5 ml Component A and 5 ml Component B was mixed at room temperature and thickened by heating at 65° C. for about 4–8 minutes. The material was then cast onto a 5 mil polyester film using a knife coater set at a 12 mil gap above the polyester film. The film was then partially cured at 65° C. for 10 minutes followed by one minute at 150° C.

The partially-cured cladding film was laid over the coated mold and placed between the heated platens of an hydraulic press using a cardboard panel and an aluminum panel on each side of the coated mold to distribute the force uniformly (each aluminum panel was adjacent a platen). The assembly was pressed between platens heated to 150° C. at a pressure of about 125 psi for 2 minutes, followed by 360 psi for 4 minutes. The platens were cooled to 90° C. within about 5 to 7 minutes, then released. The clad/core combination was peeled from the master starting at one edge.

Figure 12:
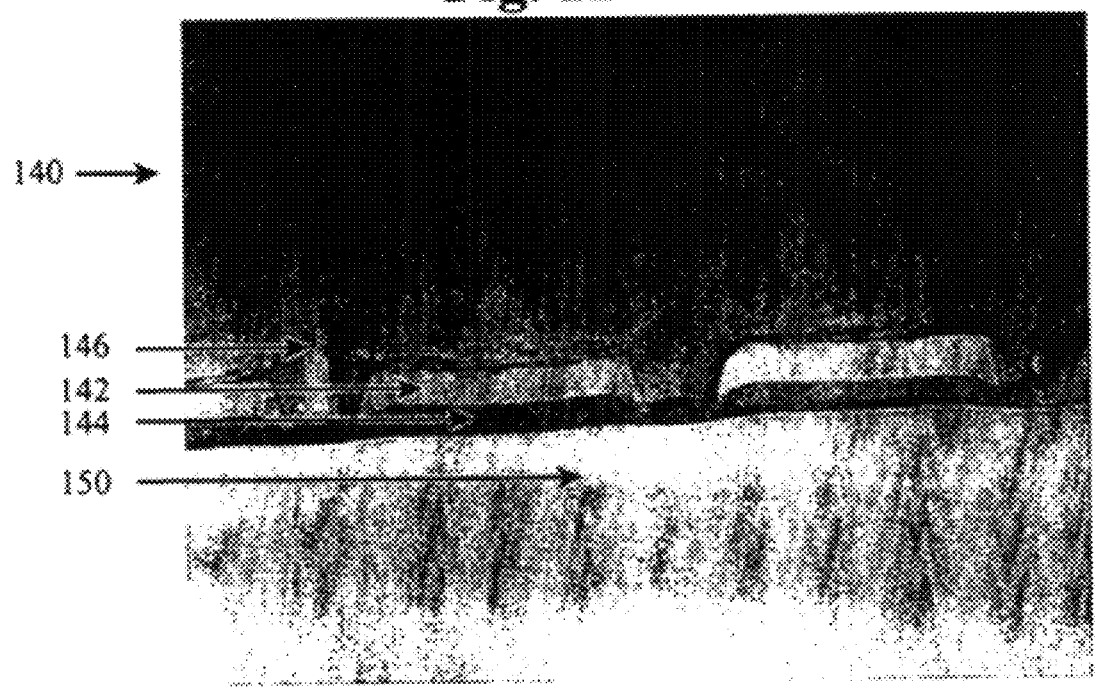
FIG. 12 is an optical micrograph of a waveguide structure produced according to the method of FIG. 10.

A top clad material equal in composition to the sub-clad material was mixed and cast over the clad/core combination using a knife coater. The entire assembly was then cured at 150° C. for about one hour to produce the waveguide 140 of FIG. 12 having isolated channel waveguide cores 142 buried between a laminated sub-cladding layer 144 and a top cladding layer 146 (shown in air 150).

The series of waveguides thus produced were measured for signal loss. The waveguides were trimmed to 22.7 cm long by cutting the ends smooth and square using a microtome with a triangular glass knife. The sample was affixed at each end in a clamp, and the two clamps were attached to a one-axis translator so that the waveguide sample was held horizontally, nearly flat, and such that the axes of the waveguides were oriented parallel to the beam path of the measurement system.

The system comprised a source of light at 857 nm coupled into a length of "single-mode" optical fiber of the type used in telecommunications applications. The fiber guides several modes at 857 nm. The free end of the fiber was encased in a fine glass capillary; the end of the capillary and fiber near the "input" end of each waveguide in the series in a three-axis micropositioner. At the other, or "output" end of the waveguide series, a similar arrangement allowed a large-core (200 µm diameter) glass optical fiber to be similarly arranged adjacent to each waveguide.

Figure 13:
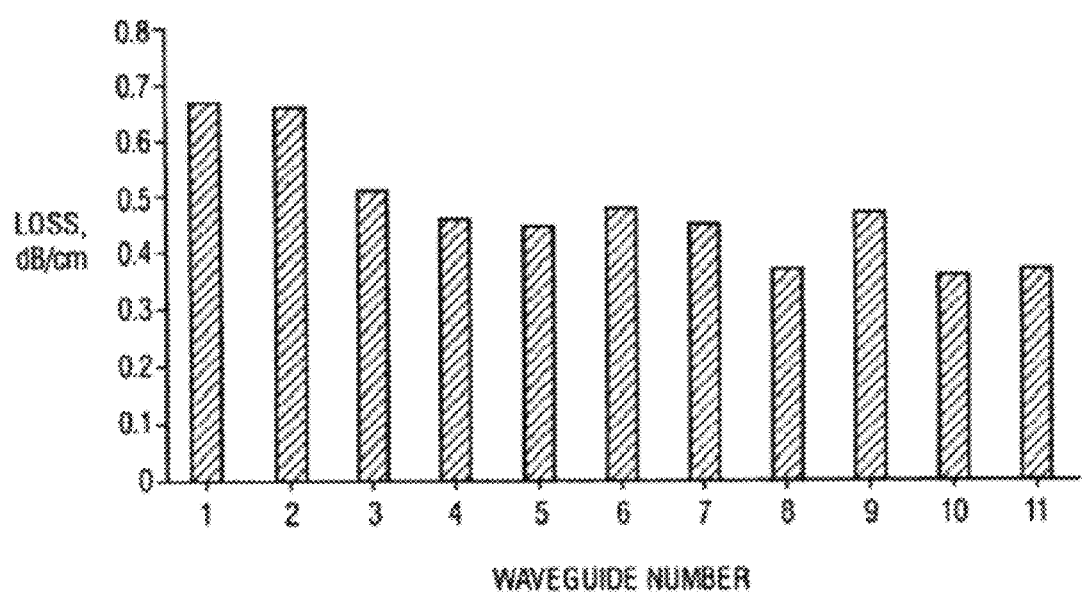
FIG. 13 is a graph showing loss values for waveguides produced according to the method of FIG. 10.

The far end of the large-core fiber was connected to an optical power meter. By adjusting the alignment of each fiber to opposite ends of a particular waveguide, the transmission could be measured. The small air gap separating the fiber ends from the waveguide ends was filled with a small quantity of glycerin to reduce reflections. By immediately afterwards aligning the two fibers together in direct contact with each other, the amount of light launched into the waveguide was measured. By comparing the two measurements, the loss of each waveguide in the sample was deduced. The graph in FIG. 13 displays the loss for each of the eleven waveguides.

Figure 14:
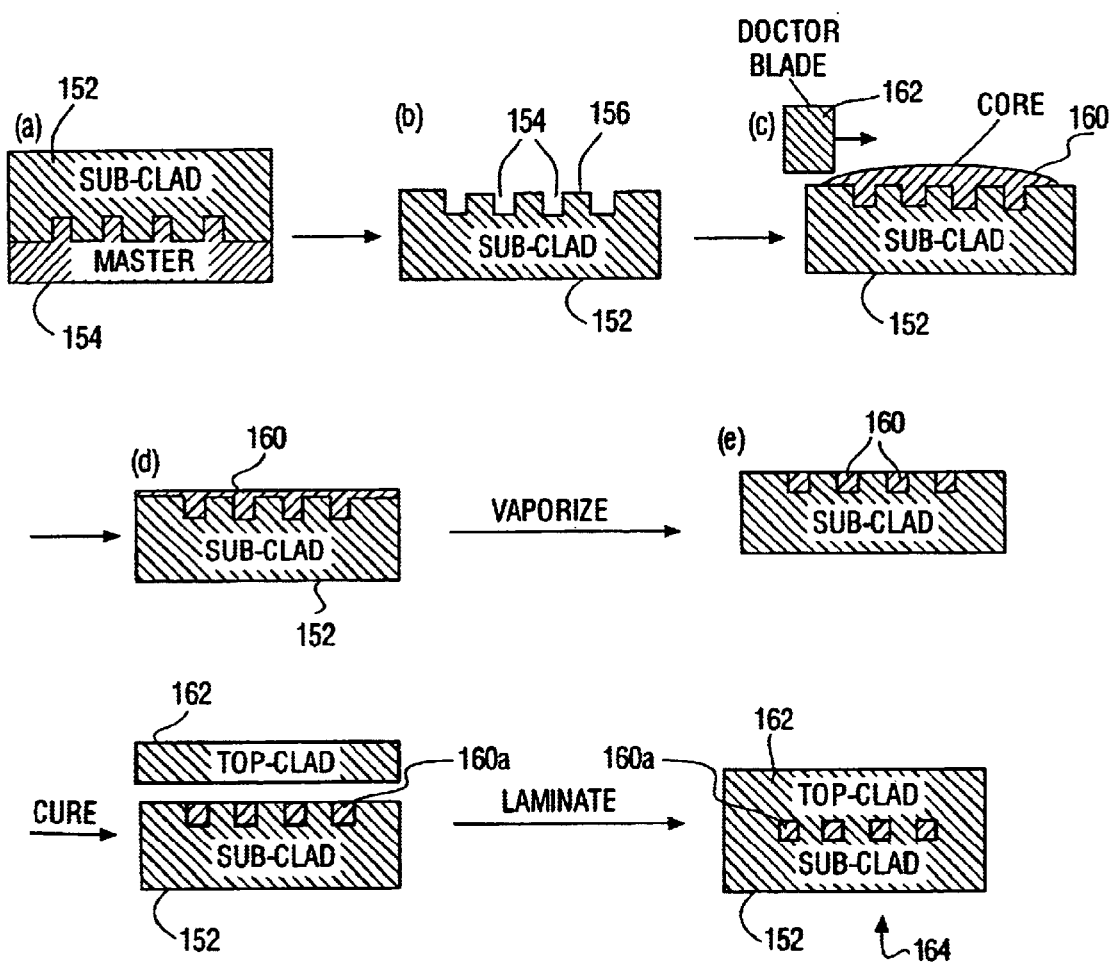
FIG. 14 is a step diagram of the steps of a method for forming waveguides by a clad-first lands vaporization/lamination method.

The core-first lands vaporization/lamination method described above can be modified to produce polymeric optical waveguides via a substantially similar clad-first lands vaporization/lamination method, depicted in FIG. 14.

First, at (a) a cladding film 152 (sub-cladding) is formed by casting against a master 154 (e.g., a nickel or silicon master, preferably rigid) in a molding process such as injection molding, hot embossing, reactive casting, or any other suitable process (see (a) of FIG. 14), and subsequently cured. The sub-cladding layer 152 has waveguide features such as grooves 154 and adjacent lands 156. The sub-cladding layer 152 is removed from the master 152 (see (b) of FIG. 14) and a liquid core material 160 is then applied (e.g., coated and/or spread) to the featured side of the sub-cladding film 152 and into the grooves 154 using, for example, a doctor blade 162 (see (c) of FIG. 14). Thereafter, residual core material 160 on one or more lands 156 is then vaporized (see (d) and (e) of FIG. 14). The core material 160 remaining in the sub-cladding 152 is at least partially cured simultaneously with or subsequently to the vaporization step.

The core material 160 left in the waveguide feature (e.g., the grooves 154) is at least partially cured to form at least one waveguide structure 160a. If the core material 160 is one of the core materials described above, the core material 160 can be cured in accordance with any one of the above-mentioned methods. Preferably, the core material 160 is partially cured at least to a point whereat diffusion of the subsequently-applied cladding composition into the core material is substantially reduced, minimized, or prevented. In another embodiment, the core material 160 is partially cured to at least its gel point. In another embodiment, the core material 160 is cured (i.e., substantially fully cured (e.g., less than about 5 wt. % residual monomer)).

After the core material 160 left in the grooves 154 is at least partially cured, as described above, the sub-cladding 152 containing core material 160 is brought together with a pre-formed film of cladding composition 162 (i.e., top-cladding; see (f) of FIG. 14). The pre-formed film of cladding composition 162 can be cured or partially cured, and is at least partially cured. The pre-formed top-cladding film 162 is laminated (e.g., under the application of heat and pressure) over the core composition-containing sub-cladding 152 and joined to one or more core structures 160a (see (f) and (g) of FIG. 14). If the pref-formed top-cladding film 162 is only partially cured, then it is cured as it is laminated. Similarly, if the core structure(s) 160a were only partially cured prior to lamination of the pre-formed top-cladding film 162, then preferably the core structure(s) 160a are cured as the top-cladding film 162 is laminated. Optionally, the laminated combination can be cured subsequent to lamination. Upon completion of the curing process a waveguide 164 is formed (see (g) of FIG. 14), which is a three-layer polymer film containing isolated channel waveguide cores 160a buried between the sub-cladding layer 152 and the top cladding layer 162.

Alternatively, if a two layer optical waveguide is desired the waveguide core structures 160a are cured between (e.g., after (e) in FIG. 14) and the process is halted.

Preferably, when using polynorbornene materials described above as core and cladding material, the polymers do not adhere to the master (e.g., a nickel or silicon master, preferably rigid), and the master used in the core-first methods defines a waveguide pattern. Optionally, the master used in the core-first methods may have one or more core structures which are actually bigger than desired in the final product. Such features permit a non-stick coating (e.g., PTFE) or a mold-release agent to be applied over the master to help facilitate the removal of the core structures and the cladding layer from the master. Alternatively, separation of the sub-cladding layer from the master is facilitated by running cold water over the sub-cladding layer.

Compared with the clad-first approach, in the core-first approaches the core structures of waveguides are made by casting on a substrate (e.g., nickel or silicon, preferably rigid) that does not interact with the liquid core precursor. These methods can permit the complete removal of the slab region of a core layer and enable an easy filling of fine channels by using a low-viscosity core prepolymer mixture, which simplifies the production of isolated, buried-channel waveguides.

Optical micrographs of samples of two-layer and three-layer waveguide structures made using the core-first method described in FIG. 3 with the previously described cyclic olefin compositions are shown in FIGS. 4A to 4D (i.e., using the core and clad formulations described above). FIG. 4A shows a two-layer isolated channel waveguide structure; FIG. 4B shows a three-layer, buried-channel waveguide structure; FIG. 4C is a schematic diagram of the end view of the waveguide array of FIG. 4B (dimensions 13 $\mu$m wide, 16 $\mu$m tall, spaced by 13 $\mu$m) with the position of an input optical fiber shown as a shaded circle; and FIG. 4D is a photograph of the waveguide output when light from a diode laser ($\lambda$=820 nm) is coupled into a single waveguide as shown in FIG. 4C. The output pattern shows that the guide is multimode at 820 nm and there is no cross coupling between adjacent guides.

The core-first methods are also applicable to any other suitable polymer system including, but not limited to, poly-acrylates (such as deuterated polyfluoro-methacrylate), polyimides (such as cross-linked polyimides or fluorinated polyimides), and benzocyclobutene.

Figure 5A:
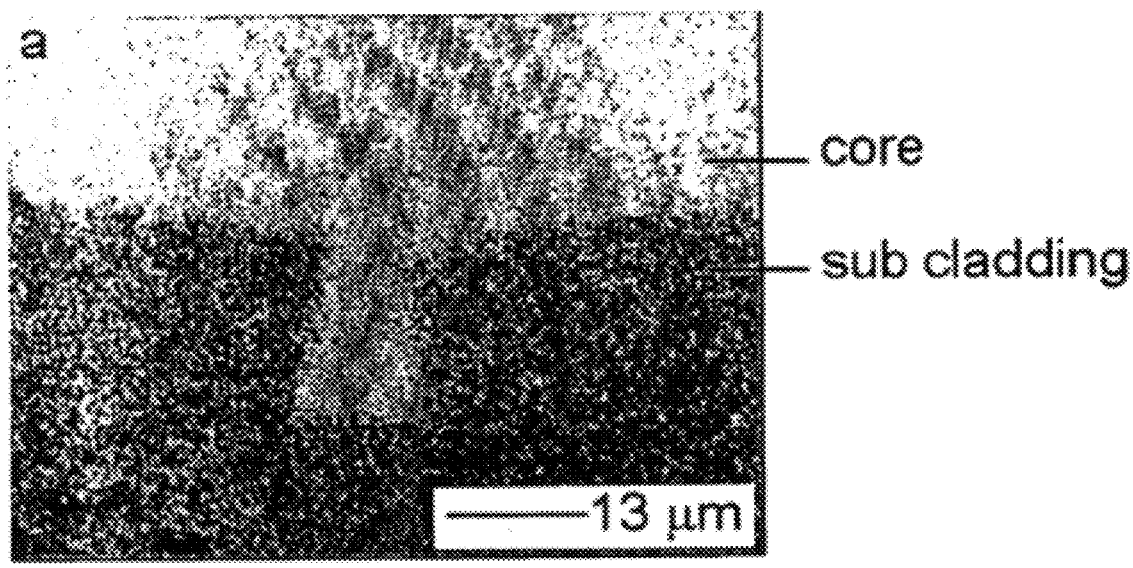
FIGS. 5A and 5B are photographs comparing the clad-first waveguide forming method of FIG. 1 to the core-first waveguide forming method of FIG. 3.
Figure 5B:
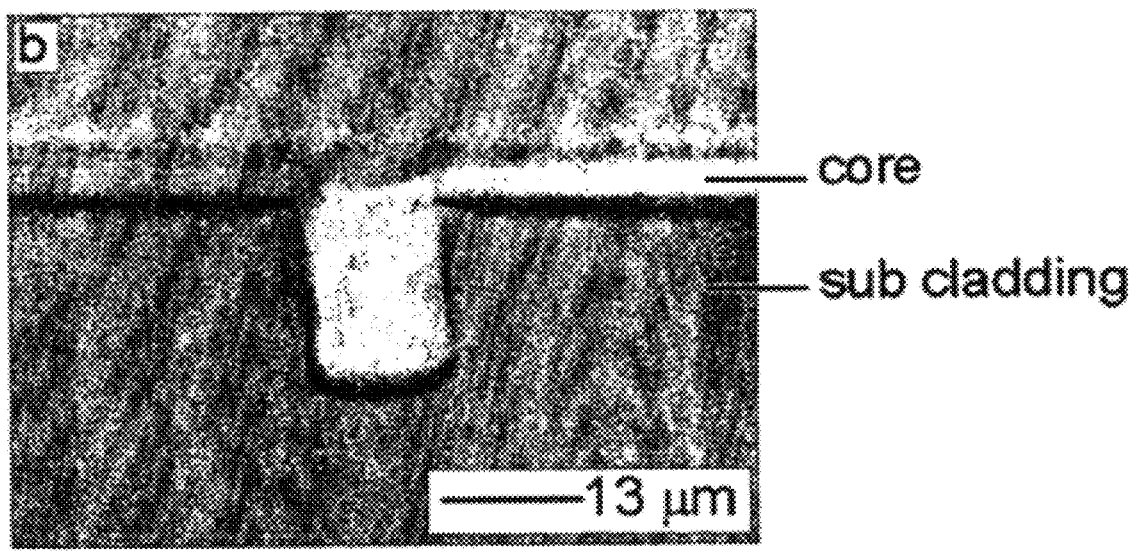

With regard to FIGS. 5A and 5B, these figures depict the condition called "swelling". Swelling may occur during a clad-first approach for forming waveguides (see FIG. 1). Although not wishing to be bound to any one theory, it is believed that swelling occurs during the polymerization of the core composition in the previously polymerized sub-cladding structure. In some instances swelling may be undesirable. Thus, using, for example, the above-described core-first approaches to waveguide formation it is possible to reduce and/or eliminate such swelling. This is shown by comparing FIG. 5A (formed using the above-mentioned clad-first approach) to that of FIG. 5B (formed using the above-mentioned core-first approach).

The core-first methods that start with partially-cured core structures reduce the amount of curing time necessary to produce a waveguide and can reduce the amount of evaporation of the liquid core layer during the curing process thereby yielding fully filled buried waveguide structures. Optical micrographs of samples of two two-layer waveguide structures made using the core-first methods described in connection with FIGS. 3 and 6 are shown in FIGS. 7A and 7B, respectively. These micrographs confirm that the fully filled buried waveguide structures can be formed with the methods described above.

Fill and Remove Method

Another aspect of the invention is a method for producing an optical waveguide core structure including the steps of applying a core composition to a substrate defining a waveguide core pattern, removing a portion of the core composition from an exposed surface of the filled waveguide core pattern, and at least partially curing the core composition to form a core structure. The substrate can be either a master (e.g., a nickel or silicon master, preferably rigid) or a cladding layer; in the latter case, the method provides a two-layer waveguide. Core composition can be removed from the waveguide core pattern via vaporization using the materials described in the first variation of the core-first method described above, via the use of a metering rod (e.g., a Meyer bar), or by any other suitable method. The waveguide core structure thus produced can also be used in any of the above-described core-first methods to produce an optical waveguide.

In this method, the waveguide core pattern defining a core structure preferably is deeper than the desired waveguide core structure, and core composition is removed to the extent that sufficient core composition remains in the waveguide core pattern to form the desired core structure(s).

Core composition can be removed from the waveguide core pattern via vaporization using the materials described in the first variation above, via the use of a metering rod (e.g., a Meyer bar), or by any other suitable method. A metering rod, also called a Meyer bar, is a wire-wound rod. The metering rod can be drawn across the surface of a substrate (e.g., a master), and will leave the desired quantity of the core material in the waveguide core pattern. Generally, the quantity of core material that remains is determined by the dimensions of the waveguide core pattern, the diameter of the wire used on the rod, and the properties of the core material (e.g., viscosity and surface tension).

Any residual core material on the lands is either optically uncoupled to the core structure by virtue of its location (e.g., incontiguous), or it can be removed by mechanical means (e.g., planarization via grinding, etching, and the like). One advantage of this variation is that the exposed surface of the core structure is smoothed by surface tension of the liquid core material, which improves the optical transmission quality of the core structure. When adjacent, optically-disconnected core structures are formed, this method allows for the omission of process steps relating to planarization and the need to place an optically smooth surface on the exposed surface of the core structure.

One embodiment of this aspect of the invention will be described with reference to FIG. 15, with additional steps directed to sub-cladding and top-cladding layers to form isolated channel waveguide cores.

Figure 15:
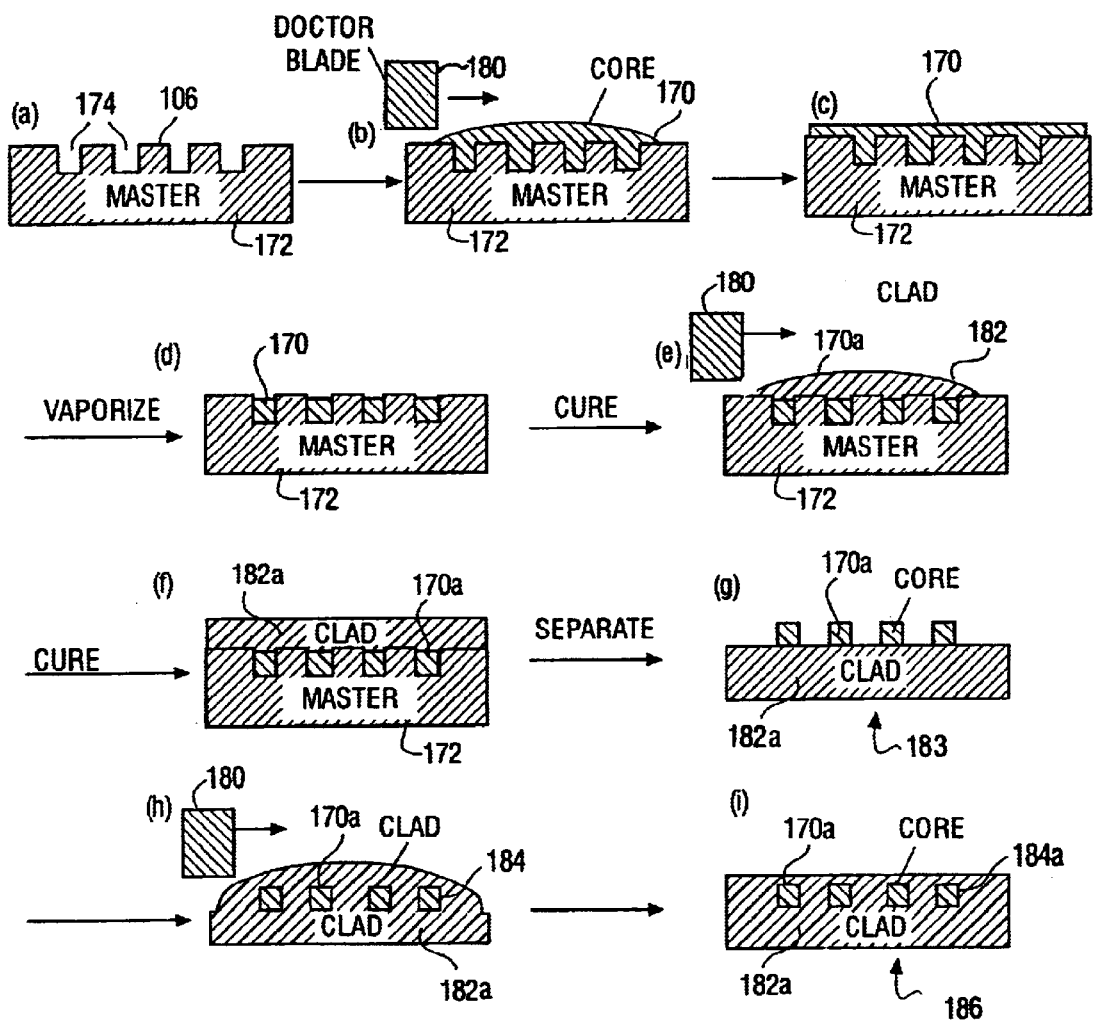
FIG. 15 is a step diagram of the steps of a method for forming waveguide cores and additional steps for forming isolated channel waveguide cores.

A mixture of a core material 170 is applied (e.g., poured and/or spread) onto the surface of a master 172 (e.g., nickel or silicon masters, preferably rigid) having grooves 174 formed generally in the shape and dimensions of the desired waveguide structure and with a depth greater than the thickness of the desired waveguide structure, with lands 176 adjacent each waveguide structure (see (a) and (b) of FIG. 15). For example, for an isolated, buried-channel waveguide structure the channels are from about 1 $\mu$m to about 200 $\mu$m in width and from about 1 $\mu$m to about 200 $\mu$m in height. However, any desired thickness and height may be obtained so long as the channels are neither too narrow or too shallow to accept the core material with additional depth to allow for removal of a portion of the core material after filling.

A doctor blade 180 is set to rest directly on the surface of the master 172 (where a buried structure is desired) and used to scrape away the excess liquid core mixture 170 (see (b) and (c) of FIG. 15). Thereafter, a portion of the remaining core material 170 is vaporized from an exposed surface of the filled waveguide core pattern (see (c) and (d) of FIG. 15). The core material 170 remaining in the master 172 is at least partially cured simultaneously with or subsequently to the vaporization step. Residual core material 170 can remain on the lands 176, so long as the amount of core material 170 removed from the grooves 174 is such that adjacent core structures 170a that remain are optically disconnected from each other to eliminate cross-talk.

The core material 170 left in the waveguide core pattern (e.g., the grooves 174) is at least partially cured to form at least one waveguide structure 170a. If the core material 170 is one of the core materials described above, the core material 170 can be cured in accordance with any one of the above-mentioned methods. Preferably, the core material 170 is partially cured at least to a point whereat diffusion of the subsequently-applied cladding composition into the core material is substantially reduced, minimized, or prevented. In another embodiment, the core material 170 is partially cured to at least its gel point. In another embodiment, the core material 170 is cured (i.e., substantially fully cured (e.g., less than about 5 wt. % residual monomer)).

After the core material 170 left in the grooves is at least partially cured, as described above (see (d) and (e) of FIG. 15), a mixture of a cladding material 182 is poured onto the top of the core-containing master 172 so as to cover the exposed surface of the waveguide structure(s) 170a. The thickness of the sub-cladding layer is also controlled by a doctor blade 180 (see (e) of FIG. 15). Upon curing under the proper conditions, a sub-clad layer 182a is formed which is in contact with at least one surface of the waveguide structure(s) (see (f) of FIG. 15). If the core structure(s) 170a were only partially cured prior to application of cladding composition 182 over the core structure(s) 170a and master 172, then preferably the core structure(s) 170a are cured as the cladding composition 182 cures to form the sub-clad layer 182a. Next, the sub-clad layer 182a/waveguide structure(s) 170a combination 183 is removed from the master 172 and flipped over so that the sub-clad layer is on the bottom (see (g) of FIG. 15).

Preferably, the thickness of the sub-clad layer is sufficient to allow for the removal of the sub-clad layer 182a and the waveguide structure(s) 170a from the master 172 without causing damage to either layer. For example, the thickness of the sub-clad layer 182a is sufficient to prevent inelastic deformation of the combination when the force required to remove the waveguide structure(s) 170a from the master 172 is applied. In another embodiment, the thickness of the each clad (sub-clad and top clad) is from about 2 μm to about 20,000 μm or are in total about 4 μm to about 20,000 μm. In yet another embodiment, the thickness of each clad layer is about 10 μm to about 10,000 μm, or are in total about 20 μm to about 10,000 μm. By definition, the height of the top-clad includes the height of the core layer (see (g), (h), and (i) of FIG. 15).

Next, a top cladding material 184 is applied to the core side of the film and the thickness thereof is also controlled by a doctor blade 180 (see (h) of FIG. 15). Thereafter, the top cladding material 184 is cured to form a top cladding layer 184a. Upon completion of the curing process of the top cladding layer a waveguide 186 is formed (see (i) of FIG. 15). Curing of this third layer results in a three-layer polymer film containing isolated channel waveguide cores buried between the sub-cladding layer 182a and the top cladding layer 184a.

Alternatively, if a two layer optical waveguide is desired the above process is halted after removing the core/cladding combination from the master (e.g., step (g) in FIG. 15).

Figure 8:
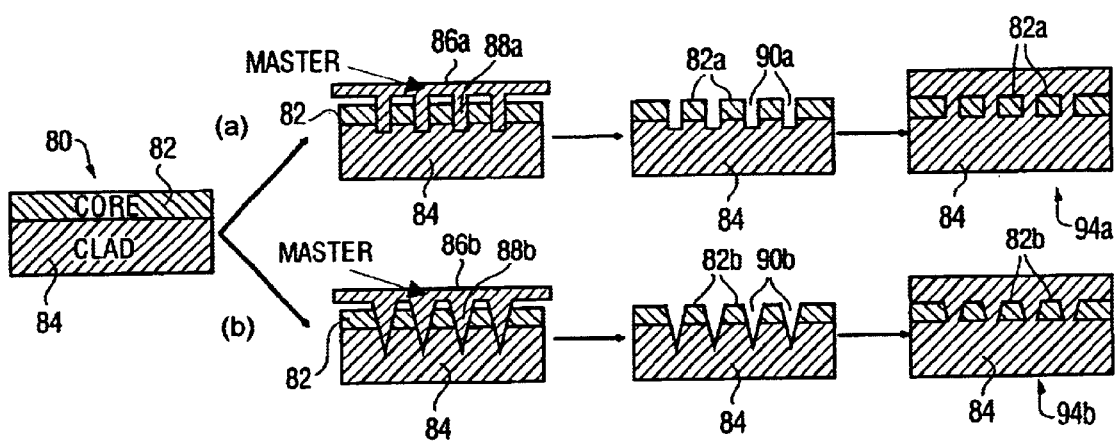
FIG. 8 is a step diagram of the steps of a method for forming isolated, buried-channel waveguides by displacing material in multi-layer films.

Multilayer Displacement Methods:

As shown in FIG. 8, a double-layer polymer film 80 containing a thin layer of core material 82 (e.g., 25 μm) on top of a thick layer 84 of sub-cladding material (e.g., 100 μm thick) can be easily fabricated in a conventional film casting process. These layers may also be thicker or thinner as is described in relation to the thickness of the layers in the core-first method.

A master (e.g., master 86a or 86b) having designed features 88a or 88b therein is used to displace material from at least the core layer and form structures 82a and 82b. As shown in FIG. 8, the master 86a or 86b cuts or penetrates through the core layer 82 and into the sub-cladding layer 84. In this method, formation of the waveguide core structures 82a and 82b and features in the core and cladding layers is accomplished by any suitable material displacement technique (e.g., hot embossing, diamond cutting, laser ablation or reactive-ion etching (RIE), etc.). Laser ablation, diamond cutting, and hot embossing are preferred. After formation of the desired waveguide core structures 82a and 82b, a top cladding layer 92 is formed by applying a top cladding material to the double-layer polymer film having waveguide core structures 82a and 82b and other features formed therein. The top cladding material is cured using any suitable method to yield a top cladding layer 92. During the formation of the top cladding layer 92 the top cladding material fills in features (e.g., trenches) 90a and 90b so as to complete the formation of the waveguides 94a and 94b.

Waveguides 94a and 94b contain isolated core structures 82a and 82b sandwiched between layers of, or surrounded by, or buried within the sub- and top cladding materials. Such waveguides can be used as basic components of integrated optical circuits in optoelectronic markets.

Figure 16:
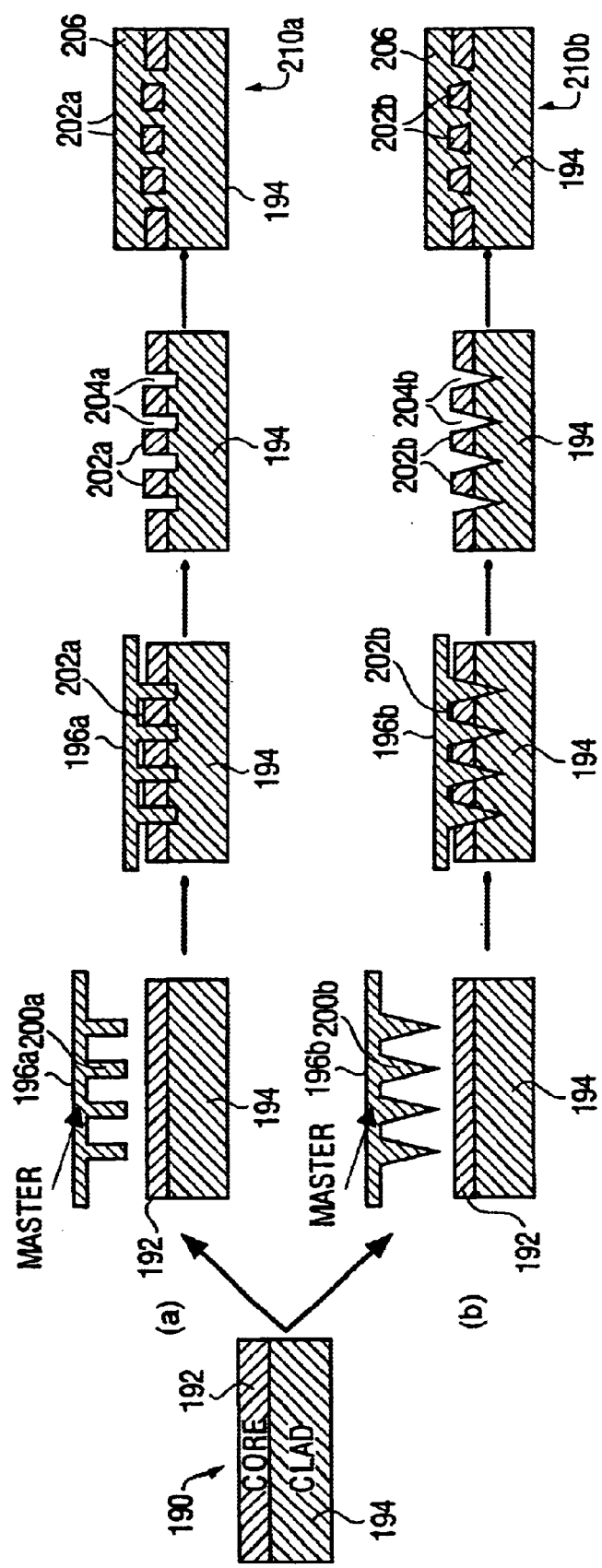
FIG. 16 is a step diagram of the steps of a method for forming isolated, buried-channel waveguides by hot embossing a multi-layer film.

FIG. 16 is a step diagram of the steps of a method for forming isolated, buried-channel waveguides by hot embossing a multi-layer film. In this embodiment of the method, a two-layer film 190 having a core layer 192 and a clad layer 194 can be pre-formed or can be formed during the embossing step. A master (e.g., master 196a or 196b) having designed features 200a or 200b therein is used to displace material from at least the core layer 192 and form the waveguide core structures 202a and 202b. As shown in FIG. 16, the heated embossing master 196a or 196b penetrates at least through the core layer 192 and, in this embodiment, into the sub-cladding layer 194. In this method, formation of the waveguide core structures 202a and 202b and features 204a and 204b in the core and cladding layers is accomplished by displacement of material in at least the core layer by the hot embossing master. As shown in FIG. 16, when the embossing tool penetrates into the core layer, core material moves (e.g., flows) up into the areas between adjacent master features 200a or 200b. Optionally, in another embodiment, the hot master can vaporize core and/or clad material to form features 204a or 204b between waveguide cores 202a and 202b. After formation of the desired waveguide core structures 202a and 202b, a top cladding layer 206 is formed by applying a top cladding material to the double-layer polymer film having waveguide core structures 202a and 202b and other features formed therein. The top cladding material is cured using any suitable method to yield a top cladding layer 206. During the formation of the top cladding layer 206, the top cladding material fills in features (e.g., trenches) 204a and 204b so as to complete the formation of the waveguides 210a and 210b.

Waveguides 94*a* and 94*b* contain isolated core structures 82*a* and 82*b* sandwiched between layers of, or surrounded by, or buried within the sub- and top cladding materials. Such waveguides can be used as basic components of integrated optical circuits in optoelectronic markets.

In another embodiment, a triple-layer polymer film (i.e. a clad-core-clad multilayered film) is used to form a waveguide according to a displacement method such as that detailed in FIG. 8. If a three-layer film is used, then a partial three-layer structure is formed (ie., a waveguide core bound by cladding on two sides). The three-layer structure can be additionally overcoated with cladding material to form a buried-channel, three-layer waveguide structure.

This fabrication approach is applicable not only to the cyclic olefin monomer compositions described herein, but also to other polymer systems such as polyacrylates (such as deuterated polyfluoro-methacrylate), polyimides (such as cross-linked polyimides or fluorinated polyimides), and benzocyclobutene. In addition, other polymers may be used. These polymers include, but are not limited to, heat-curable mass polymerizable materials, photo-curable polymers, and solution-based polymer materials.

Figure 9A:
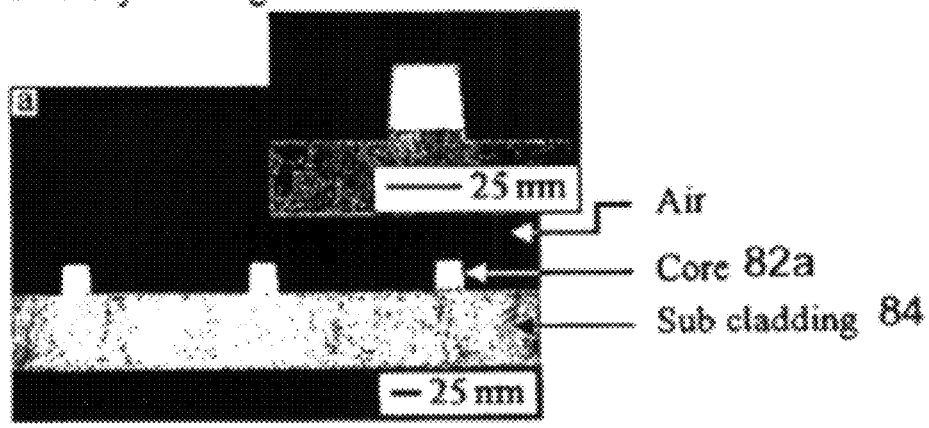
FIGS. 9A to 9D depict waveguide structures formed using multilayer displacement methods.
Figure 9B:
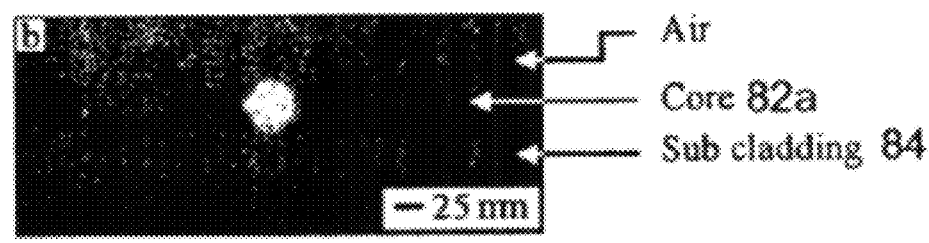
Figure 9C:
Figure 9D:

FIGS. 9A to 9D are other examples of waveguides formed using a multilayer diamond cutting method and the above described core/clad formulations. FIG. 9A is an optical micrograph of a two-layer isolated channel waveguide formed using a multilayer diamond cutting method; FIG. 9B depicts light from a diode laser ($\lambda$=820 nm) being applied to the middle isolated channel structure of the waveguide of FIG. 9A; FIG. 9C is a three-layer isolated, buried-channel isolated waveguide formed using a multilayer diamond cutting method; and FIG. 9D depicts light from a diode laser ($\lambda$=820 nm) being applied to the middle isolated, buried-channel structure of the waveguide of FIG. 9C. When the photographs of FIGS. 9B and 9D were taken that the intensity of the input light from the diode laser is maximized to ascertain if any cross-talk exists between the isolated-buried waveguide structures. As can be seen from FIGS. 9B and 9D, the output patterns indicate that there is no cross coupling between adjacent waveguide structures.

Figure 17:
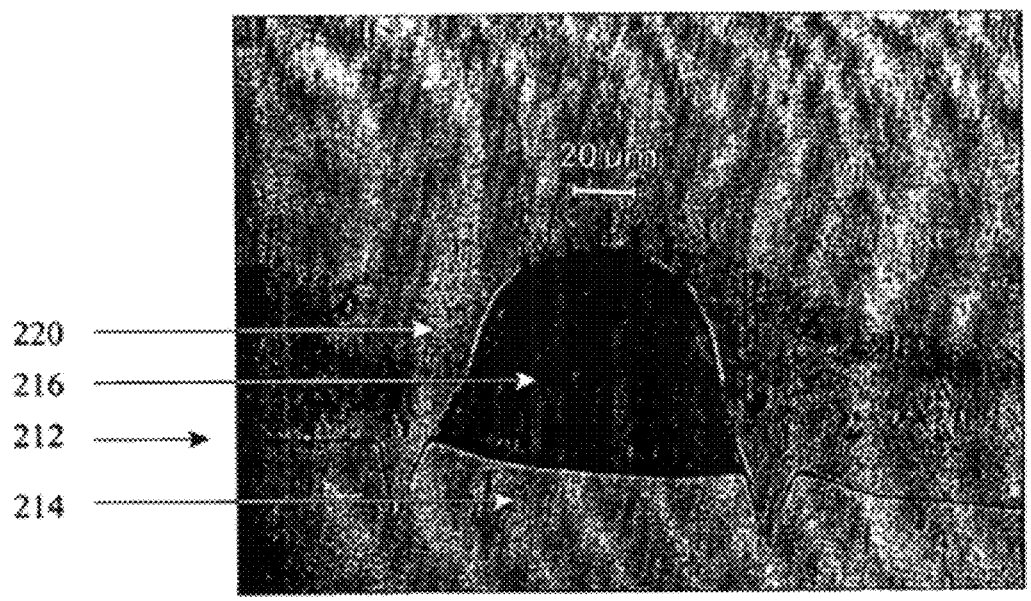
FIG. 17 is an optical micrograph of a two-layer isolated channel waveguide formed by hot embossing a two-layer film.

FIG. 17 is an optical micrograph of a two-layer isolated channel waveguide 212 formed by hot embossing a two-layer film. The emboss tool was a steel roll 6 inches in diameter, having a 10 inch wide face. The roll was prepared by plating a copper surface on the roll, and then diamond turning 36 degree V-grooves on the surface that were 185 $\mu$m deep, and having a pitch of 120 $\mu$m. The roll then was plated with electroless nickel.

In this example, a 75 $\mu$m polyester film 214 and an extruded polypropylene film (Fina Polypropylene 3374, ATOFINA Petrochemical Corp. of Houston, Tex.) were passed into a nip formed by two heated emboss rolls. One emboss roll was the emboss tool containing the 120 $\mu$m pitch v-grooves, and the other roll was a smooth steel roll.

The polyester film 214 and polypropylene were brought into contact as the emboss rolls met. The emboss roll was then impressed through the polypropylene and into the polyester. The result was the creation of a discrete polypropylene waveguide 216, held on the polyester film below. The polypropylene waveguide core fibers (e.g., 216) were completely separated from each other, by a distance defined by the tool geometry and the degree of impression into the bottom layer of polyester film 214. The polypropylene/polyester combination was over-coated with epoxy 220 for imaging. This example illustrates the applicability of the method to continuously produced linear waveguides, although the invention is not so limited.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A method for producing an optical waveguide comprising the steps of:
   (a) forming a core structure, said core structure comprising an at least partially cured core composition, on a master defining a waveguide pattern;
   (b) applying over the core structure and the master a cladding layer comprising a liquid cladding composition;
   (c) curing said cladding layer to form a core/cladding combination; and
   (d) removing the core/cladding combination from the master so as to expose at least a portion of the core structure, wherein the refractive index of the cured core composition is at least 0.05 percent higher than the refractive index of the cured cladding composition.

2. The method of claim 1, comprising curing the core structure in step (a).

3. The method of claim 1, comprising partially curing the core structure in step (a) and curing the core structure in step (c).

4. The method of claim 1, wherein said step of forming a core structure comprises the steps of:
   applying core composition onto the master to fill the waveguide pattern;
   striking off excess core composition from the master;
   vaporizing residual core composition from lands defined by the master; and
   at least partially curing the remaining core composition.

5. The method of claim 1, wherein said step of forming a core structure comprises the steps of:
   applying a core composition to a master defining a waveguide core pattern to fill said waveguide core pattern;
   removing a portion of said core composition from an exposed surface of the filled waveguide pattern; and
   at least partially curing the core composition.

6. The method of claim 5, wherein said removing step comprises vaporizing said portion of said core composition.

7. The method of claim 5, wherein said removing step comprises treating the filled surface of the master with a metering bar.

8. The method of claim 1, further comprising the step of:
   (e) forming a second cladding layer over the exposed portion of the core structure, thereby burying the core structure.

9. The method of claim 1, wherein at least one of said core composition and said cladding composition comprises at least one norbornene-type monomer and/or at least one crosslinking monomer and at least one co-catalyst, wherein polymerization is achieved by the addition of at least one pro-catalyst.

10. The method of claim 1, wherein at least one of said core composition and said cladding composition comprises at least one norbornene-type monomer and/or at least one crosslinking monomer and at least one pro-catalyst, wherein polymerization is achieved by the addition of at least one co-catalyst.

11. A method for producing an optical waveguide comprising the steps of:
   (a) forming a film comprising a layer of core material and a layer of cladding material; and
   (b) forming a waveguide feature in the layer of core material in the film, wherein the refractive index of the core material is at least 0.05 percent higher than the refractive index of the cladding material and wherein at least one of said core material and said cladding material comprises at least one norbornene-type monomer and/or at least one crosslinking monomer and at least one co-catalyst, wherein polymerization is achieved by the addition of at least one pro-catalyst.

12. A method for producing an optical waveguide comprising the steps of:
   (a) forming a film comprising a layer of core material and a layer of cladding material; and
   (b) forming a waveguide feature in the layer of core material in the film, wherein the refractive index of the core material is at least 0.05 percent higher that the refractive index of the cladding material and wherein at least one of said fore material and said cladding material comprises at least one norbornene-type monomer and/or at least one crosslinking monomer and at least one pro-catalyst, wherein polymerization is achieved by the addition of at least one co-catalyst.

* * * * *

UNITED STATES PATENT AND TRADEMARK OFFICE
CERTIFICATE OF CORRECTION

PATENT NO. : 6,677,175 B2
DATED : January 13, 2004
INVENTOR(S) : Zhao et al.

It is certified that error appears in the above-identified patent and that said Letters Patent is hereby corrected as shown below:

Column 78,
Line 12, delete "that" and insert -- than --.
Line 14, delete "fore" and insert -- core --.

Signed and Sealed this

Twenty-ninth Day of June, 2004

JON W. DUDAS
*Acting Director of the United States Patent and Trademark Office*